United States Patent
Murata

(10) Patent No.: US 9,746,051 B2
(45) Date of Patent: Aug. 29, 2017

(54) VEHICLE VIBRATION REDUCING APPARATUS

(75) Inventor: Kiyohito Murata, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 546 days.

(21) Appl. No.: 14/372,123

(22) PCT Filed: Jan. 20, 2012

(86) PCT No.: PCT/JP2012/051273
§ 371 (c)(1),
(2), (4) Date: Jul. 14, 2014

(87) PCT Pub. No.: WO2013/108407
PCT Pub. Date: Jul. 25, 2013

(65) Prior Publication Data
US 2014/0366682 A1    Dec. 18, 2014

(51) Int. Cl.
*F16F 15/31* (2006.01)
*F16H 57/00* (2012.01)
*F16F 15/14* (2006.01)
*B60W 10/02* (2006.01)
*B60W 30/20* (2006.01)
(Continued)

(52) U.S. Cl.
CPC .............. *F16F 15/31* (2013.01); *B60K 6/105* (2013.01); *B60W 10/02* (2013.01); *B60W 30/20* (2013.01); *F16F 15/1464* (2013.01); *F16F 15/1478* (2013.01); *F16F 15/30* (2013.01); *F16H 57/0006* (2013.01); *B60W 2030/206* (2013.01); *B60Y 2400/48* (2013.01); *Y10T 74/2121* (2015.01)

(58) Field of Classification Search
None
See application file for complete search history.

(56) References Cited

U.S. PATENT DOCUMENTS

2010/0193320 A1* 8/2010 Kombowski ........... F16H 45/02
                                                        192/30 V

FOREIGN PATENT DOCUMENTS

| JP | 55-110625 | 8/1980 |
| JP | 2001-140735 | 5/2001 |
| JP | 2001-343066 | 12/2001 |

(Continued)

*Primary Examiner* — Erin D Bishop
(74) *Attorney, Agent, or Firm* — Finnegan, Henderson, Farabow, Garrett & Dunner, LLP

(57) ABSTRACT

A vehicle vibration reducing apparatus includes: an inertial mass body; a first engagement device that is switched between a state where a running power source engages with a damper of a power transmission device so as to enable power transmission and a state where the engagement is released; a second engagement device that is switched between a state where the power transmission device engages with the inertial mass body so as to enable power transmission in a power transmission pass different from that of the first engagement device and a state where the engagement is released; and a third engagement device that is switched between a state where the running power source engages with the inertial mass body so as to enable power transmission in a power transmission path different from those of the first engagement device and the second engagement device and a state where the engagement is released.

11 Claims, 19 Drawing Sheets

(51) Int. Cl.
  *B60K 6/10* (2006.01)
  *F16F 15/30* (2006.01)

(56) References Cited

FOREIGN PATENT DOCUMENTS

| | | |
|---|---|---|
| JP | 2006-232162 | 9/2006 |
| JP | 2010-1905 | 1/2010 |
| JP | 2010-261566 | 11/2010 |
| JP | 2011-190854 | 9/2011 |

* cited by examiner

VEHICLE VIBRATION REDUCING APPARATUS

CROSS-REFERENCE TO RELATED APPLICATIONS

This application is a national phase application of International Application No. PCT/JP2012/051273, filed Jan. 20, 2012, the content of which is incorporated herein by reference.

TECHNICAL FIELD

The present invention relates to a vehicle vibration reducing apparatus.

BACKGROUND ART

As a device that is mounted on a vehicle so as to reduce vibration occurring in a vehicle, PTL 1 discloses a drive system rotation fluctuation reducing device that reduces rotation fluctuation of a drive system including an internal combustion engine, a transmission shaft transmitting an output torque of the internal combustion engine to a drive shaft of a vehicle, and a transmission disposed in the transmission shaft. Such a drive system rotation fluctuation reducing device includes variation means for causing inertia of the transmission shaft to vary and control means for controlling the variation means. In the drive system rotation fluctuation reducing device, a damper that absorbs fluctuation of the output torque is disposed closer to the internal combustion engine than the transmission of the transmission shaft, and the variation means causes the inertia of the transmission shaft, closer to the transmission than the damper, to vary. Accordingly, the drive system rotation fluctuation reducing device can increase the inertia of the transmission shaft while suppressing a decrease in the mode frequency of a primary eigenvalue in a torsional vibration mode of the drive system, by increasing the inertia of the transmission shaft closer to the transmission than the damper. As a result, the drive system rotation fluctuation reducing device can reduce the rotation fluctuation of the drive system while suppressing a decrease in vehicle responsiveness.

CITATION LIST

Patent Literature

PTL 1: Japanese Patent Application Publication No. 2010-001905 (JP 2010-001905 A)

SUMMARY OF THE INVENTION

Technical Problem

However, the drive system rotation fluctuation reducing device described in PTL 1 has a room for improvement, for example, in terms of achieving a proper decrease in vibration.

The present invention is made in consideration of the above-mentioned circumstances and an object thereof is to provide a vehicle vibration reducing apparatus that can properly reduce vibration.

Solution to Problem

In order to achieve the above-mentioned object, according to an aspect of the present invention, there is provided a vehicle vibration reducing apparatus including: an inertial mass body that is connected to a running power source generating rotational power for causing a vehicle to run or a power transmission device capable of transmitting the rotational power to a driving wheel via a damper from the running power source; a first engagement device that is switched between a state where the running power source engages with the damper of the power transmission device so as to enable power transmission and a state where the engagement is released; a second engagement device that is switched between a state where the power transmission device engages with the inertial mass body so as to enable power transmission in a power transmission pass different from that of the first engagement device and a state where the engagement is released; and a third engagement device that is switched between a state where the running power source engages with the inertial mass body so as to enable power transmission in a power transmission path different from those of the first engagement device and the second engagement device and a state where the engagement is released.

In the vehicle vibration reducing apparatus, the power transmission device may include a transmission that changes the rotational power transmitted from the running power source to the driving wheel step by step, the first engagement device, the second engagement device, and the third engagement device may be arranged to be coaxial with the rotation axis line of an input shaft of the transmission, and the second engagement device may be switched between a state where the input shaft of the transmission engages with the inertial mass body so as to enable power transmission and a state where the engagement is released.

The vehicle vibration reducing apparatus may further include a first control device that controls the first engagement device, the second engagement device, and the third engagement device, the running power source may be an internal combustion engine, and the first control device may control the first engagement device and the second engagement device so as to be switched to the disengaged state and may control the third engagement device so as to be switched to the engaged state when the running power source is in an idling operation state.

In the vehicle vibration reducing apparatus, the first control device may cause the vehicle to start moving in a state where the first engagement device and the second engagement device are in the disengaged state and the third engagement device is in the engaged state.

In the vehicle vibration reducing apparatus, the first control device may control the first engagement device so as to be switched to the engaged state when the vehicle starts moving in a state where the first engagement device and the second engagement device are in the disengaged state and the third engagement device is in the engaged state, and may control the third engagement device so as to be switched to the disengaged state and control the second engagement device so as to be switched to the engaged state after the engagement of the first engagement device is completed.

In the vehicle vibration reducing apparatus, the power transmission device may include a fluid transmission mechanism that transmits the rotational power via a fluid. In this case, when the vehicle starts moving in a state where the first engagement device and the second engagement device are in the disengaged state and the third engagement device is in the engaged state, the first control device may control the third engagement device so as to be switched to the disengaged state and control the second engagement device so as to be switched to the engaged state after a rotation speed of the inertial mass body side is synchronized with a rotation speed of the power transmission device side of the second engagement device, and may control the first engagement device so as to be switched to the engaged state after the disengagement of the third engagement device and the engagement of the engagement of the second engagement device are completed.

In the vehicle vibration reducing apparatus, the inertial mass body may be able to accumulate the transmitted rotational power as inertial energy.

The vehicle vibration reducing apparatus may further include: a rotation adjusting device that adjusts rotation of the inertial mass body; and a second control device that controls the rotation adjusting device so as to adjust the rotation of the inertial mass body on the basis of an output of the running power source.

In the vehicle vibration reducing apparatus, the second control device may control the rotation adjusting device so as to accumulate surplus power to power used for the running of the vehicle out of power generated by the running power source with respect in the inertial mass body.

In the vehicle vibration reducing apparatus, the second control device may control the rotation adjusting device so as to discharge deficient power in power used for the running of the vehicle out of power generated by the running power source from the inertial mass body.

In the vehicle vibration reducing apparatus, the first engagement device may be a lockup clutch of a fluid transmission mechanism that transmits the rotational power via a fluid.

Advantageous Effects of the Invention

The vehicle vibration reducing apparatus according to the present invention can achieve the effect of properly reducing vibration.

MODES FOR CARRYING OUT THE INVENTION

Hereinafter, embodiments of the present invention will be described in detail with reference to the accompanying drawings. The present invention is not limited to the embodiments. Elements in the following embodiments include elements which can be easily replaced by those skilled in the art or substantially identical elements.

Embodiment 1

Figure 1:
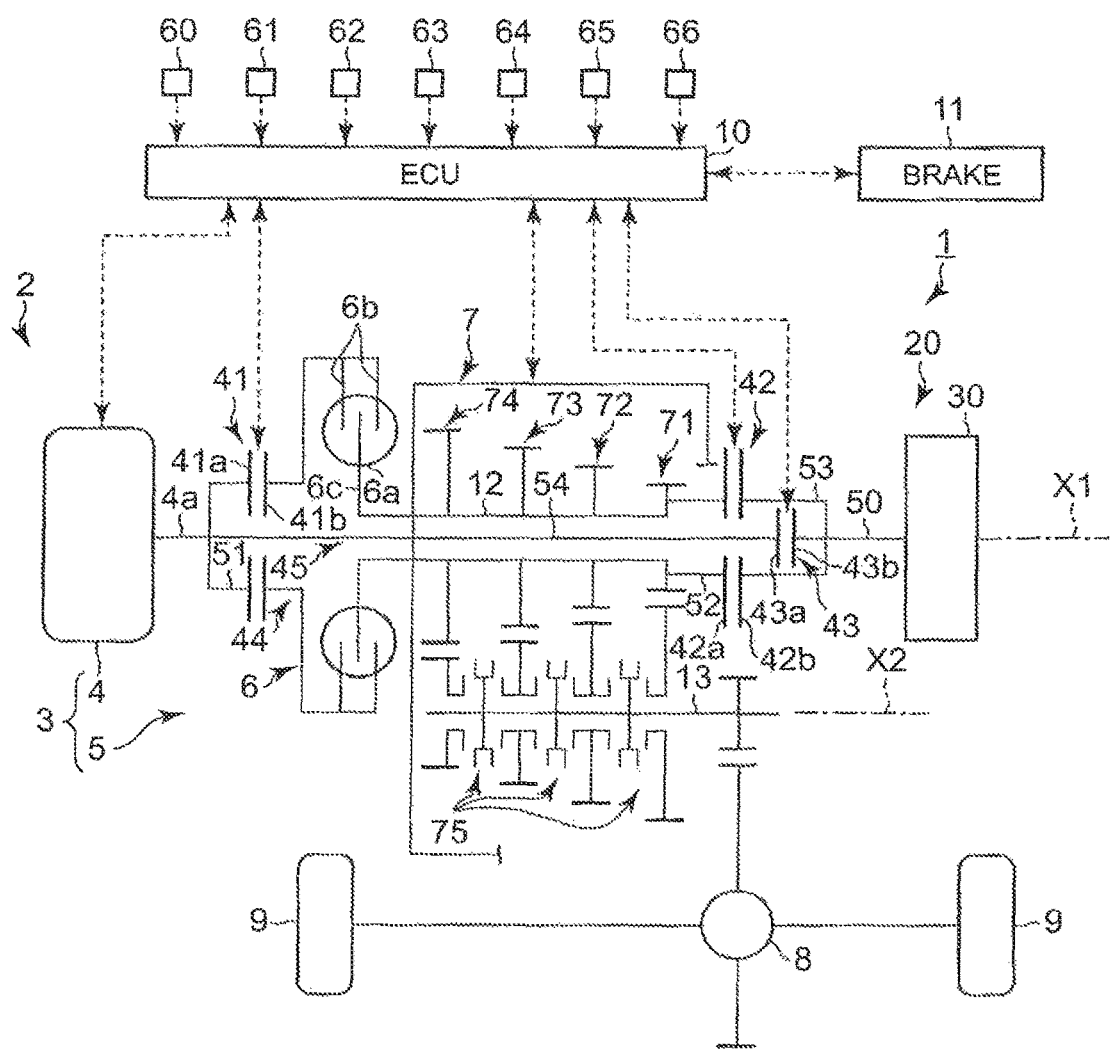
FIG. 1 is a diagram schematically illustrating a configuration of a vehicle vibration reducing apparatus according to Embodiment 1.
Figure 2:
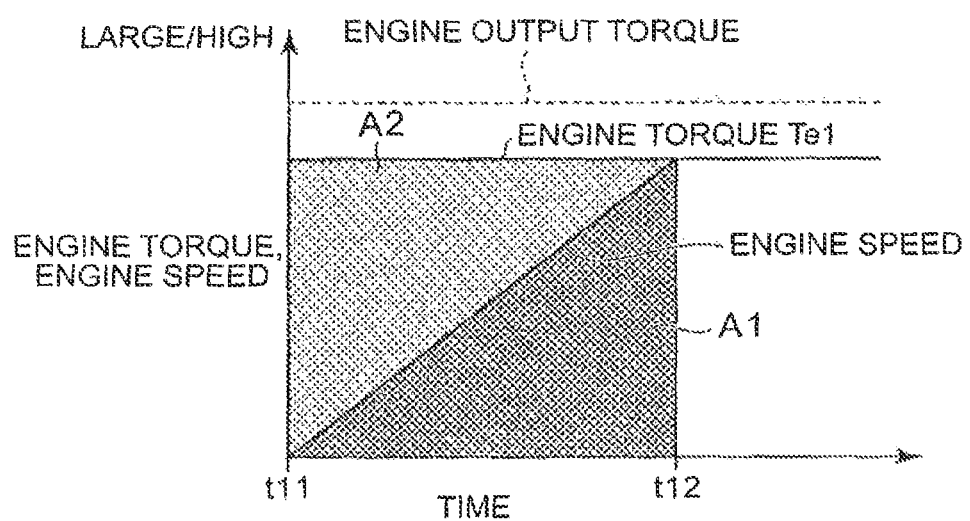
FIG. 2 is a diagram illustrating an example of an operation in the vehicle vibration reducing apparatus according to Embodiment 1.
Figure 3:
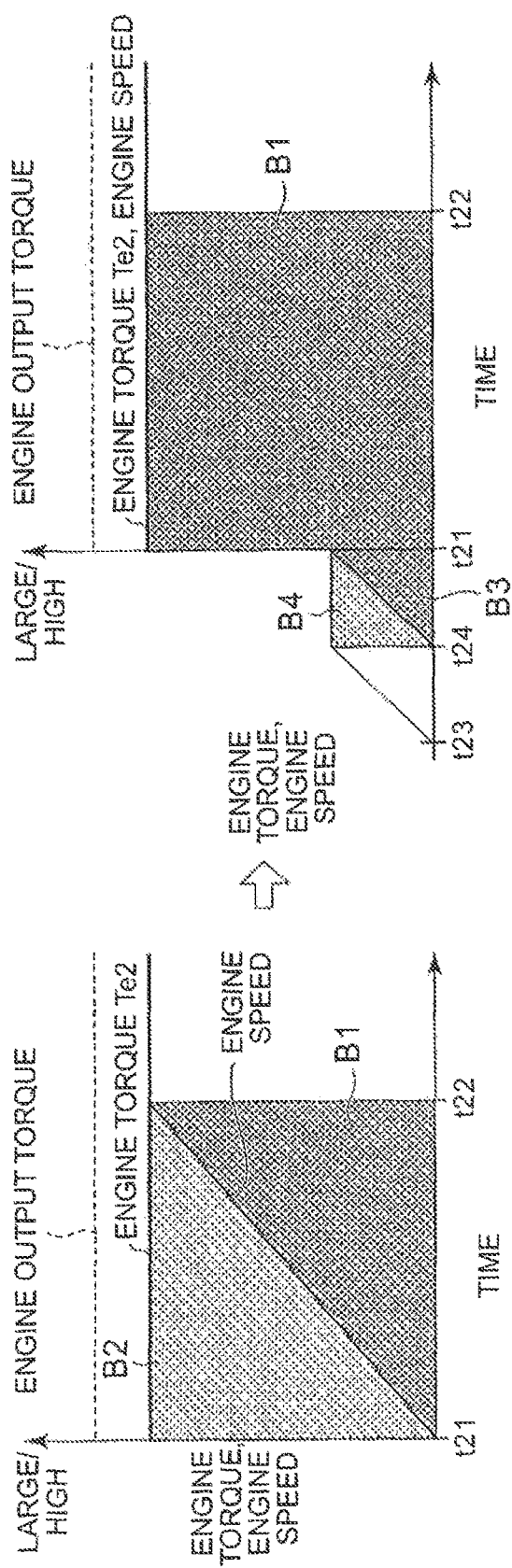
FIG. 3 is a diagram illustrating an example of the operation in the vehicle vibration reducing apparatus according to Embodiment 1.
Figure 4:
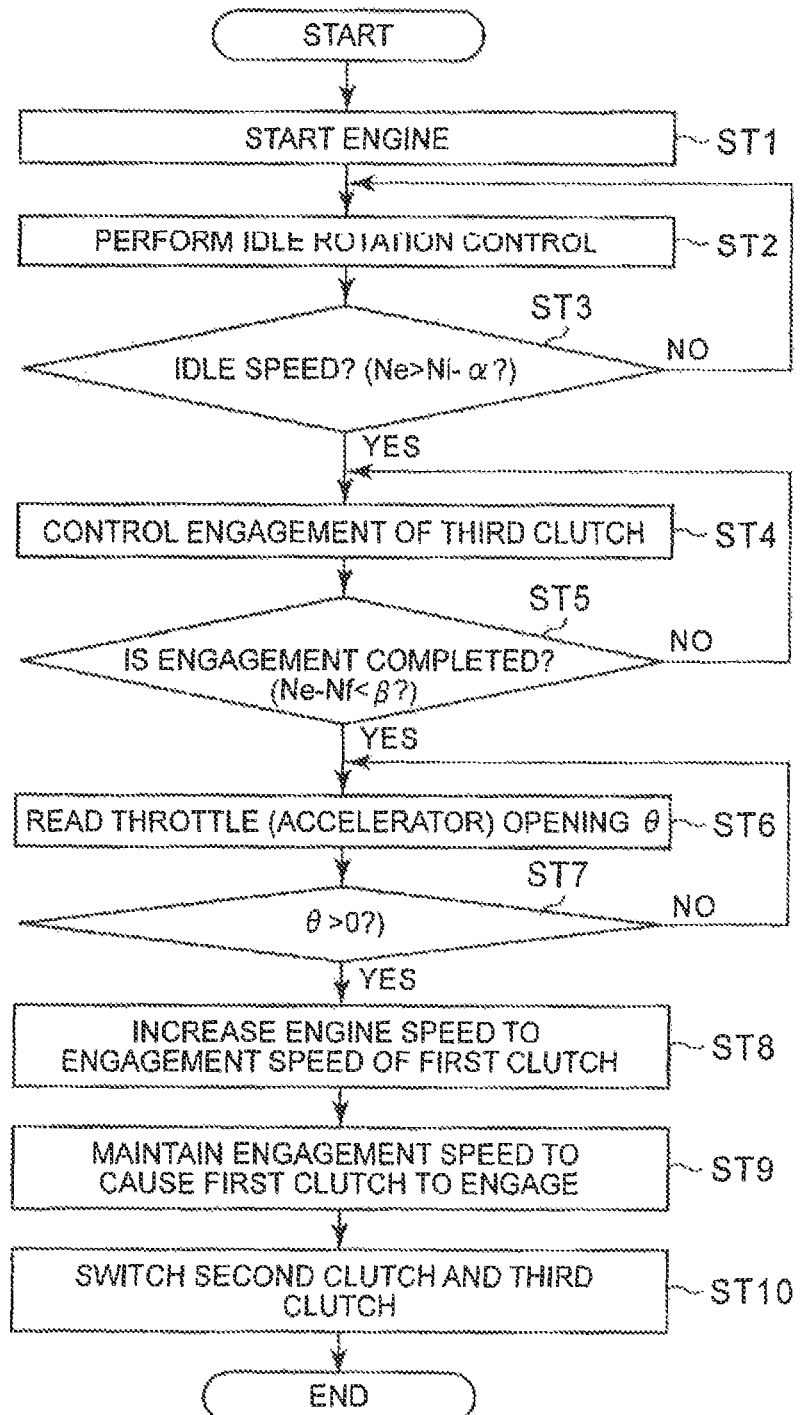
FIG. 4 is a flowchart illustrating an example of a control in the vehicle vibration reducing apparatus according to Embodiment 1.
Figure 5:
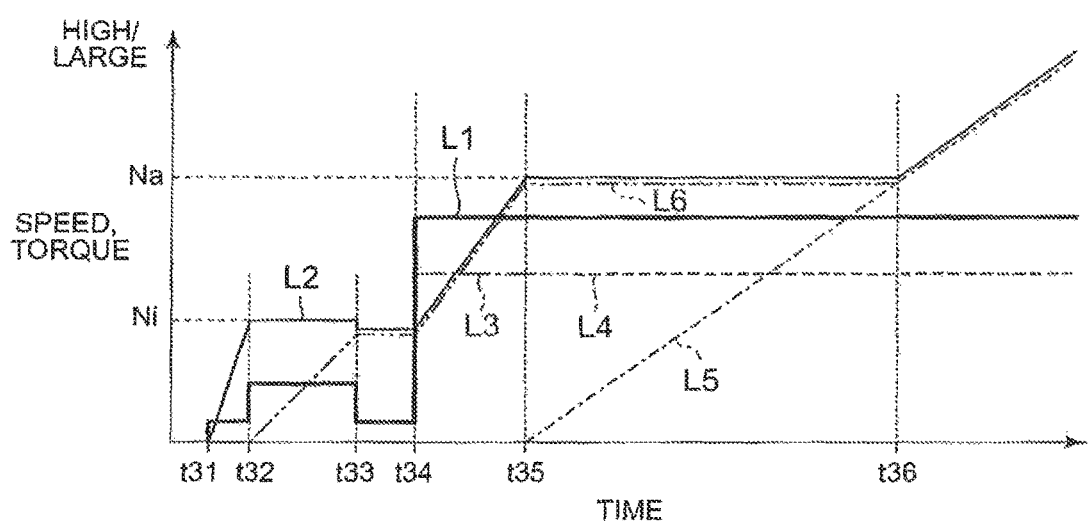
FIG. 5 is a timing diagram illustrating an example of the operation in the vehicle vibration reducing apparatus according to Embodiment 1.
Figure 6:
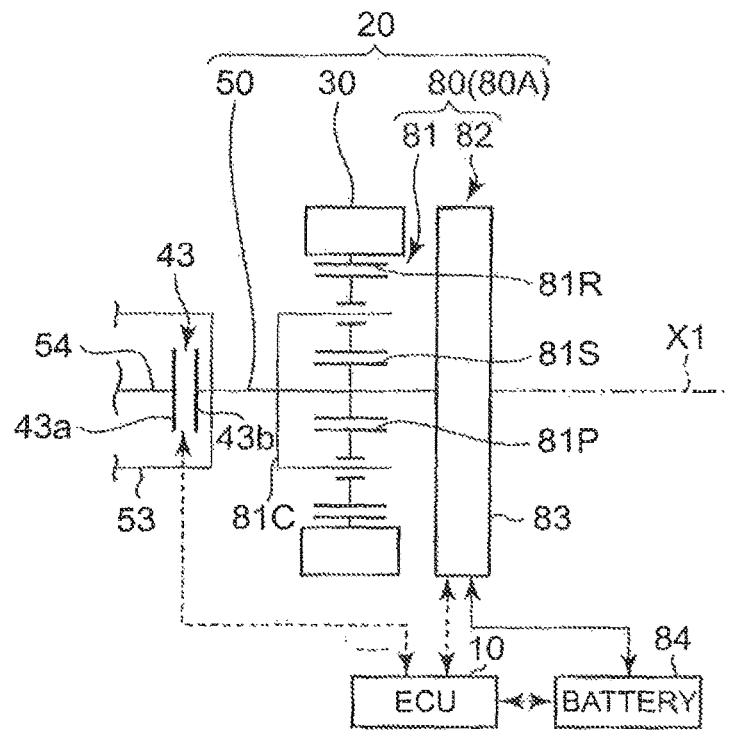
FIG. 6 is a diagram schematically illustrating an example of a configuration of a rotation adjusting device of the vehicle vibration reducing apparatus according to Embodiment 1.
Figure 7:
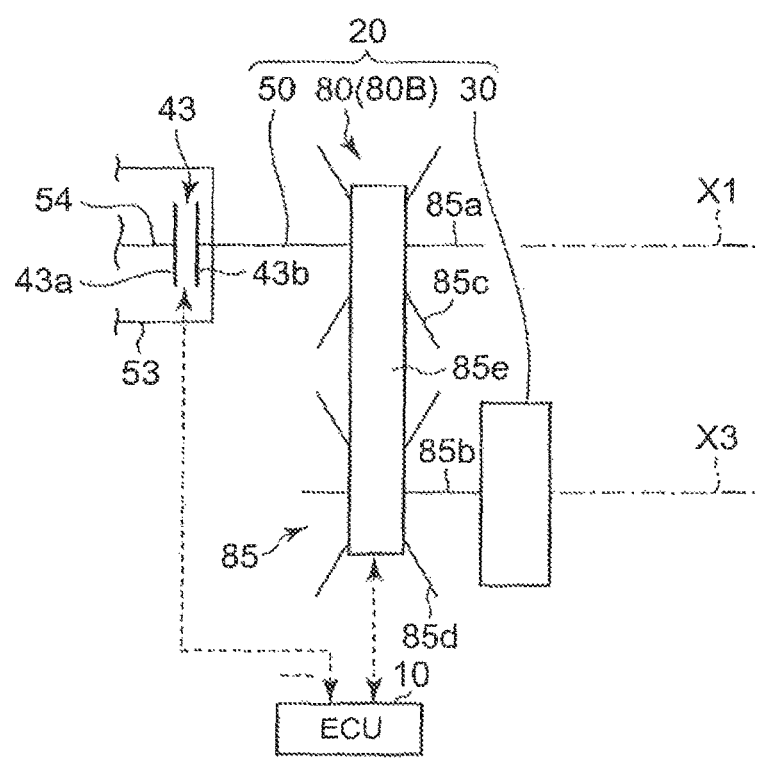
FIG. 7 is a diagram schematically illustrating an example of the configuration of the rotation adjusting device of the vehicle vibration reducing apparatus according to Embodiment 1.

FIG. 1 is a diagram schematically illustrating a configuration of a vehicle vibration reducing apparatus according to Embodiment 1, FIGS. 2 and 3 are diagrams illustrating an example of an operation in the vehicle vibration reducing apparatus according to Embodiment 1, FIG. 4 is a flowchart illustrating an example of a control in the vehicle vibration reducing apparatus according to Embodiment 1, FIG. 5 is a timing diagram illustrating an example of the operation in the vehicle vibration reducing apparatus according to Embodiment 1, and FIGS. 6 and 7 are diagrams schematically illustrating an example of a configuration of a rotation adjusting device of the vehicle vibration reducing apparatus according to Embodiment 1.

In the following description, unless mentioned differently, a direction parallel to a rotation axis line is defined as an axial direction, a direction perpendicular to the rotation axis line, that is, a direction perpendicular to the axial direction, is defined as a radial direction, and a direction around the rotation axis line is defined as a circumferential direction. The rotation axis line side in the radial direction is defined as an inner side in the radial direction and the opposite direction thereto is defined as an outer side in the radial direction.

A vehicle vibration reducing apparatus 1 according to this embodiment is a resonance point adjusting device that is applied to a vehicle 2 and that adjusts a resonance point (resonance frequency) of a power train 3 of the vehicle 2, as illustrated in FIG. 1. Accordingly, the vehicle vibration reducing apparatus 1 is a noise-vibration-harshness (NVH) countermeasure device that reduces vibration occurring in the vehicle 2. The vehicle vibration reducing apparatus 1 can typically adjust the resonance point of the power train 3 to reduce the NVH to an allowable range by adjusting inertial masses of a driving side and a driven side of the power train 3 using the inertial mass of a rotating body 30 as an inertial mass body. The vehicle vibration reducing apparatus 1 according to this embodiment can be also used as an energy storage device.

Here, the power train 3 of the vehicle 2 includes an engine 4 as an internal combustion engine which is a running power source that generates rotational power for causing the vehicle 2 to run and a power transmission device (transmission) 5 that transmits the rotational power generated by the engine 4 from the engine 4 to driving wheels 9 via a damper 6 or the like. The power transmission device 5 includes a damper 6, a transmission 7, and a differential gear 8. In the power transmission device 5, the rotational power generated by the engine 4 is transmitted to the damper 6 and the rotational power transmitted to the damper 6 is transmitted to the transmission 7. The power transmission device 5 can change the rotational power from the engine 4 step by step, for example, using the transmission 7 and can transmit the changed rotational power to the driving wheels 9 of the vehicle 2. The engine 4, the transmission 7, and the like are controlled by an ECU 10 as a first control device.

Therefore, in the vehicle 2, when a crank shaft 4a as an engine output shaft of the engine 4 is rotationally driven, the drive force is input to the transmission 7 via the damper 6 and the like, is shifted by the transmission, and is then transmitted to the driving wheels 9 via the differential gear 8 and the like. Accordingly, the vehicle 2 can move forward or backward by the rotation of the driving wheels 9. The vehicle 2 includes a brake 11 that generates a braking force in the vehicle 2 in response to a braking operation as a brake request operation from a driver. The vehicle 2 can be decelerated or stopped by the braking force generated by the brake 11.

Here, the transmission 7 changes a transmission gear ratio (transmission stage) depending on a running state of the vehicle 2. The transmission 7 is disposed in a power transmission path from the engine 4 to the driving wheels 9 and can change rotational power transmitted from the engine 4 to the driving wheels 9 and output the changed rotation power. The power transmitted to the transmission 7 is shifted at a predetermined transmission gear ratio (=input speed/ output speed) by the transmission 7 and is then transmitted to the driving wheels 9. The transmission 7 may be a so-called manual transmission (MT) or a so-called automatic transmission such as a stepped automatic transmission (AT), a continuously-variable automatic transmission (CVT), a multi-mode manual transmission (MMT), a sequential manual transmission (SMT), and a dual clutch transmission (DCT). Here, the transmission 7 employs, for example, a stepped automatic transmission and the operation thereof is controlled via an oil pressure control device or the like by the ECU 10.

More specifically, the transmission 7 changes the rotational power input to a transmission input shaft (input shaft) 12 from the engine 4 via the damper 6 or the like and outputs the changed rotational power from a transmission output shaft (output shaft) 13. The transmission input shaft 12 is a rotating member to which the rotational power from the engine 4 is input in the transmission 7. The transmission output shaft 13 is a rotating member that outputs the rotational power to the driving wheels 9 in the transmission 7. The transmission input shaft 12 is supplied with power from the engine 4 and is rotatable about a rotation axis line X1. The transmission output shaft 13 is supplied with the changed power from the engine 4 and is rotatable about a rotation axis line X2 parallel to the rotation axis line X1. The transmission 7 includes plural transmission stages (gear steps) 71, 72, 73, and 74 to which predetermined transmission gear ratios are allocated. In the transmission 7, one of the plural transmission stages 71, 72, 73, and 74 is selected by a gear shift mechanism 75 including a synchronous engagement mechanism, and the power input to the transmission input shaft 12 is shifted by the selected one of the transmission stages 71, 72, 73, and 74 and is output from the transmission output shaft 13 to the driving wheels 9.

The ECU 10 is an electronic circuit having a microcomputer as a major element and including a CPU, a ROM, a RAM, and an interface. The ECU 10 receives electric signals corresponding to various detection results and controls the engine 4, the transmission 7, the brake 11, and the like on the basis of the input detection results. Here, the power transmission device 5 including the transmission 7 and the brake 11 are hydraulic devices that operate with a pressure of operating oil (oil pressure) as a medium, and the ECU 10 controls the operations thereof through the use of an oil pressure control device or the like. The ECU 10 controls a throttle device of the engine 4, for example, on the basis of an accelerator opening, a vehicle speed, and the like, adjusts a throttle opening of an intake passage, adjusts an amount of air suctioned to control an amount of fuel injected in accordance with the variation thereof, and adjusts an amount of fuel-air mixture with which a combustion chamber is charged to control the output power of the engine 4. The ECU 10 controls the oil pressure control device, for example, on the basis of the acceleration opening and the vehicle speed and controls the transmission stage (transmission gear ratio) of the transmission 7.

The vehicle vibration reducing apparatus 1 according to this embodiment includes a vibration reducing apparatus body 20 including a rotating body 30 as an inertial mass body, a first clutch (first engagement device) 41, a second clutch (second engagement device) 42, and a third clutch (third engagement device) 43 as plural engagement devices, and an ECU 10 that controls the vibration reducing apparatus body 20, the first clutch 41, the second clutch 42, and the third clutch 43. The vehicle vibration reducing apparatus 1 can connect the rotating body 30 to the crank shaft 4a of the engine 4 or the rotation shaft of the power transmission device 5 constituting a drive system, that is, the transmission input shaft 12 by appropriately switching the operating states thereof depending on driving conditions. Accordingly, the vehicle vibration reducing apparatus 1 can properly reduce vibration in the power train 3.

Here, the vehicle vibration reducing apparatus 1 can selectively use a first path 44 and a second path 45 as a transmission path of power to the rotating body 30, that is, a connection path of the rotating body 30, by appropriately switching the operating states of the first clutch 41, the second clutch 42, and the third clutch 43 depending on the driving conditions. The first path 44 is a power transmission path in which the engine 4, the power transmission device 5, and the rotating body 30 are connected in this order via the first clutch 41 and the second clutch 42. Meanwhile, the second path 45 is a power transmission path which is different from the first path 44 and in which the engine 4 and the rotating body 30 are directly connected and disconnected via the third clutch 43. That is, the second path 45 is a path in which the rotating body 30 is directly connected to the engine 4 without passing through the first clutch 41, the power transmission device 5, the second clutch 42, and the like by bypassing them.

The vehicle vibration reducing apparatus 1 according to this embodiment typically adjusts the inertial mass of the driving side or the driven side and changes vibration reduction characteristics of the vibration reducing apparatus body 20 by switching the power transmission path to the first path 44 and the second path 45 depending on the state of the power train 3 to switch the connection state of the rotating body 30 by the control of the ECU 10. Accordingly, the vehicle vibration reducing apparatus 1 can optimize balance between the inertial mass of the driving side (the power source side) upstream from the damper spring 6a of the damper 6 and the inertial mass of the driven side (the driving wheel side) downstream from the damper spring 6a depending on the operating state, and thus can lower the resonance frequency of the driven side. Accordingly, the vehicle vibration reducing apparatus 1 can lower the resonance points (the resonance point of the power train 3) of the driving side and the driven side which vary depending on the driving condition of the speed of the engine 4 or the engine torque, thereby effectively suppressing the resonance. The vehicle vibration reducing apparatus 1 can achieve stabilization of idling, a decrease in energy loss at the time of start, and the like in addition to the decrease in vibration by switching the power transmission path to the first path 44 and the second path 45 depending on the driving condition of the vehicle 2, thereby achieving improvement in fuel efficiency.

The constituents of the vehicle vibration reducing apparatus 1 will be described below in detail with reference to FIG. 1.

Specifically, the vibration reducing apparatus body 20 includes the rotating body 30 as the inertial mass body for controlling the resonance point and the rotation shaft 50 of the rotating body 30.

The rotating body 30 is disposed in parallel to the power transmission path of the power transmission device 5 from the engine 4 to the driving wheels 9. The rotating body 30 is formed in an annular disc shape and is coupled to the rotation shaft 50 so as to be rotatable as a unified body therewith. The rotating body 30 is disposed coaxially with the rotation axis line X1 and is rotatable about the rotation axis line X1 with power transmitted thereto. The rotating body 30 is selectively connected to the crank shaft 4a or the transmission input shaft 12 via the first clutch 41, the second clutch 42, the third clutch 43, and the like so as to enable power transmission. The rotating body 30 serves as an inertial mass body, that is, as an inertial mass member for generating an inertial moment.

The rotating body 30 according to this embodiment serves as an inertial mass body for controlling the resonance point and also serves as a so-called flywheel that accumulates the transmitted rotational power as inertial energy. Accordingly, the vibration reducing apparatus body 20 of the vehicle vibration reducing apparatus 1 is also used as an energy accumulating device of the vehicle 2. That is, in the vehicle vibration reducing apparatus 1, the rotating body 30 serves as both the inertial mass body and the flywheel, the rotating body 30 rotates with transmitted power, and the rotational power transmitted to the rotating body 30 can be accumulated as inertial energy. Accordingly, the vehicle vibration reducing apparatus 1 can achieve both a decrease in vibration and improvement in fuel efficiency.

The rotation shaft 50 is disposed coaxially with the rotation axis line X1 and is rotatable about the rotation axis line X1 with transmitted power. As described above, the rotating body 30 is coupled to one end of the rotation shaft 50 so as to be rotatable as a unified body therewith and the second clutch 42 and the third clutch 43 are connected to the other end thereof.

The first clutch 41 is a starting clutch and can be switched between a state where the engine 4 and the damper 6 of the power transmission device 5 engage with each other so as to enable power transmission and a state where the engagement is released. The first clutch 41 is disposed between the engine 4 and the damper 6 in the power transmission path. The damper 6 is disposed between the first clutch 41 and the transmission 7 in the power transmission path. The first clutch 41 can employ various clutches and, for example, a frictional disk clutch device such as a wet multi-disk clutch or a dry single-disk clutch can be used. Here, the first clutch 41 is, for example, a hydraulic device that operates with a clutch oil pressure as an oil pressure of operating oil.

The first clutch 41 can be switched to an engaged state where a rotation member 41a on the engine 4 side and a rotation member 41b on the damper 6 side engage with each other so as to enable power transmission and the engine 4 and the damper 6 engage with each other so as to enable power transmission and a disengaged state where the engagement is released. By switching the first clutch 41 to the engaged state, the rotation member 41a and the rotation member 41b are connected to each other to transmit power between the engine 4 and the damper 6. On the other hand, by switching the first clutch 41 to the disengaged state, the rotation member 41a and the rotation member 41b are separated from each other to stop the power transmission between the engine 4 and the damper 6. The first clutch 41 is switched to the disengaged state where the engagement is released when an engagement force for causing the rotation member 41a and the rotation member 41b to engage with each other is 0, and is changed to a completely-engaged state through a semi-engaged state (slip state) as the engagement force increases.

Here, the rotation member 41a is a member that rotates as a unified body along with a hollow cylindrical intermediate shaft 51 coupled to the crank shaft 4a so as to be rotatable as a unified body therewith. On the other hand, the rotation member 41b is a member that rotates as a unified body along with a holding member 6b holding the damper spring 6a of the damper 6. The intermediate shaft 51 is disposed coaxially with the rotation axis line X1 and is rotatable about the rotation axis line X1 with power transmitted thereto. The holding member 6b is a member that holds the damper spring 6a between the holding member 6b and a holding member 6c coupled to the transmission input shaft 12 so as to be rotatable as a unified body therewith. The damper 6 is held to interpose the damper spring 6a between the holding member 6b and the holding member 6c in the rotation direction (the circumferential direction around the rotation axis line X1). The damper spring 6a of the damper 6 is elastically deformed depending on the magnitude of the power transmitted between the holding member 6b and the holding member 6c. For example, the operation of the first clutch 41 is controlled through the use of an oil pressure control device or the like by the ECU 10.

The second clutch 42 is a clutch for transmission/flywheel connection and can be switched to a state where the power transmission device 5 and the rotating body 30 engage with each other so as to enable power transmission in a power transmission path different from that of the first clutch 41 and a state where the engagement is released. The second clutch 42 is disposed between the transmission 7 of the power transmission device 5 and the rotating body 30 in the power transmission path. The second clutch 42 causes the transmission 7 and the rotating body 30 to engage with each other so as to enable power transmission without passing through the first clutch 41 by bypassing the first clutch 41. Here, the second clutch 42 can be switched to a state where the transmission input shaft 12 and the rotating body 30 engage with each other so as to enable power transmission and a state where the engagement is released. The second clutch 42 can employ various clutches similarly to the first clutch 41.

The second clutch 42 can be switched to an engaged state where a rotation member 42a on the transmission input shaft 12 side and a rotation member 42b on the rotating body 30 side engage with each other so as to enable power transmission and the transmission input shaft 12 and the rotating body 30 engage with each other so as to enable power transmission and a disengaged state where the engagement is released. By switching the second clutch 42 to the engaged state, the rotation member 42a and the rotation member 42b are connected to each other to transmit power between the transmission input shaft 12 and the rotating body 30. On the other hand, by switching the second clutch 42 to the disengaged state, the rotation member 42a and the rotation member 42b are separated from each other to stop the power transmission between the transmission input shaft 12 and the rotating body 30. The second clutch 42 is switched to the disengaged state where the engagement is released when an engagement force for causing the rotation member 42a and the rotation member 42b to engage with each other is 0, and is changed to a completely-engaged state through a semi-engaged state (slip state) as the engagement force increases.

Here, the rotation member 42a is a member that rotates as a unified body along with a hollow cylindrical intermediate shaft 52 coupled to the transmission input shaft 12 so as to be rotatable as a unified body therewith. On the other hand, the rotation member 42b is a member that rotates as a unified body along with a hollow cylindrical intermediate shaft 53 coupled to the rotation shaft 50 so as to be rotatable as a unified body therewith. The intermediate shaft 52 and the intermediate shaft 53 are disposed coaxially with the rotation axis line X1 and are rotatable about the rotation axis line X1 with power transmitted thereto. For example, the operation of the second clutch 42 is controlled through the use of an oil pressure control device or the like by the ECU 10.

The third clutch 43 is a clutch for engine/flywheel connection and can be switched to a state where the engine 4 and the rotating body 30 engage with each other so as to enable power transmission in a power transmission path different from those of the first clutch 41 and the second clutch 42 and a state where the engagement is released. The third clutch 43 is disposed between the engine 4 and the rotating body 30 in the power transmission path. The third clutch 43 causes the engine 4 and the rotating body 30 to engage with each other so as to enable power transmission without passing through the first clutch 41 and the second clutch 42 by bypassing the first clutch 41 and the second clutch 42. Here, the third clutch 43 can be switched to a state where the crank shaft 4a and the rotating body 30 engage with each other so as to enable power transmission and a state where the engagement is released. The third clutch 43 can employ various clutches similarly to the first clutch 41 and the second clutch 42.

The third clutch 43 can be switched to an engaged state where a rotation member 43a on the crank shaft 4a side and a rotation member 43b on the rotating body 30 side engage with each other so as to enable power transmission and the crank shaft 4a and the rotating body 30 engage with each other so as to enable power transmission and a disengaged state where the engagement is released. By switching the third clutch 43 to the engaged state, the rotation member 43a and the rotation member 43b are connected to each other to transmit power between the crank shaft 4a and the rotating body 30. On the other hand, by switching the third clutch 43 to the disengaged state, the rotation member 43a and the rotation member 43b are disconnected from each other to stop the power transmission between the crank shaft 4a and the rotating body 30. The third clutch 43 is switched to the disengaged state where the engagement is released when an engagement force for causing the rotation member 43a and the rotation member 43b to engage with each other is 0, and is changed to a completely-engaged state through a semi-engaged state (slip state) as the engagement force increases.

Here, the rotation member 43a is a member that rotates as a unified body along with a cylindrical intermediate shaft 54 coupled to the crank shaft 4a so as to be rotatable as a unified body therewith. On the other hand, the rotation member 43b is a member that rotates as a unified body along with the rotation shaft 50. The intermediate shaft 54 is disposed coaxially with the rotation axis line X1 and is rotatable about the rotation axis line X1 with power transmitted thereto. The intermediate shaft 54 is disposed to be inserted into hollow parts such as the hollow cylindrical intermediate shaft 51, the transmission input shaft 12, the intermediate shaft 52, and the intermediate shaft 53, the crank shaft 4a is coupled to one end thereof, and the rotation member 43a is coupled to the other end thereof so as to be rotatable as a unified body therewith. For example, the operation of the third clutch 43 is controlled through the use of an oil pressure control device or the like by the ECU 10.

In the vehicle vibration reducing apparatus 1 having the above-mentioned configuration, the first clutch 41 and the second clutch 42 are switched to the engaged state and the third clutch 43 is switched to the disengaged state to set up the first path 44. In this case, the rotating body 30 is connected to the transmission input shaft 12. As a result, the vibration reducing apparatus body 20 can connect the rotating body 30 to the power transmission device 5 and can add the inertial mass of the rotating body 30 to the inertial mass of the driven side (driving wheel side) downstream from the damper spring 6a. At this time, the rotational power transmitted from the engine 4 side or the driving wheel 9 side to the transmission input shaft 12 is input (transmitted) to the rotation shaft 50 sequentially through the intermediate shaft 52, the second clutch 42, the intermediate shaft 53, and the like and is transmitted to the rotating body 30.

In the vehicle vibration reducing apparatus 1, at least the second clutch 42 is switched to the disengaged state and the third clutch 43 is switched to the engaged state to set up the second path 45. In this case, the rotating body 30 is directly connected to the crank shaft 4a. As a result, the vibration reducing apparatus body 20 can connect the rotating body 30 to the engine 4 and can add the inertial mass of the rotating body 30 to the inertial mass of the driving side (power source side) upstream from the damper spring 6a. At this time, the rotational power transmitted from the engine 4 side to the intermediate shaft 54 is input (transmitted) to the rotation shaft 50 via the third clutch 43 and is then transmitted to the rotating body 30, and transmission of the rotational power from the transmission input shaft 12 side to the rotating body 30 side is blocked by the second clutch 42.

The vehicle vibration reducing apparatus 1 may be set to a state where any of the first path 44 and the second path 45 is not selected, that is, a state where the rotating body 30 is detached from any of the engine 4 and the power transmission device 5, by switching both the second clutch 42 and the third clutch 43 to the disengaged state.

The ECU 10 according to this embodiment controls the first clutch 41, the second clutch 42, and the third clutch 43 depending on the driving conditions of the vehicle 2.

The ECU 10 receives electrical signals corresponding to the detection results detected by various sensors such as an accelerator opening sensor 60, a throttle opening sensor 61, a vehicle speed sensor 62, an engine speed sensor 63, an input shaft speed sensor 64, a rotating body speed sensor 65, and a brake sensor 66. The accelerator opening sensor 60 detects a degree of accelerator opening which is a degree of operation on an accelerator pedal (a degree of accelerator operation) by a driver. The throttle opening sensor 61 detects a degree of throttle opening of the engine 4. The vehicle speed sensor 62 detects a vehicle speed which is a running speed of the vehicle 2. The engine speed sensor 63 detects an engine speed corresponding to the rotation speed of the crank shaft 4a. The input shaft speed sensor 64 detects an input shaft rotation speed of the transmission input shaft 12 of the transmission 7. The rotating body speed sensor 65 detects a rotation speed of the rotation shaft 50 of the rotating body 30. The brake sensor 66 detects a degree of operation on a brake pedal (a degree of brake operation) by the driver, for example, a master cylinder pressure.

The ECU 10 controls the engine 4, the transmission 7, the first clutch 41, the second clutch 42, and the third clutch 43 on the basis of the input detection results. The ECU 10 can detect ON/OFF of an accelerator operation which is an acceleration request operation on the vehicle 2 by a driver, for example, on the basis of the detection result of the accelerator opening sensor 60. The ECU 10 can detect ON/OFF of a brake operation which is a braking request operation on the vehicle 2 by the driver, for example, on the basis of the detection result of the brake sensor 66.

It is preferable that the ECU 10 in this embodiment control the first clutch 41 and the second clutch 42 to the disengaged state and control the third clutch 43 to the engaged state when the engine 4 is in an idling operation state such as after the engine 4 is started. Here, the idle (idling) operating state of the engine 4 is an operation of operating the engine 4 to a lowest speed close to a no-load state and is, for example, a self-sustaining operation of causing the energy generated in the engine 4 to countervail against the friction generated in the engine while driving auxiliary devices to the minimum necessary degree, or the like.

Accordingly, in the vehicle vibration reducing apparatus 1, the second path 45 out of the first path 44 and the second path 45 is selected when the engine 4 is in the idling operation state. As a result, in the vehicle vibration reducing apparatus 1, the rotating body 30 of the vibration reducing apparatus body 20 is directly connected to the crank shaft 4a without passing through the power transmission device 5 or the like and the rotating body 30 serves as an inertial mass of the engine 4. Accordingly, the vehicle vibration reducing apparatus 1 can relatively increase the inertial mass of the engine 4 in the idling operation by the inertial mass corresponding to the flywheel and thus can stabilize the idling. Therefore, the vehicle vibration reducing apparatus 1 can relatively decrease the idling rotation speed (the engine speed in the idling operation) while maintaining the stable idling, thereby improving fuel efficiency. In the vehicle vibration reducing apparatus 1, the rotating body 30 serves as a flywheel in this state, and the rotational power transmitted to the rotating body 30 can be accumulated as inertial energy in the rotating body 30, the rotation fluctuation can also be absorbed, thereby reducing the NVH. In the vehicle vibration reducing apparatus 1, the speed of the rotating body 30 increases to the speed equivalent to the engine speed in this state.

The ECU 10 can control all of the first clutch 41, the second clutch 42, and the third clutch 43 to the disengaged state before the engine 4 is started, and can control the third clutch 43 to the engaged state after the engine 4 is started. In this case, the vehicle vibration reducing apparatus 1 can relatively decrease the inertial mass cranked at the time of starting of the engine 4, can decrease the cranking torque necessary for starting, and can decrease the torque capacity of, for example, a start motor, thereby achieving a decrease in size.

For example, when the accelerator operation by a driver is detected and the vehicle 2 is started, it is preferable that the ECU 10 control the first clutch 41 to the engaged state from the state where the first clutch 41 and the second clutch 42 are in the disengaged state and the third clutch 43 is in the engaged state as described above. That is, the ECU 10 controls the first clutch 41 to the engaged state from the state where the first clutch 41 and the second clutch 42 are in the disengaged state and the third clutch 43 is in the engaged state, and starts the vehicle 2.

Accordingly, the vehicle vibration reducing apparatus 1 can reduce energy loss at the time of starting of the vehicle 2 as will be described below. That is, in the vehicle vibration reducing apparatus 1, the speed of the rotating body 30 is equivalent to the engine speed as described above, in the state where the first clutch 41 and the second clutch 42 are in the disengaged state and the third clutch 43 is in the engaged such as when the engine 4 is in the idling operation state. Accordingly, in the vehicle vibration reducing apparatus 1, the speed of the rotating body 30 is already equivalent to the engine speed before starting engagement of the first clutch 41 at the time of starting the vehicle 2 in this state. Accordingly, the vehicle vibration reducing apparatus 1 can relatively decrease the inertial mass on the driven side in which the rotation speed should be increased by the clutch transmission torque based on the slip control of the first clutch 41, by the inertial mass of the rotating body 30, in the course of switching the first clutch 41 from the disengaged state to the completely-engaged state. As a result, the vehicle vibration reducing apparatus 1 can suppress start clutch slip loss (thermal loss) generated when the first clutch 41 is in the semi-engaged state (slip state) in the course of switching the first clutch 41 to the completely-engaged state. That is, in the vehicle vibration reducing apparatus 1, since the speed of the rotating body 30 is equivalent to the engine speed before starting engagement of the first clutch 41, it is possible to reduce the start clutch slip loss in the first clutch 41 by the increase in the speed of the rotating body 30 at the time of starting of the vehicle 2.

FIGS. 2 and 3 schematically illustrate an example of the operation of the vehicle vibration reducing apparatus 1. In FIGS. 2 and 3, the horizontal axis represents the time axis and the vertical axis represents the engine speed and the engine torque. Here, the energy (power) generated from the engine 4 can be calculated as a value corresponding to engine output torque×engine speed. FIG. 2 schematically illustrates energy for increasing the speed of the inertial mass body on the driven side such as the power transmission device 5 and the driving wheels 9 in the vehicle vibration reducing apparatus 1, and FIG. 3 schematically illustrates energy for increasing the speed of the rotating body 30 in the vehicle vibration reducing apparatus 1.

Briefly speaking, the engine output torque generated from the engine 4 is used as an engine torque Te1 (see FIG. 2) which is a torque component transmitted to the power transmission device 5, the driving wheels 9, and the like so as to drive them and an engine torque Te2 (see FIG. 3) which is a torque component transmitted to the rotating body 30 via the second path 45 so as to rotate the rotating body 30 (engine output torque=Te1+Te2).

The energy based on the engine torque Te1 is consumed as vehicle start use-corresponding energy, start loss-corresponding energy, and the like. Here, the vehicle start use-corresponding energy is energy for increasing the speed of the inertial mass body on the driven side such as the power transmission device 5 and the driving wheels 9, that is, energy used to start the vehicle 2 (see area A1 in FIG. 2). On the other hand, the start loss-corresponding energy is energy corresponding to thermal loss caused depending on the differential speed between the rotation member 41a and the rotation member 41b by switching the first clutch 41 to the slip state due to the inertial mass on the driven side such as the power transmission device 5 and the driving wheels 9 (see area A2 in FIG. 2). The start loss-corresponding energy is generated in a period from time t11 at which the engagement of the first clutch 41 is started to time t12 at which the first clutch is in the completely-engaged state. The energy consumption based on the engine torque Te1 is almost the same when the first path 44 is selected at the time of starting of the vehicle 2 and when the second path 45 is selected.

On the other hand, the energy based on the engine torque Te2 is consumed as flywheel accumulation-corresponding energy, flywheel loss-corresponding energy, and the like when the first path 44 is selected at the time of starting of the vehicle 2, that is, when the rotating body 30 of the vibration reducing apparatus body 20 is connected to the transmission input shaft 12 of the transmission 7. Here, the flywheel accumulation-corresponding energy is energy for increasing the speed of the rotating body 30, that is, rotational energy accumulated in the rotating body 30 (see area B1 on the left side of FIG. 3). On the other hand, the flywheel loss-corresponding energy is energy corresponding to thermal loss caused depending on the differential speed between the rotation member 41a and the rotation member 41b by switching the first clutch 41 to the slip state due to the inertial mass of the rotating body 30 (see area B2 on the left side of FIG. 3). The flywheel loss-corresponding energy is generated in a period from time t21 at which the engagement of the first clutch 41 is started to time t22 at which the first clutch is in the completely-engaged state.

On the contrary, in the vehicle vibration reducing apparatus 1 according to this embodiment, the rotating body 30 is directly connected to the crank shaft 4a by selecting the second path 45 at the time of starting of the vehicle 2. Accordingly, in the vehicle vibration reducing apparatus 1, since the rotating body 30 rotates already at the speed equivalent to the engine speed as described above, the flywheel loss-corresponding energy is not generated in the period from time t21 at which the engagement of the first clutch 41 is started to time t22 at which the first clutch is in the completely-engaged state (see the right side of FIG. 3). As a result, the vehicle vibration reducing apparatus 1 can consume most of the energy generated from the engine 4 as the flywheel accumulation-corresponding energy in the period from time t21 at which the engagement of the first clutch 41 is started to time t22 at which the first clutch is in the completely-engaged state (see area B1 on the right side of FIG. 3), that is, can accumulate the energy as the rotational energy in the rotating body 30.

in the vehicle vibration reducing apparatus 1, for example, when the engine 4 is in the idling operation state after the engine 4 is started at time t23 prior to time t21, the third clutch 43 is controlled to the engaged state as described above. At this time, the energy generated when the engine 4 is in the idling operation state is consumed as idling flywheel accumulation-corresponding energy, idling flywheel loss-corresponding energy, and the like. Here, the idling flywheel accumulation-corresponding energy is energy for increasing the speed of the rotating body 30 when the engine 4 is in the idling operation state, that is, rotational energy accumulated in the rotating body 30 (see area B3 on the right side of FIG. 3). The idling flywheel loss-corresponding energy is energy corresponding t to thermal loss generated depending on the differential speed between the rotation member 43a and the rotation member 43b by switching the third clutch 43 to the slip state due to the inertial mass of the rotating body 30 in the course of switching the third clutch 43 to the completely-engaged state (see area B4 on the right side of FIG. 3). The idling flywheel loss-corresponding energy is generated in a period from time t24 at which the engagement of the third clutch 43 is started to time t21 at which the third clutch is in the completely-engaged state (here, also the time at which the engagement of the first clutch 41 is started). In this case, the idling flywheel loss-corresponding energy (see area B4 on the right side of FIG. 3) is sufficiently smaller than the flywheel loss-corresponding energy (see area B2 on the left side of FIG. 3).

Therefore, in the vehicle vibration reducing apparatus 1, the rotating body 30 rotates already at the speed equivalent to the engine speed when the first clutch 41 is made to engage at the time of starting. Accordingly, it is possible to suppress the start clutch slip loss in the first clutch 41 corresponding to the increase in the speed of the rotating body 30. As a result, the vehicle vibration reducing apparatus 1 can reduce energy loss at the time of starting of the vehicle 2 and improve the start efficiency, thereby improving the fuel efficiency.

The ECU 10 performs the following control when the vehicle 2 is started in the state where the first clutch 41 and the second clutch 42 are in the disengaged state and the third clutch 43 is in the engaged state. That is, the ECU 10 controls the first clutch 41 to the engaged state and controls the third clutch 43 to the disengaged state and controls the second clutch 42 to the engaged state after the engagement of the first clutch 41 is completed.

Accordingly, in the vehicle vibration reducing apparatus 1, the power transmission path can be switched between the first path 44 and the second path 45 by switching the second clutch 42 to the engaged state and switching the third clutch 43 to the disengaged state after the rotation speed of the crank shaft 4a and the rotation shaft 50 is synchronized with (equivalent to) the rotation speed of the transmission input shaft 12. Therefore, in the vehicle vibration reducing apparatus 1, the second clutch 42 and the third clutch 43 can be switched without any shock, so that the state where the second path 45 is selected can be switched to the state where the first path 44 is selected. As a result, in the vehicle vibration reducing apparatus 1, the state where the rotating body 30 of the vibration reducing apparatus body 20 is connected to the engine 4 and the inertial mass of the rotating body 30 is added to the inertial mass on the driving side can be switched to the state where the rotating body 30 is connected to the power transmission device 5 and the inertial mass of the rotating body 30 is added to the inertial mass on the driven side. Accordingly, the vehicle vibration reducing apparatus 1 can optimize the balance between the inertial mass on the driving side (power source side) upstream from the damper spring 6a of the damper 6 and the inertial mass on the driven side (driving wheel side) downstream from the damper spring 6a depending on the operating state. Thus, the vehicle vibration reducing apparatus 1 can decrease the resonance points (the resonance point of the power train 3) on the driving side and the driven side which vary depending on the operating state such as the speed or the engine torque of the engine 4 and thus can effectively suppress the resonance. As a result, the vehicle vibration reducing apparatus 1 can adjust the resonance point of the power train 3 and can decrease the NVH to the allowable range. Accordingly, the vehicle vibration reducing apparatus 1 can suppress vibration based on first engine explosion generated in the power train 3 and thus to achieve a decrease in vibration noise and improvement in the fuel efficiency.

A control example of the ECU 10 will be described below with reference to the flowchart of FIG. 4.

In a start mode (start control) of the vehicle 2, first, the ECU 10 starts the engine 4 on the basis of a driver's operation or the like (ST1).

Then, the ECU 10 controls the engine 4 and controls the engine speed to a predetermined idling rotation speed as the idling rotation control (ST2).

Then, the ECU 10 determines whether the engine speed reaches the idling rotation speed (ST3). The ECU 10 determines whether a relationship between the engine speed Ne detected by the engine speed sensor 63 and a predetermined target idling rotation speed Ni satisfies a determination expression expressed by Expression (1), for example, on the basis of the detection result detected by the engine speed sensor 63 or the like. In Expression (1), "α" represents an predetermined error range between the target idling rotation speed Ni and the engine speed Ne.

$$Ne > Ni - \alpha \quad (1)$$

When it is determined that the relationship between the engine speed Ne and the target idling rotation speed Ni does not satisfy the determination expression expressed by Expression (1) (NO in ST3), that is, when it is determined that the engine speed does not reach the idling rotation speed, the ECU 10 returns to ST2 and repeatedly performs the subsequent processes thereof.

When it is determined that the relationship between the engine speed Ne and the target idling rotation speed Ni satisfies the determination expression expressed by Expression (1) (YES in ST3), that is, when it is determined that the engine speed reaches the idling rotation speed, the ECU 10 controls the third clutch 43 to the engaged state (ST4). Accordingly, in the vehicle vibration reducing apparatus 1, the rotating body 30 is directly connected to the crank shaft 4a. At this time, the first clutch 41 and the second clutch 42 are in the disengaged state.

Then, the ECU 10 determines whether the engagement of the third clutch 43 is completed (ST5). The ECU 10 determines whether a relationship between the engine speed Ne detected by the engine speed sensor 63 and the speed Nf of the rotation shaft 50 detected by the rotating body speed sensor 65 satisfies a determination expression expressed by Expression (2), for example, on the basis of the detection results of the engine speed sensor 63 and the rotating body speed sensor 65 and the like. In Expression (2), "β" represents a predetermined error range between the engine speed Ne and the speed Nf of the rotation shaft 50.

$$Ne - Nf < \beta \quad (2)$$

When it is determined that the relationship between the engine speed Ne and the speed Nf of the rotation shaft 50 does not satisfy the determination expression expressed by Expression (2) (NO in ST5), that is, when it is determined that the engagement of the third clutch 43 is not completed, the ECU 10 returns to ST4 and repeatedly performs the subsequent processes thereof.

When it is determined that the relationship between the engine speed Ne and the speed Nf of the rotation shaft 50 satisfies the determination expression expressed by Expression (2) (YES in ST5), that is, when it is determined that the rotation speed of the intermediate shaft 54 is synchronized with the rotation speed of the rotation shaft 50 and the engagement of the third clutch 43 is completed, the ECU 10 reads a degree of throttle opening θ on the basis of the detection result of the throttle opening sensor 61 or the like (ST6). The ECU 10 may read the degree of accelerator opening and perform the following processes on the basis of the detection result of the accelerator opening sensor 60 or the like instead of the degree of throttle opening θ.

Then, the ECU 10 determines whether the degree of throttle opening θ is greater than 0 on the basis of the degree of throttle opening θ read in ST6 (ST7). When it is determined that the degree of throttle opening θ is equal to or less than 0 (NO in ST7), the ECU 10 returns to ST6 and repeatedly performs the subsequent processes.

When it is determined that the degree of throttle opening θ is greater than 0 (YES in ST7), the ECU 10 controls the engine 4 so as to increase the engine speed to the engagement speed of the first clutch 41 (ST8). Here, the engagement speed of the first clutch 41 is a rotation speed set on the basis of the degree of throttle opening θ and is a rotation speed when the first clutch 41 is made to engage. The engagement speed of the first clutch 41 is stored as a map (not illustrated) relevant to the degree of throttle opening θ or a mathematical model in advance in a storage unit of the ECU 10. The ECU 10 calculates the engagement speed corresponding to the degree of throttle opening θ from the map or the mathematical model on the basis of the degree of throttle opening θ read in ST6.

The ECU 10 controls the first clutch 41 to the engaged state while controlling the engine 4 so as to maintain the engine speed at the engagement speed (ST9).

After the rotation speed of the crank shaft 4a and the rotation shaft 50 is synchronized with the rotation speed of the transmission input shaft 12 and the engagement of the first clutch 41 is completed, the ECU 10 controls the second clutch 42 and the third clutch 43 so as to switch the second clutch 42 and the third clutch 43 (ST10) and ends the start mode (start control). Accordingly, the vehicle vibration reducing apparatus 1 is switched from the state where the second path 45 is selected to the state where the first path 44 is selected.

An example of the operation of the vehicle vibration reducing apparatus 1 will be described below with reference to the timing diagram of FIG. 5. In FIG. 5, the horizontal axis represents the time axis and the vertical axis represents the torque and the rotation speed. In FIG. 5, solid line L1 indicates an engine output torque, solid line L2 indicates an engine speed, one-dot chained line L3 indicates an engine speed-increasing torque component of the engine output torque, dotted line L4 indicates a vehicle-driving torque component of the engine output torque, one-dot chained line L5 indicates an input shaft speed of the transmission input shaft 12, and two-dot chained line L6 indicates a rotating body speed of the rotating body 30 (the rotation shaft 50).

In the vehicle vibration reducing apparatus 1, when the engine 4 is started at time t31 at which the first clutch 41, the second clutch 42, and the third clutch 43 are disengaged, the engine speed is controlled to be the target idling rotation speed Ni and the engagement of the third clutch 43 is started at time t32. The rotating body speed increases with the engagement operation of the third clutch 43, and is equivalent to the engine speed when the engagement of the third clutch 43 is completed at time t33. At this time, the engine speed is set to be slightly lower than the target idling rotation speed before the engagement of the third clutch 43, and the engine output torque is also slightly decreased.

When the accelerator operation is turned on by a driver at time t34, the engine output torque increases and the engine speed and the rotating body speed increase accordingly by the operation of the engine speed-increasing torque component of the engine output torque therewith.

In the vehicle vibration reducing apparatus 1, when the engine speed and the rotating body speed reach the engagement speed Na based on the degree of throttle opening (the degree of accelerator opening) at time t35, the engagement of the first clutch 41 is started. Accordingly, the input shaft speed increases with the engagement operation of the first clutch 41 and thus the vehicle 2 is started by the operation of the engine speed-increasing torque component of the engine output torque through the use of the first clutch 41. When the engagement of the first clutch 41 is completed at time t36, the input shaft speed is equivalent to the engine speed and the rotating body speed.

In the vehicle vibration reducing apparatus 1, the ECU 10 controls the second clutch 42 and the third clutch 43 depending on the state of the vehicle 2 so as to be switched to the disengaged state, whereby the inertial mass body such as the rotating body 30 can be detached from the drive system. Accordingly, when the vehicle vibration reducing apparatus 1 is in the operating state in which it is not necessary to adjust the resonance point of the vibration reducing apparatus body 20 or the like, it is possible to decrease the inertial mass of the drive system if necessary and, for example, to improve acceleration performance of the vehicle 2.

In the above-mentioned vehicle vibration reducing apparatus 1 according to this embodiment, it is possible to selectively connect the rotating body 30 to the engine 4 or the power transmission device 5 by properly switching the operating states of the first clutch 41, the second clutch 42, and the third clutch 43 depending on the driving state. Accordingly, the vehicle vibration reducing apparatus 1 can optimize the balance between the inertial mass on the driving side and the inertial mass on the driven side depending on the driving state, and can lower the resonance point of the power train 3 which varies depending on the driving state to effectively suppress the resonance. In the vehicle vibration reducing apparatus 1, the rotating body 30 is used together as the inertial mass body and the flywheel by properly switching the operating states of the first clutch 41, the second clutch 42, and the third clutch 43 depending on the driving state, and it is thus possible to reduce vibration and to achieve stabilization of the idling and a decrease in energy loss at the time of starting. As a result, the vehicle vibration reducing apparatus 1 can achieve both the reduction in vibration and the improvement in fuel efficiency, thereby properly reducing the vibration.

In the above-mentioned vehicle vibration reducing apparatus 1 according to this embodiment, the first clutch 41, the second clutch 42, and the third clutch 43 are arranged to be coaxial with the rotation axis line X1 of the transmission input shaft 12 of the transmission 7 and the second clutch 42 can be switched to the state where the transmission input shaft 12 and the rotating body 30 engage with each other so as to enable power transmission and the state where both are disengaged from each other. Accordingly, the vehicle vibration reducing apparatus 1 can facilitate constructing the entire device body as a unified body with the transmission input shaft 12 of the transmission 7 and can set the transmission gear ratio of the rotational power or the rotation direction with a simple configuration when the rotational power is transmitted to the rotating body 30 via the first path 44 and when the rotational power is transmitted to the rotating body 30 via the second path 45. As a result, the vehicle vibration reducing apparatus 1 can have a simple configuration and, for example, it is possible to decrease manufacturing cost.

In the vehicle reducing apparatus 1, as illustrated in FIGS. 6 and 7, the vibration reducing apparatus body 20 may further include a rotation adjusting device 80. The rotation adjusting device 80 can adjust the rotation of the rotating body 30 and is disposed in the power transmission path to the rotating body 30. The rotation adjusting device 80 serves as a variable inertial mass device that variably controls the inertial mass of the rotating body 30 by adjusting the rotation of the rotating body 30. The rotation adjusting device 80 can accumulate the inertial energy in the rotating body 30 or discharge the inertial energy from the rotating body 30 by adjusting the rotation of the rotating body 30. FIG. 6 illustrates a configuration (rotation adjusting device 80A) using a planetary gear mechanism, a rotary electrical machine, and the like, and FIG. 7 illustrates a configuration (rotation adjusting device 80B) using a belt-type continuously-variable transmission and the like.

The rotation adjusting device 80A illustrated in FIG. 6 includes a planetary gear mechanism 81 and a rotation control device 82. The planetary gear mechanism 81 includes plural rotation elements that can differentially rotate and the rotating body 30 is disposed in any of the plural rotation elements. The rotation control device 82 controls the rotation of the rotation elements of the planetary gear mechanism 81. Accordingly, the rotation adjusting device 80A adjusts the rotation of the rotating body 30 so as to variably control the inertial mass of the rotating body 30.

In the rotation adjusting device 80A, one of the plural rotation elements of the planetary gear mechanism 81 in the transmission using the planetary gear mechanism 81 is an input element to which power from the engine 4 or the power transmission device 5 is input and another rotation element is a rotation control element. In this case, in the vibration reducing apparatus body 20, the planetary gear mechanism 81 of the rotation adjusting device 80A is attached between the rotation shaft 50 and the rotating body 30. In the vibration reducing apparatus body 20, the rotation elements of the planetary gear mechanism 81 or the rotating body 30 serves as an inertial mass body, that is, an inertial mass member for generating an inertial moment. In the below description, a case where the inertial mass of the inertial mass body is variable includes a case where an apparent inertial mass is set to be variable by setting the rotation of the inertial mass body to be variable as long as it is differently mentioned. In the vibration reducing apparatus body 20, the rotation shaft 50, the planetary gear mechanism 81, the rotation control device 82, and the rotating body 30 serve as an inertial mass body of a resonance point adjusting device as a whole.

Specifically, the rotation adjusting device 80A adjusts the rotation of the rotating body 30 so as to set the inertial mass of the rotating body 30 to be variable by changing the transmission gear ratio when the rotational power transmitted from the rotation shaft 50 to the rotating body 30 is shifted. The rotation adjusting device 80A according to this embodiment accumulates the inertial energy in the rotating body 30 or discharges the inertial energy from the rotating body 30 by changing the transmission gear ratio of the rotational power transmitted to the rotating body 30 and adjusting the rotation of the rotating body 30.

In the planetary gear mechanism 81, the rotation centers of the rotation elements that can differentially rotate are arranged to be coaxial with the rotation axis line X1 and the rotation elements are rotatable about the rotation axis line X1 with transmitted power. The planetary gear mechanism 81 is so-called single-pinion planetary gear mechanism and includes a sun gear 81S, a ring gear 81R, and a carrier 81C as the rotation elements. The sun gear 81S is an externally-toothed gear. The ring gear 81R is an internally-toothed gear arranged to be coaxial with the sun gear 81S. The carrier 81C holds the sun gear 81S, the ring gear 81R, and plural pinion gears 81P engaging with both so as to enable rotation and revolution. In the planetary gear mechanism 81 according to this embodiment, the carrier 81C is a first rotation element and corresponds to the input element, the sun gear 81S is a second rotation element and corresponds to the rotation control element, and the ring gear 81R is a third rotation element and corresponds to a flywheel element provided with the rotating body 30.

The carrier 81C is formed in an annular disk shape and supports the pinion gears 81P as externally-toothed gears on the pinion shaft so as to enable rotation and revolution. The carrier 81C constitutes an input member of the planetary gear mechanism 81. The carrier 81C is coupled to the rotation shaft 50 so as to be rotatable as a unified body therewith. The power transmitted to the rotation shaft 50 is transmitted (input) to the carrier 81C. The ring gear 81R is formed in an annular disk shape and has a gear formed on the inner circumferential surface thereof. The sun gear 81S is formed in a cylindrical shape and has a gear formed on the outer circumferential surface thereof. The ring gear 81R is coupled to the rotating body 30 so as to be rotatable as a unified body therewith, and the sun gear 81S is connected to a motor 83 of the rotation control device 82. Here, the rotating body 30 is formed in an annular disk shape and is coupled to the ring gear 81R so as to be rotatable about the rotation axis line X1 as a unified body therewith.

The rotation control device 82 is a device for controlling rotation of the rotation elements of the planetary gear mechanism 81 and includes a motor 83 as a speed control device and a battery 84. The motor 83 is connected to the sun gear 81S and controls the rotation of the sun gear 81S. In the motor 83, a stator as a fixed element is fixed to a case or the like and a rotor as a rotating element is disposed on the inner side in the radial direction of the stator and is coupled to the sun gear 81S so as to be rotatable as a unified body therewith. The motor 83 is a rotary electrical machine having a function of an electric motor (power running function) of converting the power supplied from the battery 84 via an inverter or the like into mechanical power and a function of a power generator (regeneration function) of converting the input mechanical power into electrical power and charging the battery 84 with the electrical power via an inverter. The motor 83 can control the rotation (speed) of the sun gear 81S by rotationally driving the rotor. The driving of the motor 83 is controlled by the ECU 10.

The rotation adjusting device 80A having the above-mentioned configuration can variably control the apparent inertial mass of the planetary gear mechanism 81 including the rotating body 30 as the inertial mass body by causing the ECU 10 to control the driving (braking) of the motor 83 of the rotation control device 82. The vehicle vibration reducing apparatus 1 having the rotation adjusting device 80A adjusts the inertial mass on the driving side or the driven side by changing the inertial mass of the planetary gear mechanism 81 including the rotating body 30.

At this time, in the vehicle vibration reducing apparatus 1, the ECU 10 controls more precise resonance point adjustment by controlling the driving of the motor 83 of the rotation control device 82, controlling the rotation of the planetary gear mechanism 81, and controlling the transmission gear ratio of the rotation adjusting device 80A. Accordingly, the vehicle vibration reducing apparatus 1 can properly set the inertial mass of the vibration reducing apparatus body 20 and can properly reduce vibration in a broader operation range.

That is, in the vehicle vibration reducing apparatus 1, the ECU 10 controls the driving of the motor 83 to variably control the rotation of the sun gear 81S. Accordingly, the vehicle vibration reducing apparatus 1 sets the rotations of the rotation elements such as the sun gear 81S or the ring gear 81R of the planetary gear mechanism 81 and the rotating body 30 to be variable and sets the inertial force acting on the inertial mass body including the sun gear 81S, the ring gear 81R, and the rotating body 30 to be variable. As a result, the vehicle vibration reducing apparatus 1 performs the inertial mass control of variably controlling the apparent inertial mass of the inertial mass body. For example, in the vehicle vibration reducing apparatus 1, by increasing the rotation speed of the rotating body 30 as the relatively large inertial mass body to increase the apparent inertial mass of the inertial mass body, it is possible to obtain an effect equivalent to that in the case where an actual inertial mass is increased. Accordingly, the vehicle vibration reducing apparatus 1 can change the resonance point by adjusting the inertial mass on the driven side, for example, when the second clutch 42 is in the engaged state, thereby changing vibration reduction characteristics of the vibration reducing apparatus body 20. The vehicle vibration reducing apparatus 1 can increase the inertial mass on the driven side, for example, by controlling the driving of the motor 83 so as to increase the inertial mass of the rotating body 30, and thus can lower the resonance frequency on the driven side to lower the resonance point of the power train 3.

Accordingly, the vehicle vibration reducing apparatus 1 can properly adjust the inertial mass of the vibration reducing apparatus body 20 depending on the vibration occurring in the power train 3, by causing the ECU 10 to control the driving of the motor 83 and to control the rotation of the planetary gear mechanism 81 so as to adjust the inertial mass of the rotating body 30 and the like. The ECU 10 controls the driving of the motor 83, for example, on the basis of a target control quantity. Here, the target control quantity is a control quantity corresponding to a vibration mode which is determined by the number of resonance points or the resonance frequency of the power train 3 which vary depending on the current engine speed, the current engine torque, and the current transmission stage. The target control quantity is a target motor speed at which can reduce vibration, for example, by adjusting the rotation (inertial mass) of the rotating body 30 and the like in the power train 3 vibrating in various vibration modes so as to lower the resonance point.

As a result, in the vehicle vibration reducing apparatus 1 can control the efficiency of the power train 3 or the vibration noise to be optimized by adjusting the inertial mass of the vibration reducing apparatus body 20 to a proper inertial mass to adjust the resonance point, for example, even when the resonance point (resonance frequency) in the power train 3 varies. Accordingly, since the vehicle vibration reducing apparatus 1 can improve the vibration reduction performance, it is possible, for example, to realize comfortable running of the vehicle 2 and to enlarge a rotation speed range in which a lockup clutch of a fluid transmission mechanism can be turned on, for example, as described in another embodiment to be described later, and the lockup clutch mechanism can be turned on in a relatively-low rotation speed range, thereby improving the fuel efficiency.

In addition, the ECU 10 according to this embodiment can change the transmission gear ratio of the rotation adjusting device 80A and can adjust the rotation of the rotating body 30 so as to accumulate the inertial energy in the rotating body 30 or discharge the inertial energy from the rotating body 30, by controlling the rotation control device 82 in the rotation adjusting device 80A so as to control the rotations of the rotation elements of the planetary gear mechanism 81.

For example, when the rotational power transmitted to the rotation shaft 50 and transmitted to the rotating body 30 is accumulated as the inertial energy, the ECU 10 controls the driving of the motor 83 so as to lower the motor speed. The ECU 10 adjusts the rotation speed of the sun gear 81S to decrease and increases the rotation speeds of the ring gear 81R and the rotating body 30, by lowering the motor speed. That is, the ECU 10 controls the rotation control device 82 so as to increase the rotation speed of the rotating body 30 when accumulating the inertial energy in the rotating body 30. More specifically, when accumulating the inertial energy in the rotating body 30, the ECU 10 uses the motor 83 as a power generator and controls the braking (power generation) of the motor 83 so as to lower the motor speed and to increase the rotation speed of the rotating body 30.

In the vehicle vibration reducing apparatus 1, for example, at the time of inertial running or decelerated running of the vehicle 2, the rotational power is input to the carrier 81C from the driving wheel 9 side via the differential gear 8, the transmission output shaft 13, any one of the plural transmission stages 71, 72, and 73, the transmission input shaft 12, the intermediate shaft 52, the second clutch 42, the intermediate shaft 53, the rotation shaft 50, and the like. Then, the vibration reducing apparatus body 20 can accumulate the rotation power transmitted from the carrier 81C to the rotating body 30 as inertial energy in the rotating body 30 with the increases in the rotation speed of the rotating body 30 as described above. That is, in the vehicle vibration reducing apparatus 1, at the time of inertial running or decelerated running of the vehicle 2, the kinetic (running) energy of the vehicle 2 can be recovered and accumulated by the rotating body 30 by increasing the rotation speed of the rotating body 30 so as to idle with the rotation power transmitted from the driving wheel 9 side to the rotating body 30. More specifically, the vibration reducing apparatus body 20 can convert the kinetic energy into electrical energy and can accumulate the electrical energy in the battery 84, and can accumulate more energy, by accumulating the inertial energy (kinetic energy) in the rotating body 30 and generating power for regeneration by the use of the motor 83 as a whole. At this time, in the vehicle 2, rotational resistance (negative rotation force) due to the inertia of the rotating body 30 is applied to the driving wheels 9 in cooperation with the brake 11 and the like, whereby a braking force is generated in the driving wheels 9 of the vehicle 2 and thus the vehicle 2 is decelerated to a desired vehicle speed.

On the other hand, for example, when the inertial energy accumulated in the rotating body 30 is discharged as the rotational power, the ECU 10 controls the driving of the motor 83 so as to increase the motor speed. The ECU 10 adjusts the rotation speed of the sun gear 81S to increase and decreases the rotation speeds of the ring gear 81R and the rotating body 30 by increasing the motor speed. That is, the ECU 10 controls the rotation control device 82 so as to decrease the rotation speed of the rotating body 30 when the inertial energy is discharged from the rotating body 30. More specifically, when the inertial energy is discharged from the rotating body 30, the ECU 10 uses the motor 83 as an electric motor and controls the driving of the motor 83 so as to increase the motor speed, thereby decreasing the rotation speed of the rotating body 30.

Accordingly, the vehicle vibration reducing apparatus 1 discharges the inertial energy accumulated in the rotating body 30 as the rotational power and outputs the rotation power from the carrier 81C, with the decrease in the rotation speed of the rotating body 30. The rotational power output from the carrier 81C is transmitted to the driving wheels 9, for example, via the rotation shaft 50, the intermediate shaft 53, the second clutch 42, the intermediate shaft 52, the transmission input shaft 12, any one of the plural transmission stages 71, 72, and 73, the transmission output shaft 13, the differential gear 8, and the like. That is, the vehicle vibration reducing apparatus 1 can discharge the inertial energy from the rotating body 30, for example, at the time of accelerated running of the vehicle 2, and can drive the driving wheels 9 with the rotational power transmitted from the rotating body 30 side to the driving wheels 9. More specifically, the vibration reducing apparatus body 20 can convert the electrical energy accumulated in the battery 84 into kinetic energy and can discharge the kinetic energy by discharging the inertial energy from the rotating body 30 and driving the motor 83 to enable power running as a whole. At this time, a drive force is generated in the vehicle 2 by applying the rotational power from the rotating body 30 or the motor 83 to the driving wheels 9 in cooperation with the engine 4 and the like, and thus the vehicle 2 is accelerated.

In the vehicle vibration reducing apparatus 1 having the above-mentioned configuration, the function as a resonance point adjusting device of the vibration reducing apparatus body 20 and the function as a running energy accumulating device of the vehicle 2 can be selectively used, for example, by controlling the rotation adjusting device 80A depending on the state of the vehicle 2, thereby more excellently achieving both the reduction in vibration and the improvement in fuel efficiency. That is, in the vehicle vibration reducing apparatus 1, the vibration reducing apparatus body 20 as the resonance point adjusting device can reduce the NVH depending on the driving state. On the other hand, in the vehicle vibration reducing apparatus 1, the vibration reducing apparatus body 20 as the energy accumulating device can accumulate energy (inertial (kinetic) energy, electrical energy) depending on the driving state of the vehicle 2 and can properly discharge the accumulated energy in cooperation with the output of the engine 4.

The rotation adjusting device 80B illustrated in FIG. 7 includes a continuously-variable transmission 85. The continuously-variable transmission 85 can transmit the rotation power from the rotation shaft 50 to the rotating body 30 with a change in speed and can change the transmission gear ratio in a stepless manner at the time of changing the speed. Accordingly, the rotation adjusting device 80A adjusts the rotation of the rotating body 30 to variably control the inertial mass of the rotating body 30. In this case, in the vibration reducing apparatus body 20, the continuously-variable transmission 85 of the rotation adjusting device 80B is disposed between the rotation shaft 50 and the rotating body 30. In the below description of the rotation adjusting device 80B, details common to the description of the rotation adjusting device 80A will be described as little as possible.

Specifically, the rotation adjusting device 80B adjusts the rotation of the rotating body 30 to variably control the inertial mass of the rotating body 30, by changing the transmission gear ratio at the time of shifting the rotational power transmitted to the rotating body 30 by the use of the continuously-variable transmission 85. The rotation adjusting device 80B according to this embodiment can accumulate the inertial energy in the rotating body 30 or discharge the inertial energy from the rotating body 30 by controlling the continuously-variable transmission 85 so as to change the transmission gear ratio of the rotation power transmitted to the rotating body 30 and to adjust the rotation of the rotating body 30.

The continuously-variable transmission 85 is a so-called belt-type continuously-variable transmission and includes an input shaft 85a, an output shaft 85b, a primary pulley 85c coupled to the input shaft 85a so as to be rotatable as a unified body therewith, a secondary pulley 85d coupled to the output shaft 85b so as to be rotatable as a unified body therewith, and an endless belt 85e suspended between the primary pulley 85c and the secondary pulley 85d. The continuously-variable transmission 85 can transmit the power input to the input shaft 85a from the primary pulley 85c to the secondary pulley 85d via the belt 85e, can output the power from the output shaft 85b, and can change the transmission gear ratio which is the rotation speed ratio of the output shaft 85b and the secondary pulley 85d to the input shaft 85a and the primary pulley 85c in a stepless manner.

The input shaft 85a is a rotation member to which the rotational power from the rotation shaft 50 is input in the continuously-variable transmission 85. The output shaft 85b is a rotation member that outputs the rotational power to the rotating body 30 side in the continuously-variable transmission 85. The input shaft 85a can rotate about the rotation axis line X1 with the transmitted power. The output shaft 85b can rotate about the rotation axis line X3 (for example, which may be the rotation axis line X2) parallel to the rotation axis line X1 with the transmitted power. The input shaft 85a is coupled to the rotation shaft 50 so as to be rotatable as a unified body therewith. The output shaft 85b is coupled to the rotating body 30 so as to be rotatable as a unified body therewith. The continuously-variable transmission 85 performs a gear shift operation depending on the pressure (primary pressure and secondary pressure) of the oil supplied from the oil pressure control device and the like to a primary sheave oil pressure chamber of the primary pulley 85c and a secondary sheave oil pressure chamber of the secondary pulley 85d and changes the transmission gear ratio in a stepless manner under the control of the ECU 10.

The rotation adjusting device 80B having the above-mentioned configuration can variably control the apparent inertial mass of the rotating body 30 which is the inertial mass body by causing the ECU 10 to control the transmission gear ratio of the continuously-variable transmission 85. In the vehicle vibration reducing apparatus 1 including the rotation adjusting device 80B, the rotation adjusting device 80B changes the inertial mass of the rotating body 30 so as to adjust the inertial mass on the driving side or the driven side.

At this time, the vehicle vibration reducing apparatus 1 controls more precise resonance point adjustment by causing the ECU 10 to control the continuously-variable transmission 85 and to control the transmission gear ratio of the rotation adjusting device 80B. Accordingly, the vehicle vibration reducing apparatus 1 can properly set the inertial mass of the vibration reducing apparatus body 20 and can properly reduce the vibration in a broader driving range. The ECU 10 according to this embodiment controls the transmission gear ratio of the continuously-variable transmission 85 so as to change the transmission gear ratio of the rotation adjusting device 80B to adjust the rotation of the rotating body 30, thereby adjusting the inertial mass of the rotating body 30 or the like. Here, since the continuously-variable transmission 85 is a stepless transmission, the ECU 10 can seamlessly perform the rotation adjustment of the rotating body 30 and the adjustment of the resonance point more finely and in a stepless manner. For example, when the inertial mass on the driven side varies and the resonance point of the power train 3 varies depending on the variation in the gear shift operation of the transmission 7 or the driving state such as the rotation speed or the engine torque of the engine 4, the ECU 10 adjusts the rotation (inertial mass) of the rotating body 30 by controlling the transmission gear ratio of the continuously-variable transmission 85 to correspond thereto.

That is, the vehicle vibration reducing apparatus 1 can properly adjust the inertial mass of the vibration reducing apparatus body 20 depending on the vibration generated in the power train 3 by causing the ECU 10 to control the continuously-variable transmission 85 so as to adjust the rotation (inertial mass) of the rotating body 30 or the like. The ECU 10 controls the transmission gear ratio of the continuously-variable transmission 85, for example, on the basis of the target control quantity. The target control quantity is, for example, a target transmission gear ratio that can realize the reduction in vibration by adjusting the rotation (inertial mass) of the rotating body 30 or the like to lower the resonance point in the power train 3 vibrating in the vibration modes.

By controlling the transmission gear ratio of the continuously-variable transmission 85, the ECU 10 may change the transmission gear ratio of the rotation adjusting device 80B to adjust the rotation of the rotating body 30 and may accumulate the inertial energy in the rotating body 30 or discharge the inertial energy from the rotating body 30.

For example, when the rotational power transmitted to the rotation shaft 50 and transmitted to the rotating body 30 is accumulated as the inertial energy, the ECU 10 shifts up the continuously-variable transmission 85. As a result, in the vibration reducing apparatus body 20, the rotation speed of the rotating body 30 increases and the rotational power transmitted to the rotating body 30 can be accordingly accumulated as the inertial energy in the rotating body 30.

On the other hand, for example, when the inertial energy accumulated in the rotating body 30 is discharged as the rotational power, the ECU 10 shifts down the continuously-variable transmission 85. As a result, in the vibration reducing apparatus body 20, the rotation speed of the rotating body 30 decreases and the inertial energy accumulated in the rotating body 30 can be accordingly discharged as the rotational power.

Accordingly, the vehicle vibration reducing apparatus 1 having the above-mentioned configuration can accumulate energy (the inertial kinetic energy of the rotating body 30) in the vibration reducing apparatus body 20 including the rotating body 30 and discharge the energy if necessary, thereby achieving the improvement in fuel efficiency. The vehicle vibration reducing apparatus 1 can perform the rotation adjustment and the inertial mass adjustment of the rotating body 30 more finely and in a stepless manner by the use of the continuously-variable transmission 85. Therefore, the vehicle vibration reducing apparatus 1 can finely adjust the resonance point with higher precision depending on the situations and can more smoothly accumulate the inertial energy in the rotating body 30 and discharge the inertial energy from the rotating body 30, thereby greatly enhancing the efficiency in accumulation and discharge of energy. As a result, the vehicle vibration reducing apparatus 1 can realize the additional reduction in vibration and the improvement in fuel efficiency. In this case, in the vehicle vibration reducing apparatus 1, the function as the resonance point adjusting device of the vibration reducing apparatus body 20 and the function as the running energy accumulating device of the vehicle 2 can be selectively used, for example, by controlling the rotation adjusting device 80B depending on the state of the vehicle 2, thereby more excellently achieving both the reduction in vibration and the improvement in fuel efficiency.

The rotation adjusting device 80 described above is not limited to the above-mentioned configurations of the rotation adjusting device 80A and the rotation adjusting device 80B. For example, the rotation adjusting device 80 may be also used as the third clutch 43. That is, the vehicle vibration reducing apparatus 1 may use the third clutch 43 as the third engagement device and the rotation adjusting device. In this case, the ECU 10 adjusts the rotation of the rotating body 30 and changes the inertial mass of the rotating body 30 by adjusting a degree of slipping of the third clutch 43. The ECU 10 adjusts the rotation of the rotating body 30 by adjusting the degree of slipping of the third clutch 43, and accumulates the inertial energy in the rotating body 30 or discharges the inertial energy from the rotating body 30.

Embodiment 2

Figure 8:
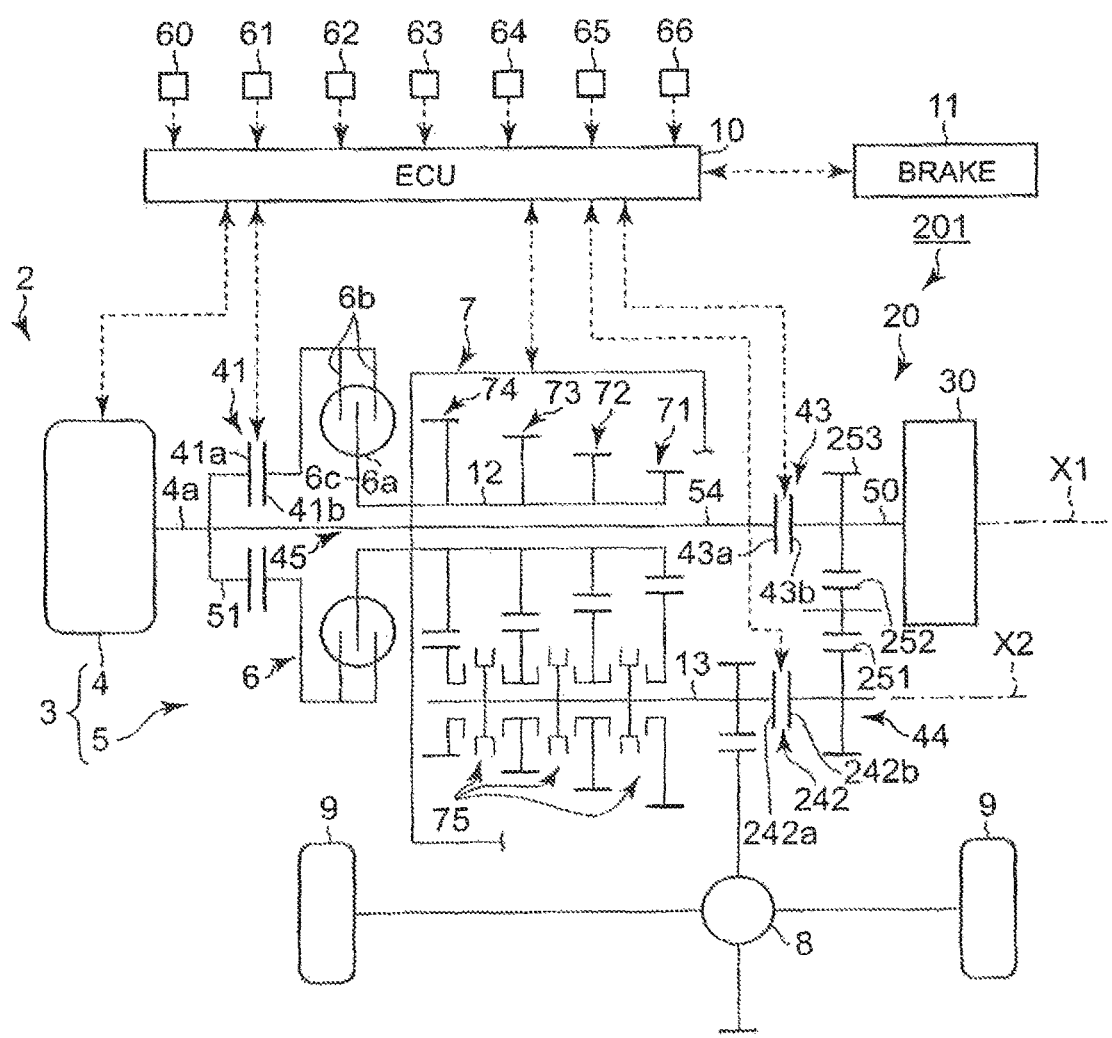
FIG. 8 is a diagram schematically illustrating a configuration of a vehicle vibration reducing apparatus according to Embodiment 2.
Figure 9:
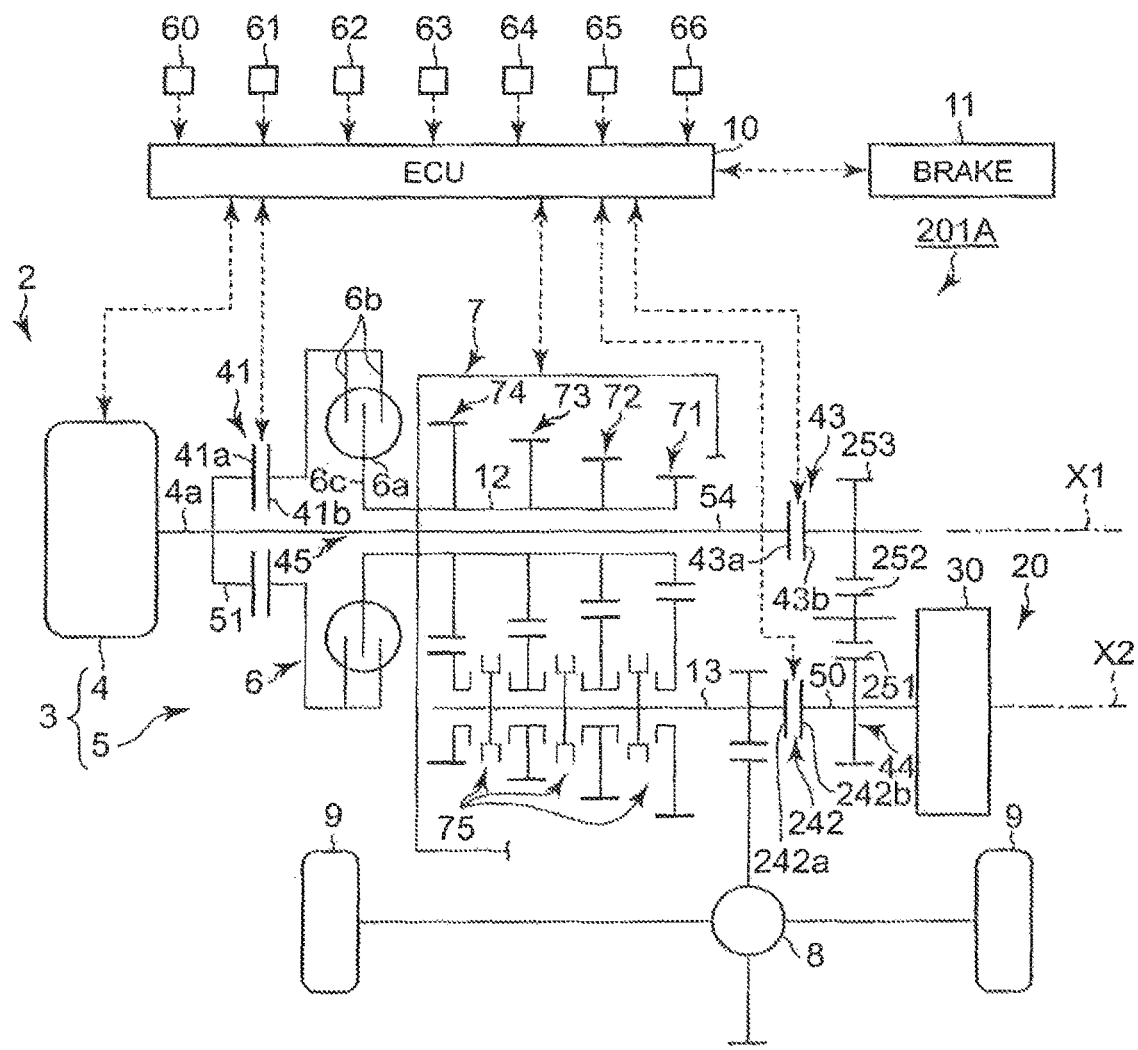
FIG. 9 is a diagram schematically illustrating a configuration of a vehicle vibration reducing apparatus according to a modification example.

FIG. 8 is a diagram schematically illustrating a configuration of a vehicle vibration reducing apparatus according to Embodiment 2 and FIG. 9 is a diagram schematically illustrating a configuration of a vehicle vibration reducing apparatus according to a modification example. The vehicle vibration reducing apparatus according to Embodiment 2 is different from the vehicle vibration reducing apparatus according to Embodiment 1, in the arrangement of the engagement devices and the like. The configurations, operations, and effects common to the above-mentioned embodiment will be repeatedly described as little as possible (the same is true of the below-described embodiments).

As illustrated in FIG. 8, in a vehicle vibration reducing apparatus 201 according to this embodiment, the rotating body 30 is arranged to be coaxial with the rotation axis line X1 and a second clutch 242 as the second engagement device is disposed on the transmission output shaft 13 side of the transmission 7. In the vehicle vibration reducing apparatus 201, the rotating body 30 is configured to be connectable to the transmission output shaft 13 via counter gears 251, 252, and 253, the second clutch 242, and the like.

Specifically, the vehicle vibration reducing apparatus 201 includes a vibration reducing apparatus body 20 including the rotating body 30, the rotation shaft 50, and the like, a first clutch (first engagement device) 41, a second clutch (second engagement device) 242, and a third clutch (third engagement device) 43 as the plural engagement devices, and an ECU 10.

The rotating body 30 according to this embodiment is selectively connected to the crank shaft 4a or the transmission output shaft 13 via the first clutch 41, the second clutch 242, the third clutch 43, and the like so as to enable power transmission. The vibration reducing apparatus body 20, the first clutch 41, the third clutch 43, the ECU 10 and the like have the same configurations as in the vehicle vibration reducing apparatus 1 (see FIG. 1) and thus will be repeatedly described as little as possible.

The second clutch 242 according to this embodiment is a clutch for transmission/flywheel connection and can be switched to a state where the transmission output shaft 13 and the rotating body 30 engage with each other so as to enable power transmission and a state where the engagement is released. The second clutch 242 can be switched to an engaged state where a rotation member 242a on the transmission output shaft 13 side and a rotation member 242b on the rotating body 30 side engage with each other so as to enable power transmission to cause the transmission output shaft 13 and the rotating body 30 to engage with each other so as to enable power transmission and a disengaged state where the engagement is released.

Here, the rotation member 242a is a member that rotates as a unified body along with the transmission output shaft haft 13. On the other hand, the rotation member 242b is a member that is coupled to the counter gear 251 so as to be rotatable as a unified body therewith. The counter gear 251 is arranged to be coaxial with the rotation axis line X2 and is rotatable about the rotation axis line X2 with transmitted power. The counter gear 251 engages with the counter gear 252. The counter gear 252 engages with the counter gear 251 so as to enable power transmission and engages with the counter gear 253, which is coupled to the rotation shaft 50 so as to be rotatable as a unified body therewith, so as to enable power transmission.

In the vehicle vibration reducing apparatus 201 having the above-mentioned configuration, the first clutch 41 and the second clutch 242 are switched to the engaged state and the third clutch 43 is switched to the disengaged state, whereby a first path 44 is set up. In this case, the rotating body 30 is connected to the transmission output shaft 13. As a result, in the vibration reducing apparatus body 20, the rotating body 30 is connected to the power transmission device 5 and the inertial mass of the rotating body 30 can be added to the inertial mass on the driven side (the driving wheel side) downstream from the damper spring 6a. In this case, the rotational power transmitted from the engine 4 side or the driving wheel 9 side to the transmission output shaft 13 is input (transmitted) to the rotation shaft 50 sequentially via the second clutch 242, the counter gear 251, the counter gear 252, the counter gear 253, and the like and is transmitted to the rotating body 30. At this time, the power transmitted from the transmission output shaft 13 to the rotation shaft 50 is shifted depending on the transmission gear ratio (gear ratio) in the counter gear 251, the counter gear 252, and the counter gear 253 and is transmitted to the rotating body 30 side.

In the vehicle vibration reducing apparatus 201, at least the second clutch 242 is switched to the disengaged state and the third clutch 43 is switched to the engaged state, whereby the second path 45 is set up similarly to the vehicle vibration reducing apparatus 1 (see FIG. 1).

The transmission gear ratio in the counter gear 251, the counter gear 252, and the counter gear 253 is preferably set to be uniform after the rotation directions of the rotational power are set to the same direction in a case where the rotational power is transmitted to the rotating body 30 via the first path 44 when the a predetermined transmission stage (for example, a transmission stage 71) is selected in the transmission 7 and a case where the rotational force is transmitted to the rotating body 30 via the second path 45, but the present invention is not limited to this configuration. The transmission gear ratio in the counter gear 251, the counter gear 252, and the counter gear 253 can be properly set depending on various requirements.

In the above-mentioned vehicle vibration reducing apparatus 201 according to this embodiment, it is possible to achieve both the reduction in vibration and the improvement in fuel efficiency and thus to properly reduce the vibration. In the vehicle vibration reducing apparatus 201, since the first path 44 and the second path 45 can be constituted without forming the second clutch 242 and the third clutch 43 in an inner-outer dual clutch structure, it is possible to facilitate attachment thereof and, for example, to reduce manufacturing cost or to improve reliability.

FIG. 9 illustrates a vehicle vibration reducing apparatus 201A according to the modification example. In the vehicle vibration reducing apparatus 201A, the rotating body 30 is arranged to be coaxial with the rotation axis line X2 and the counter gear 251 is coupled to the rotation shaft 50 so as to be rotatable as a unified body therewith.

In this case, in the state where the first path 44 is selected, the rotational power transmitted from the engine 4 side or the driving wheel 9 side to the transmission output shaft 13 is input (transmitted) to the rotation shaft 50 via the second clutch 242 and is transmitted to the rotating body 30. On the other hand, in the state where the second path 45 is selected, the rotational power transmitted from the engine 4 side to the intermediate shaft 54 is input (transmitted) to the rotation shaft 50 sequentially via the third clutch 43, the counter gear 253, the counter gear 252, and the counter gear 251 and is transmitted to the rotating body 30.

In this case, the vehicle vibration reducing apparatus 201A can achieve both the reduction in vibration and the improvement in fuel efficiency and can properly reduce vibration.

Embodiment 3

Figure 10:
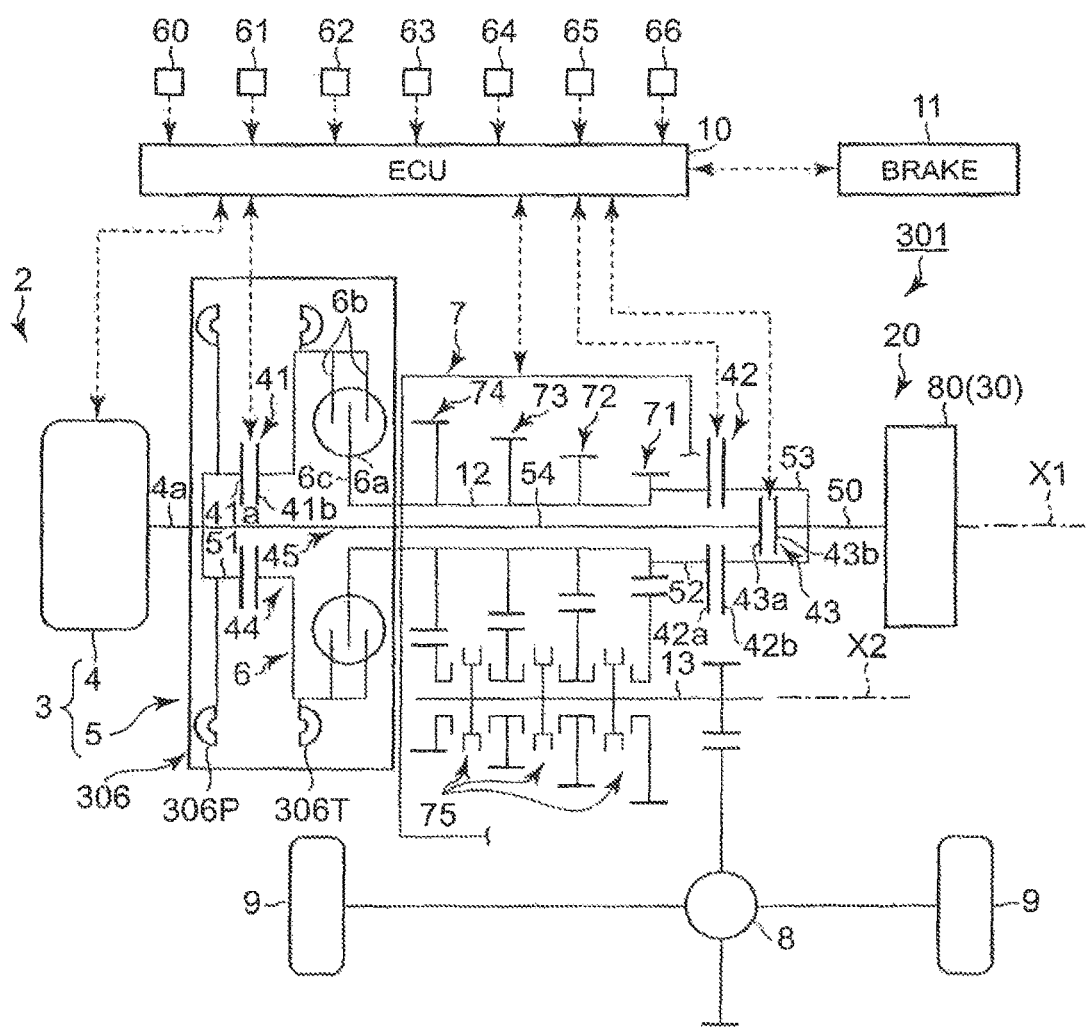
FIG. 10 is a diagram schematically illustrating a configuration of a vehicle vibration reducing apparatus according to Embodiment 3.
Figure 11:
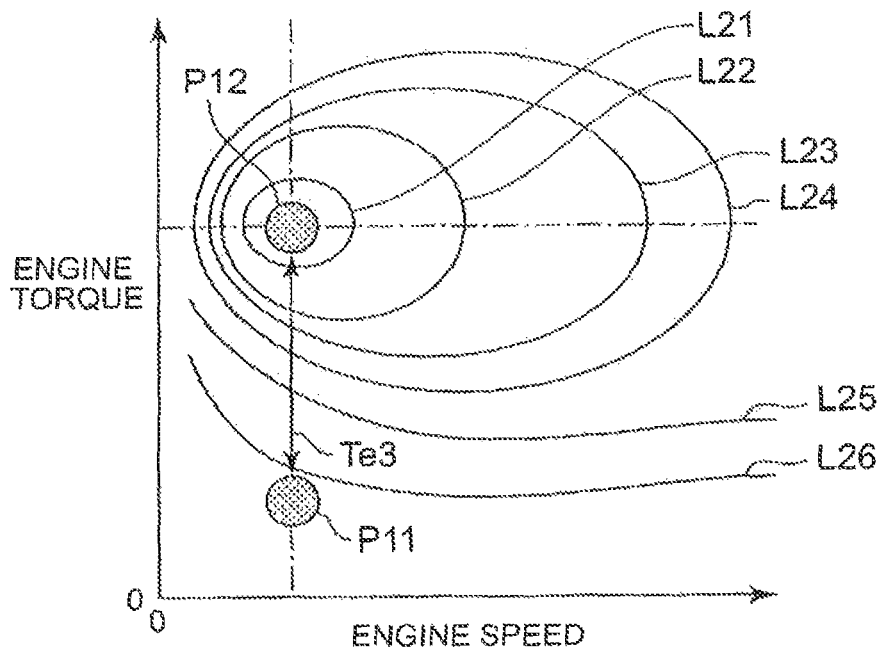
FIG. 11 is a diagram schematically illustrating an example of a control in the vehicle vibration reducing apparatus according to Embodiment 3.
Figure 12:
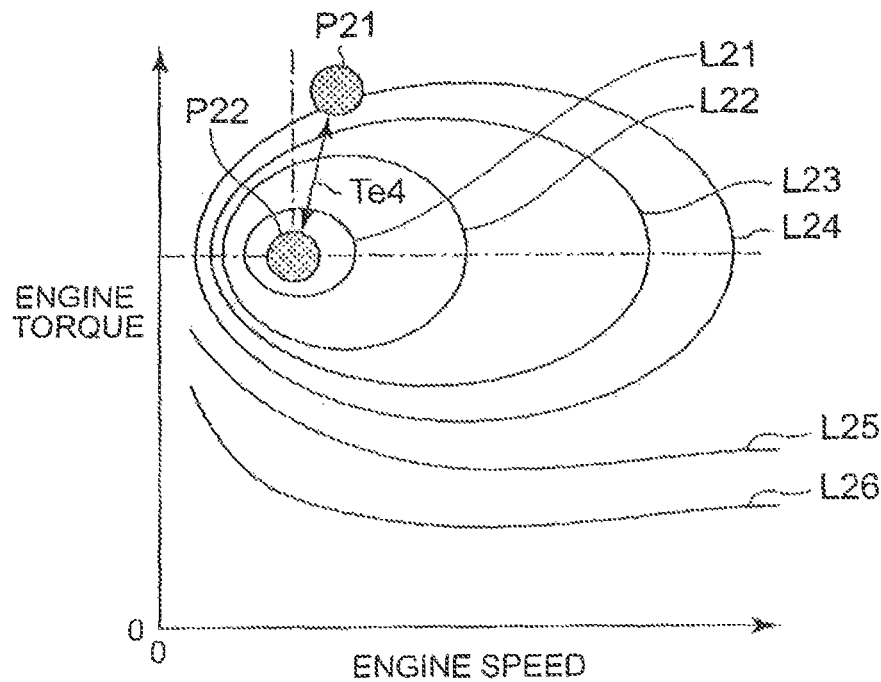
FIG. 12 is a diagram schematically illustrating an example of the control in the vehicle vibration reducing apparatus according to Embodiment 3.
Figure 13:
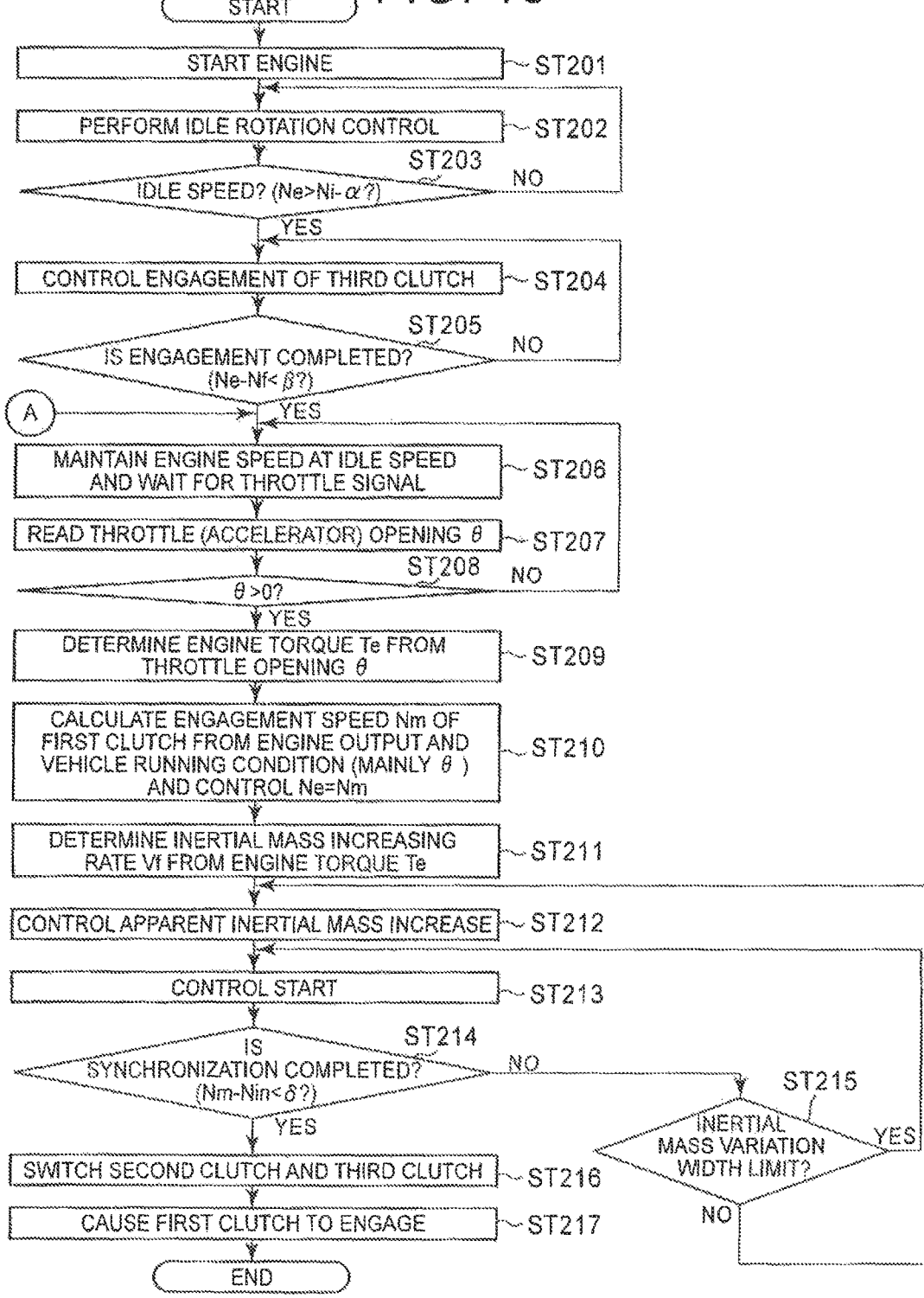
FIG. 13 is a flowchart illustrating an example of the control in the vehicle vibration reducing apparatus according to Embodiment 3.
Figure 14:
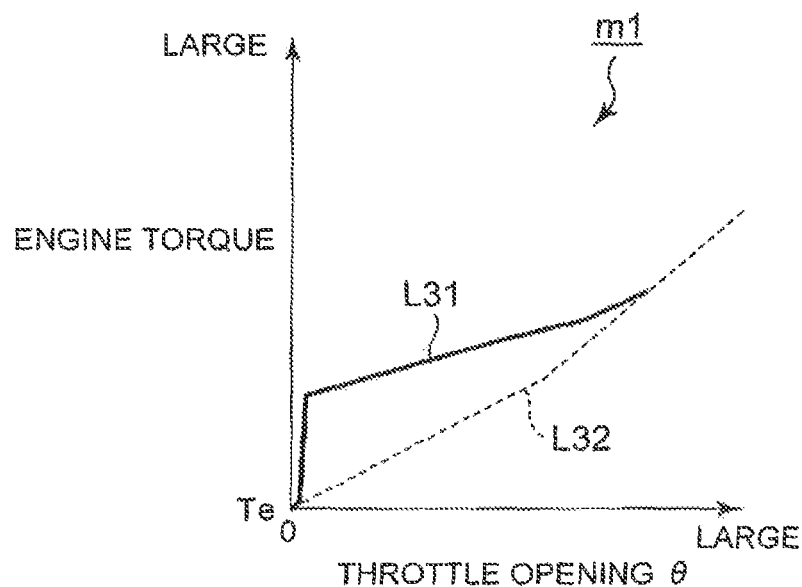
FIG. 14 is a diagram illustrating an example of an engine torque map used for the vehicle vibration reducing apparatus according to Embodiment 3.
Figure 15:
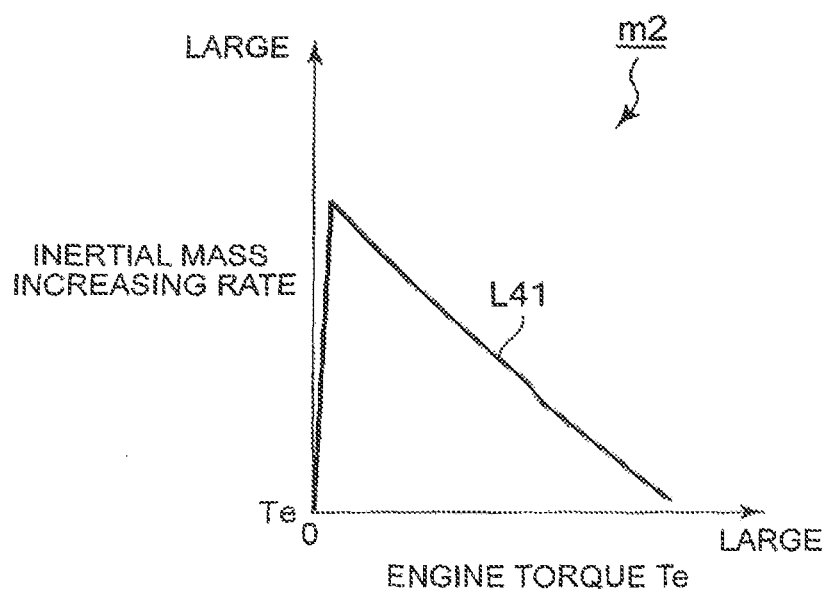
FIG. 15 is a diagram illustrating an example of an inertial mass increasing rate map used for the vehicle vibration reducing apparatus according to Embodiment 3.
Figure 16:
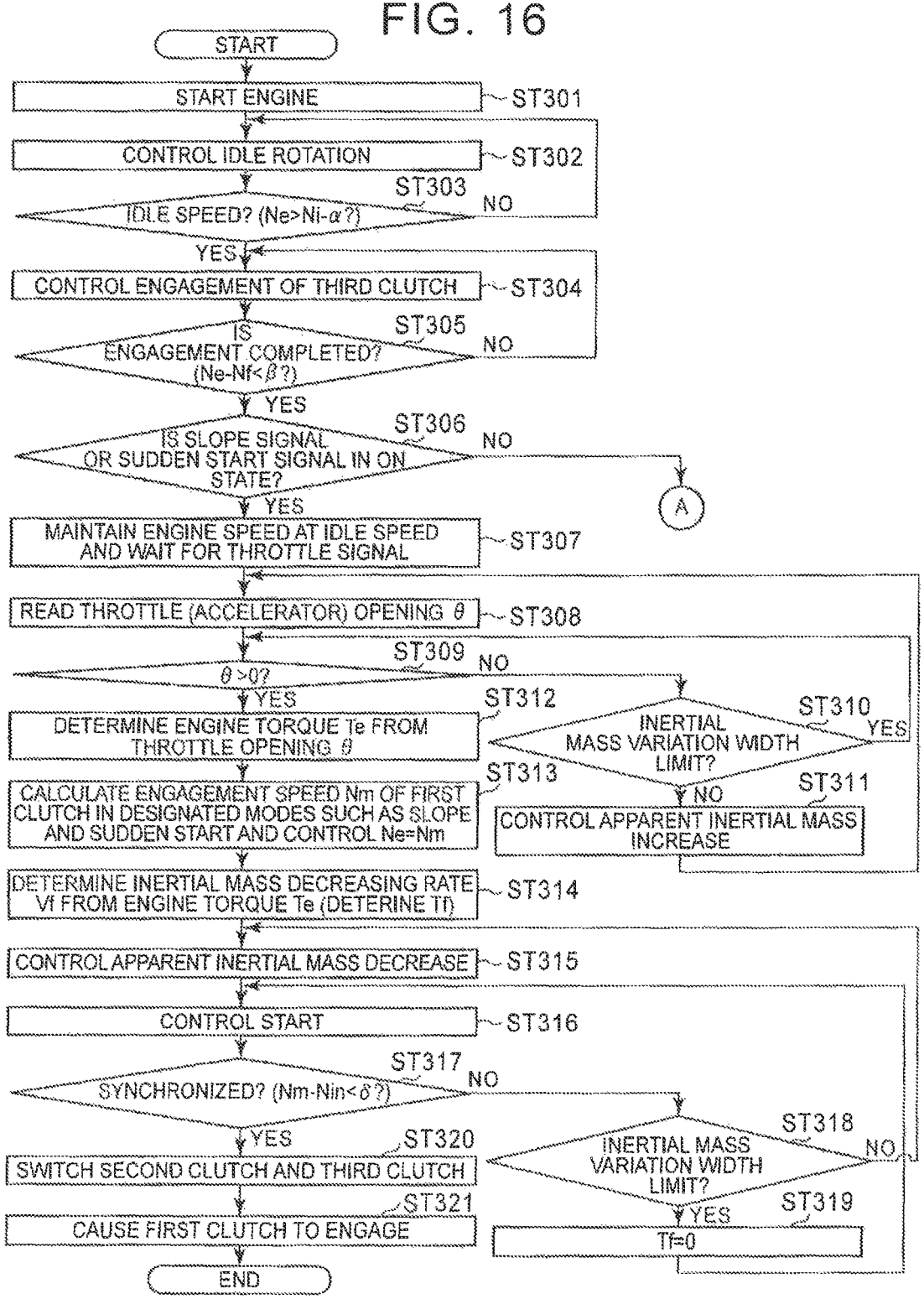
FIG. 16 is a flowchart illustrating an example of the control in the vehicle vibration reducing apparatus according to Embodiment 3.

FIG. 10 is a diagram schematically illustrating a configuration of a vehicle vibration reducing apparatus according to Embodiment 3, FIGS. 11 and 12 are diagrams schematically illustrating an example of a control in the vehicle vibration reducing apparatus according to Embodiment 3, FIG. 13 is a flowchart illustrating an example of a control in the vehicle vibration reducing apparatus according to Embodiment 3, FIG. 14 is a diagram illustrating an example of an engine torque map used in the vehicle vibration reducing apparatus according to Embodiment 3, FIG. 15 is a diagram illustrating an example of an inertial mass increasing rate map used in the vehicle vibration reducing apparatus according to Embodiment 3, and FIG. 16 is a flowchart illustrating an example of a control in the vehicle vibration reducing apparatus according to Embodiment 3. The vehicle vibration reducing apparatus according to Embodiment 3 is different from the vehicle vibration reducing apparatus according to Embodiment 1, in that the vehicle vibration reducing apparatus includes a second control device and the power transmission device includes a fluid transmission mechanism.

As illustrated in FIG. 10, a vehicle vibration reducing apparatus 301 according to this embodiment includes a vibration reducing apparatus body 20 including the rotating body 30, the rotation shaft 50, and the like, a first clutch (first engagement device) 41, a second clutch (second engagement device) 42, and a third clutch (third engagement device) 43 as plural engagement devices, and an ECU 10. The ECU 10 according to this embodiment serves as the first control device and is also used as the second control device. The vibration reducing apparatus body 20 according to this embodiment includes a rotation adjusting device 80. The basic configurations of the vibration reducing apparatus body 20, the first clutch 41, the second clutch 42, the third clutch 43, the ECU 10, and the like are almost similar to the above-mentioned vehicle vibration reducing apparatus 1 (see FIG. 1) and thus description thereof will be repeated as little as possible.

Here, the power transmission device 5 of the power train 3 to which the vehicle vibration reducing apparatus 301 according to this embodiment is applied includes a fluid coupling 306 as a fluid transmission mechanism that can transmit the rotational power via a fluid such as operating oil. The fluid coupling 306 includes a pump (pump impeller) 306P coupled to the intermediate shaft 51 so as to be rotatable as a unified body therewith and a turbine (turbine runner) 306T coupled to the damper 6 so as to be rotatable as a unified body therewith. A space between the pump 306P and the turbine 306T in a housing is filled with the fluid. The fluid coupling 306 is a kind of clutch that transmits the rotational power transmitted to the pump 306P to the turbine 306T via a fluid. The first clutch 41 and the damper 6 in this embodiment are attached to the fluid coupling 306, and the first clutch 41 is configured as a lockup clutch of the fluid coupling 306. When the first clutch 41 as the lockup clutch is in the disengaged state, the fluid coupling 306 transmits the rotational power from the crank shaft 4a to the damper 6 via the intermediate shaft 51, the pump 306P, the fluid, and the turbine 306T. On the other hand, when the first clutch 41 as the lockup clutch is in the engaged state, the fluid coupling 306 transmits the rotational power from the crank shaft 4a to the damper 6 via the intermediate shaft 51 and the first clutch 41 (without passing through the fluid).

When the engine 4 is in the idling operation state after the engine 4 is started or the like, the ECU 10 controls the first clutch 41 and the second clutch 42 to the disengaged state and controls the third clutch 43 to the engaged state. Accordingly, the vehicle vibration reducing apparatus 301 can stabilize the idling of the engine 4.

When the accelerator operation by the driver is turned on, the ECU 10 starts the vehicle 2 in the state where the first clutch 41 and the second clutch 42 are in the disengaged state and the third clutch 43 is in the engaged state. At this time, the ECU 10 according to this embodiment controls the first clutch 41 so as to be maintained in the disengaged state and to transmit the rotational power to the driving wheels 9 by the fluid transmission via the fluid of the fluid coupling 306, instead of controlling the first clutch 41 to the engaged state immediately at the time of starting. Accordingly, the vehicle vibration reducing apparatus 301 can suppress the start clutch slip loss as described above, can reduce energy loss at the time of starting of the vehicle 2, and can suppress rotation fluctuation by the fluid transmission in the fluid coupling 306, thereby preferably suppressing vibration.

The ECU 10 performs the following control when the vehicle 2 is started in the state where the first clutch 41 and the second clutch 42 are in the disengaged state and the third clutch 43 is in the engaged state. That is, the ECU 10 controls the third clutch 43 to the disengaged state and controls the second clutch 42 to the engaged state after the rotation speed of the power transmission device 5 side of the second clutch 42 is synchronized with the rotation speed of the rotating body 30 side. In this case, the ECU 10 can determine whether the rotation speed of the power transmission device 5 side of the second clutch 42 is synchronized with the rotation speed of the rotating body 30 side, for example, on the basis of the input shaft speed of the transmission input shaft 12 and the rotation speed of the rotation shaft 50 of the rotating body 30 detected by the input shaft speed sensor 64 and the rotating body speed sensor 65. The ECU 10 controls the first clutch 41 to the engaged state after the disengagement of the third clutch 43 and the engagement of the second clutch 42 are completed.

Accordingly, the vehicle vibration reducing apparatus 301 can suppress vibration by the fluid transmission in the fluid coupling 306 in the early period of starting and can switch the second clutch 42 and the third clutch 43 without any shock after the rotation speed of the crank shaft 4a and the rotation shaft 50 is synchronized with the rotation speed of the transmission input shaft 12. Thereafter, the vehicle vibration reducing apparatus 301 can switch the first clutch 41 to the engaged state to switch the power transmission state to the power transmission using the first clutch 41 which has smaller energy loss than the fluid transmission using the fluid coupling 306 after the second clutch 42 and the third clutch 43 are switched, and can switch the state where the second path 45 is selected to the state where the first path 44 is selected. As a result, the vehicle vibration reducing apparatus 301 can switch the state where the rotating body 30 of the vibration reducing apparatus body 20 is connected to the engine 4 and the inertial mass of the rotating body 30 is added to the inertial mass on the driving side to the state where the rotating body 30 is connected to the power transmission device 5 and the inertial mass of the rotating body 30 is added to the inertial mass on the driven side. Accordingly, the vehicle vibration reducing apparatus 301 can lower the resonance point (the resonance point of the power train 3) on the driving side and the driven side which varies depending on the driving state such as the rotation speed or the engine torque of the engine 4, thereby effectively suppressing the resonance.

The ECU 10 according to this embodiment controls the rotation adjusting device 80 on the basis of the output of the engine 4 so as to adjust the rotation of the rotating body 30. Typically, since the engine efficiency is poor in the low-load area of the engine 4, the ECU 10 uses a high-efficiency area of the engine 4 as much as possible and accumulates the surplus power in the rotating body 30. On the basis of the output of the engine 4, the ECU 10 controls the rotation adjusting device 80 so as to relatively increase the inertial mass at the time of low-load starting of the engine 4 and can control the rotation adjusting device 80 so as to relatively decrease the inertial mass at the time of high-load starting of the engine 4, thereby using an area having high engine efficiency. In this case, in the vehicle vibration reducing apparatus 301 according to this embodiment, the first clutch 41 and the second clutch 42 are controlled to the disengaged state and the third clutch 43 is controlled to the engaged state.

More specifically, the ECU 10 can control the rotation adjusting device 80 so as to accumulate the surplus power to the power used for running of the vehicle 2 out of the power generated by the engine 4 in the rotating body 30, for example, as illustrated in FIG. 11. In FIG. 11, the horizontal axis represents the engine speed, the vertical axis represents the engine torque, and the relationship between the operating point of the engine 4 determined depending on the engine speed and the engine torque and the fuel efficiency is illustrated. Solid lines L21 to L26 in FIG. 11 indicate equivalent fuel efficiency lines (for example, equivalent fuel consumption curves) at which the fuel efficiency (for example, the fuel consumption rate) of the engine 4 is equivalent, respectively. The same is true of FIG. 12 to be described later.

An operating point P11 when a start-driving torque as the power used for running of the vehicle 2 is generated at a predetermined engine speed in the engine 4 tends to be lower in fuel efficiency than an operating point P12 at which the fuel efficiency of the engine 4 is suitable at the predetermined engine speed.

The ECU 10 according to this embodiment controls the engine 4, for example, at the time of starting of the vehicle 2 so as to drive the engine 4 with the engine speed and the engine torque corresponding to the operating point P12. The ECU 10 controls the rotation adjusting device 80 so as to accumulate energy corresponding to a flywheel absorption torque Te3 as the surplus power at the operating point P12 to the power at the operating point P11 as the inertial energy in the rotating body 30.

Accordingly, the vehicle vibration reducing apparatus 301 can accumulate the surplus power to the power used for running of the vehicle 2 out of the power generated by the engine 4 in the rotating body 30 without being wasted while driving the engine 4 at the operating point at which the fuel efficiency is suitable. That is, the vehicle vibration reducing apparatus 301 can accumulate the surplus energy to the starting energy out of the engine output energy as the inertial energy in the rotating body 30 and can drive the engine 4 in an area in which the fuel efficiency is high. Accordingly, the vehicle vibration reducing apparatus 301 can achieve additional improvement in fuel efficiency.

For example, when an engine angular velocity is defined as "$\omega e$", a rotating body (flywheel) angular velocity is defined as "$\omega f$", and a fluid coupling pump angular velocity is defined as "$\omega p$", the relations of "$\omega e$", "$\omega f$", and "$\omega p$" can be expressed, for example, by Expressions (3) and (4).

$$\omega e = \omega f = \omega p \quad (3)$$

$$d\omega e/dt = d\omega f/dt = d\omega p/dt \quad (4)$$

For example, when the engine torque is defined as "Te", the rotating body (flywheel) torque is defined as "Tf", the fluid coupling pump torque is defined as "Tp", the fluid coupling capacity coefficient is defined as "Cp", the engine speed is defined as "Ne", and the rotating body (flywheel) inertial mass is defined as "If", the relations thereof can be expressed, for example, by Expressions (5) to (10).

$$Te = Tp + Tf \quad (5)$$

$$Tp = Cp \cdot Nc^2 \quad (6)$$

$$Ne = (2\pi/60) \cdot \omega e \quad (7)$$

$$Tf = If \cdot (d\omega f/dt) \quad (8)$$

$$Te = Cp \cdot Ne^2 + If \cdot (d\omega f/dt) \quad (9)$$

$$Te = Cp \cdot ((2\pi/60) \cdot \omega e)^2 + If \cdot (d\omega e/dt) \quad (10)$$

That is, the vehicle vibration reducing apparatus 301 can control the increase in the engine speed and can control a vehicle acceleration, for example, by driving the engine 4 in an engine output condition having high efficiency, controlling the rotation adjusting device 80, and controlling the rotating body inertial mass If.

The ECU 10 can control the rotation adjusting device 80 so as to discharge deficient power in the power used for running of the vehicle 2 out of the power generated by the engine 4 from the rotating body 30, for example, as illustrated in FIG. 12. In this case, in the vehicle vibration reducing apparatus 301 according to this embodiment, the first clutch 41 and the second clutch 42 are controlled to the disengaged state and the third clutch 43 is controlled to the engaged state.

For example, in a case where relatively-high power performance is required for causing the vehicle 2 to run such as a case where the vehicle 2 is started on an uphill road or a case where the vehicle is suddenly accelerated, the engine 4 is overloaded at the operating point P21 when the required power is output from the engine 4 alone than at the operating point P22 at which the fuel efficiency of the engine 4 is suitable and the fuel efficiency thereof is relatively lowered.

The ECU 10 according to this embodiment controls the engine 4 at the time of starting of the vehicle 2 requiring high power, for example, so as to drive the engine 4 with the engine speed and the engine torque corresponding to the operating point P22. The ECU 10 controls the rotation adjusting device 80 so as to discharge the energy corresponding to a flywheel discharge torque Te4 as deficient power in power at the operating point P22 out of power at the operating point P21 from the rotating body 30. That is, since the engine efficiency in the overloaded area of the engine 4 is low, the ECU 10 uses a high-efficiency area and uses the energy accumulated in the rotating body 30 as the deficient power in the idling operation. Accordingly, the vehicle vibration reducing apparatus 301 can supplement the deficient power in the power used for running of the vehicle 2 out of the power generated by the engine 4 with the energy accumulated in the rotating body 30 while driving the engine 4 at the operating point at which the fuel efficiency is suitable. That is, the vehicle vibration reducing apparatus 301 can drive the engine 4 in an area having high fuel efficiency and can supplement the deficient energy in the starting energy out of the engine output energy with the energy accumulated in the rotating body 30. Accordingly, the vehicle vibration reducing apparatus 301 can secure proper starting performance and power performance and can achieve additional improvement in fuel efficiency.

An example of the control of the ECU 10 will be described below with reference to the flowchart illustrated in FIG. 13. First, the case where the surplus power to the power used for running of the vehicle 2 out of the power generated by the engine 4 is accumulated in the rotating body 30 will be described.

As a start mode (start control) of the vehicle 2, first, the ECU 10 starts the engine 4 in response to a driver's operation or the like (ST201).

Then, as the idling operation control, the ECU 10 controls the engine 4 so that the engine speed is a predetermined idling rotation speed (ST202).

Then, the ECU 10 determines whether the engine speed reaches the idling rotation speed using Expression (1) or the like as described above (ST203).

When it is determined that the engine speed does not reach the idling rotation speed (NO in ST203), the ECU 10 returns to ST202 and repeatedly performs the subsequent processes thereof.

When it is determined that the engine speed reaches the idling rotation speed (YES in ST203), the ECU 10 controls the third clutch 43 to the engaged state (ST204).

Then, the ECU 10 determines whether the engagement of the third clutch 43 is completed using Expression (2) or the like as described above (ST205).

When it is determined that the engagement of the third clutch 43 is not completed (NO in ST205), the ECU 10 returns to ST204 and repeatedly performs the subsequent processes thereof.

When the rotation speed of the intermediate shaft 54 is synchronized with the rotation speed of the rotation shaft 50 and it is thus determined that the engagement of the third clutch 43 is completed (YES in ST205), the ECU 10 waits for a throttle signal (or an accelerator signal) while maintaining the engine speed at the idling rotation speed (ST206).

Then, the ECU 10 reads the degree of throttle opening $\theta$ on the basis of the detection result of the throttle opening sensor 61 or the like (ST207).

Then, the ECU 10 determines whether the degree of throttle opening $\theta$ is greater than 0 on the basis of the degree of throttle opening $\theta$ read in ST207 (ST208). When it is determined that the degree of throttle opening $\theta$ is equal to or less than 0 (NO in ST208), the ECU 10 returns to ST206 and repeatedly performs the subsequent processes thereof.

When it is determined that the degree of throttle opening $\theta$ is greater than 0 (YES in ST208), the ECU 10 determines the engine torque Te on the basis of the degree of throttle opening $\theta$ read in ST207 (ST209).

Here, the ECU 10 determines the engine torque Te, for example, on the basis of an engine torque map m1 illustrated in FIG. 14. In the engine torque map m1, the horizontal axis represents the degree of throttle opening $\theta$ and the vertical axis represents the engine torque Te. The engine torque map m1 describes the relationship between the degree of throttle opening $\theta$ and the engine torque Te. The relationship between the degree of throttle opening $\theta$ and the engine torque Te is set in advance on the basis of actual vehicle tests or the like and then the engine torque map m1 is stored in the storage unit of the ECU 10. In the engine torque map m1, the engine torque Te is set to increase with an increase in the degree of throttle opening $\theta$ as indicated by a solid line L31. In the engine torque map m1, the engine torque Te is set so that the fuel efficiency of the engine 4 is suitable and the operating point for the engine speed is located close to the above-mentioned operating point P12, and is typically set to be greater than that in a case where the accumulation of energy in the rotating body 30 is not considered (see a dotted line L32 in FIG. 14). The ECU 10 determines the engine torque Te from the degree of throttle opening $\theta$ read in ST207 on the basis of the engine torque map m1. Accordingly, the ECU 10 can drive the engine 4 at the operating point at which the fuel efficiency is suitable by controlling the engine 4 on the basis of the engine torque Te determined herein.

This embodiment describes that the ECU 10 calculates the engine torque Te using the engine torque map m1 illustrated in FIG. 14, but this embodiment is not limited to this description. The ECU 10 may calculate the engine torque Te on the basis of a mathematical model corresponding to the engine torque map m1 illustrated in FIG. 14. The same is true of various maps to be described below.

Referring to FIG. 13 again, after the engine torque Te is determined in ST209, the ECU 10 calculates the engagement speed Nm of the first clutch 41 on the basis of the engine output, the vehicle running conditions (mainly the degree of throttle opening θ), and the like and controls the engine speed Ne to the engagement speed Nm (ST210).

Then, the ECU 10 determines an inertial mass increasing rate Vf on the basis of the engine torque Te determined in ST209 (ST211). The inertial mass increasing rate Vf corresponds to the target control quantity of the rotation adjusting device 80. The ECU 10 controls the rotation adjusting device 80 on the basis of the inertial mass increasing rate Vf.

Here, the ECU 10 determines the inertial mass increasing rate Vf, for example, on the basis of an inertial mass increasing rate map m2 illustrated in FIG. 15. In the inertial mass increasing rate map m2, the horizontal axis represents the engine torque Te and the vertical axis represents the inertial mass increasing rate Vf. The inertial mass increasing rate map m2 describes a relationship between the engine torque Te and the inertial mass increasing rate Vf. In the inertial mass increasing rate map m2, the relationship between the engine torque Te and the inertial mass increasing rate Vf is set in advance on the basis of actual vehicle tests or the like and is stored in the storage unit of the ECU 10. In the inertial mass increasing rate map m2, the inertial mass increasing rate Vf is set to increase with the increase in the engine torque Te as indicated by a solid line L41. In the inertial mass increasing rate map m2, the inertial mass increasing rate Vf is set depending on the energy level to be accumulated in the rotating body 30 so as to generate an appropriate start-driving torque as the power used for running of the vehicle 2 with respect to the engine torque Te. The ECU 10 determines the inertial mass increasing rate Vf from the engine torque Te determined in ST209 on the basis of the inertial mass increasing rate map m2. Accordingly, the ECU 10 can accumulate the surplus power to the power used for running of the vehicle 2 out of the power generated by the engine 4 in the rotating body 30 while driving the engine 4 at the operating point at which the fuel efficiency is suitable, by controlling the rotation adjusting device 80 on the basis of the inertial mass increasing rate Vf determined herein.

Referring to FIG. 13 again, after the inertial mass increasing rate Vf is determined in ST211, the ECU 10 actually controls the rotation adjusting device 80 on the basis of the inertial mass increasing rate Vf and controls the increase of the rotation speed of the rotating body 30 so as to accumulate the energy as an apparent inertial mass increase control (ST212), and controls the output of the engine 4 on the basis of the engine torque Te as the start control (ST213).

Then, the ECU 10 determines whether the rotation speed of the crank shaft 4a is synchronized with the rotation speed of the transmission input shaft 12 (ST214). The ECU 10 determines whether the relationship between the engagement speed Nm (engine speed Ne) and the input shaft speed Nin of the transmission input shaft 12 detected by the input shaft speed sensor 64 satisfies the determination expression expressed by Expression (11), for example, on the basis of the detection result of the input shaft speed sensor 64. In Expression (11), "δ" represents a predetermined error range between the engagement speed Nm and the input shaft speed Nin.

$$Nm - Nin < \delta \quad (11)$$

When it is determined that the relationship between the engagement speed Nm and the input shaft speed Nin does not satisfy the determination expression expressed by Expression (11) (NO in ST214), that is, when it is determined that the rotation speed of the crank shaft 4a is not synchronized with (is not equal to) the rotation speed of the transmission input shaft 12, the ECU 10 determines whether the vibration reducing apparatus body 20 reaches an inertial mass variation width limit (ST215). Here, the inertial mass variation width limit corresponds to a limit of an inertial mass which can vary by causing the rotation adjusting device 80 of the vibration reducing apparatus body 20 to control the rotation (controlling the speed increase) of the rotating body 30 and is set in advance depending on the specification of the rotation adjusting device 80. The ECU 10 can determine whether the vibration reducing apparatus body 20 reaches the inertial mass variation width limit, for example, on the basis of the rotation speed of the rotating body 30.

When it is determined that the vibration reducing apparatus body 20 reaches the inertial mass variation width limit (YES in ST215), the ECU 10 returns to ST213 and repeatedly performs the subsequent processes thereof. When it is determined that the vibration reducing apparatus body 20 does not reach the inertial mass variation width limit (NO in ST215), the ECU 10 returns to ST212 and repeatedly performs the subsequent processes thereof.

When it is determined in ST214 that the relationship between the engagement speed Nm and the input shaft speed Nin satisfies the determination expression expressed by Expression (11) (YES in ST214), that is, when it is determined that the rotation speed of the crank shaft 4a is synchronized with (is equal to) the rotation speed of the transmission input shaft 12, the ECU 10 controls the second clutch 42 and the third clutch 43 so as to switch the second clutch 42 and the third clutch 43 (ST216).

The ECU 10 controls the first clutch 41 to the engaged state (ST217) and ends the start mode (start control).

An example of the control of the ECU 10 will be described below with reference to the flowchart illustrated in FIG. 16. Here, a case where the deficient power in the power used for running of the vehicle 2 out of the power generated by the engine 4 is discharged from the rotating body 30 will be described.

As the start mode (start control) of the vehicle 2, first, the ECU 10 starts the engine 4 in response to a driver's operation or the like (ST301).

Then, as the idling rotation control, the ECU 10 controls the engine 4 so that the engine speed reaches a predetermined idling rotation speed (ST302).

Then, the ECU 10 determines whether the engine speed reaches the idling rotation speed using Expression (1) or the like as described above (ST303).

When it is determined that the engine speed does not reach the idling rotation speed (NO in ST303), the ECU 10 returns to ST302 and repeatedly performs the subsequent processes thereof.

When it is determined that the engine speed reaches the idling rotation speed (YES in ST303), the ECU 10 controls the third clutch 43 to the engaged state (ST304).

Then, the ECU 10 determines whether the engagement of the third clutch 43 is completed using Expression (2) or the like as described above (ST305).

When it is determined that the engagement of the third clutch 43 is not completed (NO in ST305), the ECU 10 returns to ST304 and repeatedly performs the subsequent processes thereof.

When it is determined that the rotation speed of the intermediate shaft 54 is synchronized with the rotation speed of the rotation shaft 50 and the engagement of the third clutch 43 is completed (YES in ST305), the ECU 10 determines whether a slope signal or a sudden start signal is in an ON state (ST306). The ECU 10 determines whether a slope signal or a sudden start signal is in an ON state, for example, on the basis of a state of a driving mode selection switch for selecting a slope mode or a sudden start mode or a signal from a detector for detecting the slope of a road.

When it is determined that the slope signal or the sudden start signal is in an OFF state (NO in ST306), the ECU 10 returns to ST206 described with reference to FIG. 13 and repeatedly performs the subsequent processes thereof.

When it is determined that the slope signal or the sudden start signal is in the ON state (YES in ST306), the ECU 10 waits for a throttle signal (or an accelerator signal) while waiting until the engine speed reaches the idling rotation speed (ST307).

Then, the ECU 10 reads the degree of throttle opening θ on the basis of the detection result of the throttle opening sensor 61, or the like (ST308).

Then, the ECU 10 determines whether the degree of throttle opening θ is greater than 0 on the basis of the degree of throttle opening θ read in ST308 (ST309).

When it is determined that the degree of throttle opening θ is equal to or less than 0 (NO in ST309), the ECU 10 determines whether the vibration reducing apparatus body 20 reaches the inertial mass variation width limit (the upper limit of the speed increase control of the rotating body 30 herein) (ST310).

When it is determined that the vibration reducing apparatus body 20 reaches the inertial mass variation width limit (YES in ST310), the ECU 10 returns to ST309 and repeatedly performs the subsequent processes thereof.

When it is determined that the vibration reducing apparatus body 20 does not reach the inertial mass variation width limit (NO in ST310), the ECU 10 controls the rotation adjusting device 80 so as to control the rotation speed increase of the rotating body 30 to accumulate energy as the apparent inertial mass increase control (ST311), then returns to ST308, and repeatedly performs the subsequent processes thereof.

When it is determined in ST309 that the degree of throttle opening θ is greater than 0 (YES in ST309), the ECU 10 determines the engine torque Te in a designated mode, that is, a slope or sudden start mode, on the basis of the degree of throttle opening θ read in ST308 (ST312). Here, the ECU 10 basically determines the engine torque Te from the degree of throttle opening θ so that the engine 4 operates at the operating point at which the fuel efficiency is suitable, as described above in ST209. When sufficient energy is not accumulated in the rotating body 30 or the like, the ECU 10 determines the engine torque Th in anticipation of the deficient energy even with slight departure from the operating point at which the fuel efficiency is suitable.

After the engine torque Te is determined in ST312, the ECU 10 calculates the engagement speed Nm of the first clutch 41 in the designated mode such as a slope or sudden start mode on the basis of the engine output, the vehicle running conditions (mainly the degree of throttle opening θ), and the like, and controls the engine speed Ne to the engagement speed Nm (ST313).

Then, the ECU 10 determines an inertial mass decreasing rate Vf, that is, a rotating body (flywheel) torque Tf, on the basis of the engine torque Te determined in ST312 (ST314). The inertial mass decreasing rate Vf corresponds to a target control quantity of the rotation adjusting device 80. The ECU 10 controls the rotation adjusting device 80 on the basis of the inertial mass decreasing rate Vf. The ECU 10 determines the inertial mass decreasing rate Vf from the engine torque Te determined in ST312, for example, on the basis of a map or the like. Here, the ECU 10 determines the inertial mass decreasing rate Vf depending on the deficient power in the power used for running of the vehicle 2 out of the power generated by the engine 4. Accordingly, the ECU 10 can secure proper starting performance and power performance, can drive the engine 4 at the operating point at which the fuel efficiency is suitable, and can achieve additional improvement in fuel efficiency, by controlling the rotation adjusting device 80 on the basis of the inertial mass decreasing rate Vf determined herein.

Then, the ECU 10 actually controls the rotation adjusting device 80 on the basis of the inertial mass decreasing rate Vf and controls the decrease of the rotation speed of the rotating body 30 so as to discharge the energy (ST315) as an apparent inertial mass increase control, and controls the output of the engine 4 on the basis of the engine torque Te as the start control (ST316).

Then, the ECU 10 determines whether the rotation speed of the crank shaft 4a is synchronized with the rotation speed of the transmission input shaft 12 using Expression (11) as described above (ST317).

When it is determined that the rotation speed of the crank shaft 4a is not synchronized with (is not equal to) the rotation speed of the transmission input shaft 12 (NO in ST317), the ECU 10 determines whether the vibration reducing apparatus body 20 reaches an inertial mass variation width limit (the lower limit of the deceleration control of the rotating body 30 herein) (ST318).

When it is determined that the vibration reducing apparatus body 20 reaches the inertial mass variation width limit (YES in ST318), the ECU 10 controls the rotation adjusting device 80 so as to set the rotating body (flywheel) torque Tf to 0 (ST319), then returns to ST316, and repeatedly performs the subsequent processes thereof.

When it is determined that the vibration reducing apparatus body 20 does not reach the inertial mass variation width limit (NO in ST318), the ECU 10 returns to ST315 and repeatedly performs the subsequent processes thereof.

When it is determined in ST317 that the rotation speed of the crank shaft 4a is synchronized with (is equal to) the rotation speed of the transmission input shaft 12 (YES in ST317), the ECU 10 controls the second clutch 42 and the third clutch 43 to switch the second clutch 42 and the third clutch 43 (ST320).

The ECU 10 controls the first clutch 41 to the engaged state (ST321) and ends the start mode (start control).

The above-mentioned vehicle vibration reducing apparatus 301 according to this embodiment can achieve both the reduction in vibration and the improvement in fuel efficiency and can properly reduce vibration.

In the above-mentioned vehicle vibration reducing apparatus 301 according to this embodiment, the rotation adjusting device 80 is controlled on the basis of the output of the engine 4 so as to adjust the rotation of the rotating body 30. Accordingly, in the vehicle vibration reducing apparatus 301, since the engine 4 can be driven in an area having high fuel efficiency after accumulating or discharging energy in or from the rotating body 30 in response to a driver's acceleration request or the like, it is possible to achieve additional improvement in fuel efficiency.

Embodiment 4

Figure 17:
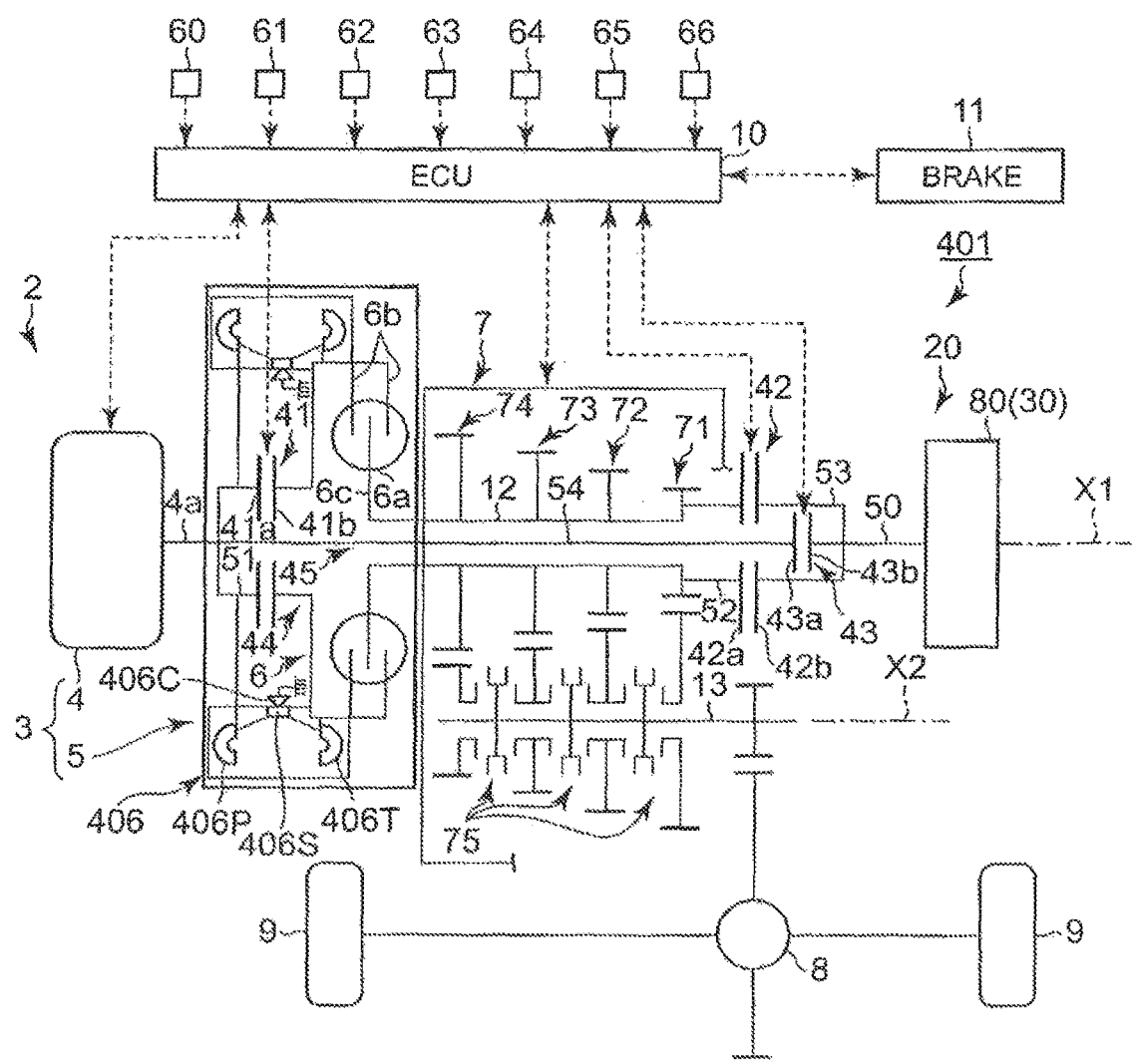
FIG. 17 is a diagram schematically illustrating a configuration of a vehicle vibration reducing apparatus according to Embodiment 4.

FIG. 17 is a diagram schematically illustrating a configuration of a vehicle vibration reducing apparatus according to Embodiment 4. The vehicle vibration reducing apparatus according to Embodiment 4 is different from the vehicle vibration reducing apparatus according to Embodiment 3 in the configuration of the fluid transmission mechanism.

As illustrated in FIG. 17, the power transmission device 5 of the power train 3 to which the vehicle vibration reducing apparatus 401 according to this embodiment is applied includes a torque converter 406 as the fluid transmission mechanism that can transmit the rotational power via a fluid such as operating oil. The torque converter 406 is a kind of fluid coupling and includes a pump (pump impeller) 406P coupled to the intermediate shaft 51 so as to be rotatable as a unified body therewith, a turbine (turbine runner) 406T coupled to the damper 6 so as to be rotatable as a unified body therewith, a stator 406S, and a one-way clutch 406C, a space between the pump 406P and the turbine 406T in a housing is filled with a fluid. The torque converter 406 transmits the rotational power transmitted to the pump 406P to the turbine 406T via the fluid. Similarly to Embodiment 3, the first clutch 41 and the damper 6 are attached to the torque converter 406, and the first clutch 41 is configured as a lockup clutch of the torque converter 406. When the first clutch 41 as the lockup clutch is in the disengaged state, the torque converter 406 transmits the rotational power from the crank shaft 4a to the damper 6 via the intermediate shaft 51, the pump 406P, the fluid, and the turbine 406T. At the time of transmitting the power via the fluid, the torque converter 406 amplifies the torque at a predetermined torque ratio and transmits the amplified torque to the turbine 406T. On the other hand, when the first clutch 41 as the lockup clutch is in the engaged state, the torque converter 406 transmits the rotational power from the crank shaft 4a to the damper 6 via the intermediate shaft 51 and the first clutch 41 (without passing through the fluid). At the time of transmitting the power without using the fluid, the torque converter 406 transmits the torque with little change to the damper 6.

Similarly to Embodiment 3, the ECU 10 according to this embodiment controls the rotation adjusting device 80 on the basis of the output of the engine 4 so as to adjust the rotation of the rotating body 30. In this case, for example, when an engine angular velocity is defined as "ωe", a rotating body (flywheel) angular velocity is defined as "ωf", and a torque converter pump angular velocity is defined as "ωp", the relations of "ωe", "ωf", and "ωp" can be expressed, for example, by Expressions (3) and (4). For example, when the engine torque is defined as "Te", the rotating body (flywheel) torque is defined as "Tf", the torque converter pump torque is defined as "Tp", the torque converter turbine torque is defined as "Tt", the torque converter fluid transmission torque ratio is defined as "t", the torque converter capacity coefficient is defined as "Cp", the engine speed is defined as "Ne", and the rotating body (flywheel) inertial mass is defined as "If", the power transmission device (transmission) input torque at the time of accumulation of energy in the rotating body is defined as "Tml", and the power transmission device (transmission) input torque at the time of discharging of energy from the rotating body is defined as "Tmh", the relations thereof can be expressed, for example, by Expressions (12) to (14) in addition to Expressions (5) to (10).

$$Tt = t \cdot Tp \quad (12)$$

$$Tml = t \cdot Tp = t \cdot (Te - |Tf|) \quad (13)$$

$$Tmh = t \cdot Tp = t \cdot (Te + |Tf|) \quad (14)$$

That is, the vehicle vibration reducing apparatus 401 can control the increase in the engine speed and can control a vehicle acceleration, for example, by driving the engine 4 in an engine output condition having high efficiency, controlling the rotation adjusting device 80, and controlling the rotating body inertial mass if. At this time, the ECU 10 controls the output of the engine 4 and controls the rotating body inertial mass If in consideration of the torque ratio t of the torque converter 406.

The above-mentioned vehicle vibration reducing apparatus 401 according to this embodiment can achieve both the reduction in vibration and the improvement in fuel efficiency and thus can properly reduce the vibration.

In the above-mentioned vehicle vibration reducing apparatus 401 according to this embodiment, since the engine 4 can be driven in an area having high fuel efficiency after accumulating or discharging energy in or from the rotating body 30 in response to a driver's acceleration request or the like, it is possible to achieve additional improvement in fuel efficiency. At this time, in the vehicle vibration reducing apparatus 401, even when the engine output torque at the time of starting is relatively decreased, it is possible to secure the start performance of the vehicle 2 by the torque amplification operation of the torque converter 406.

Embodiment 5

Figure 18:
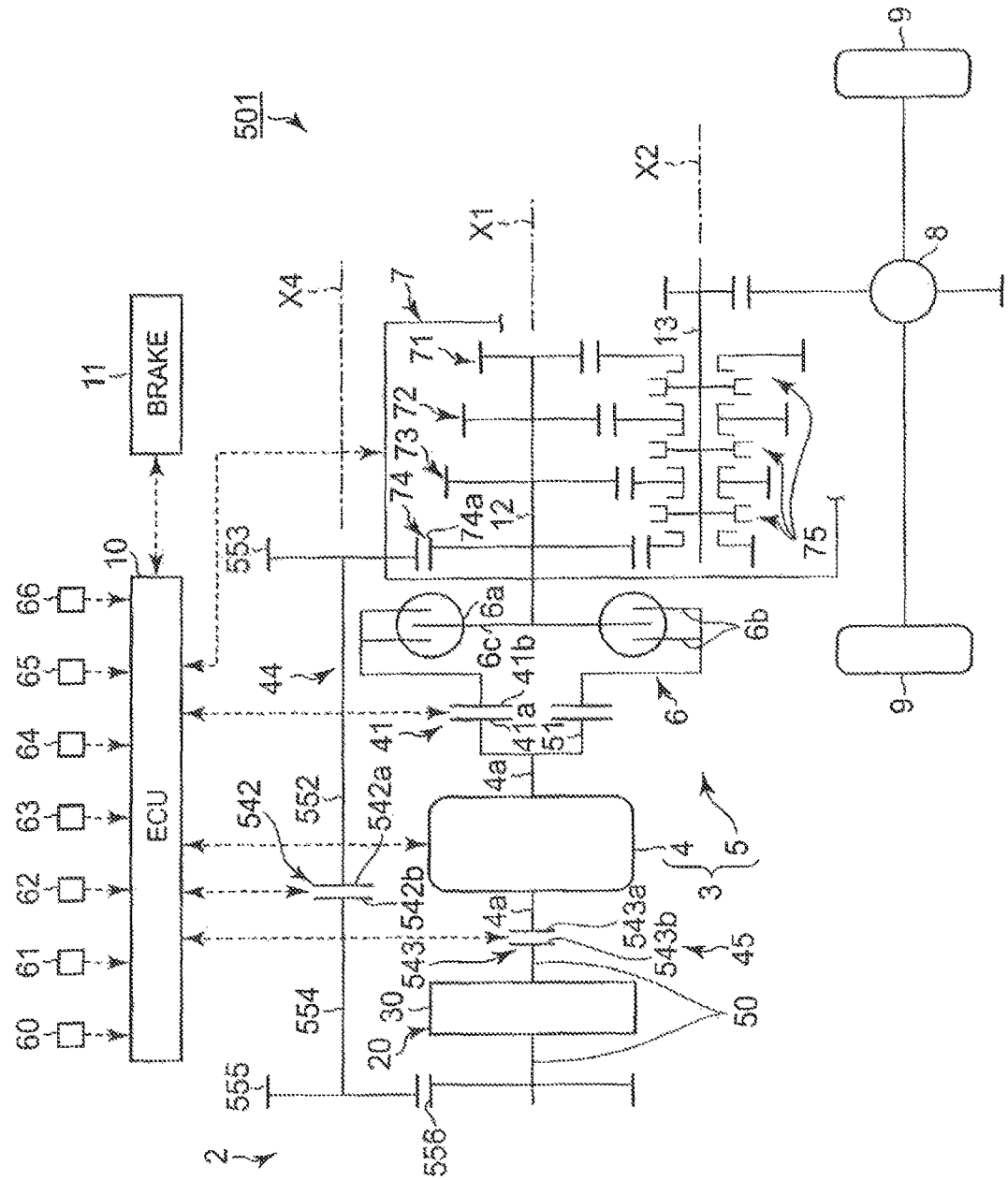
FIG. 18 is a diagram schematically illustrating a configuration of a vehicle vibration reducing apparatus according to Embodiment 5.
Figure 19:
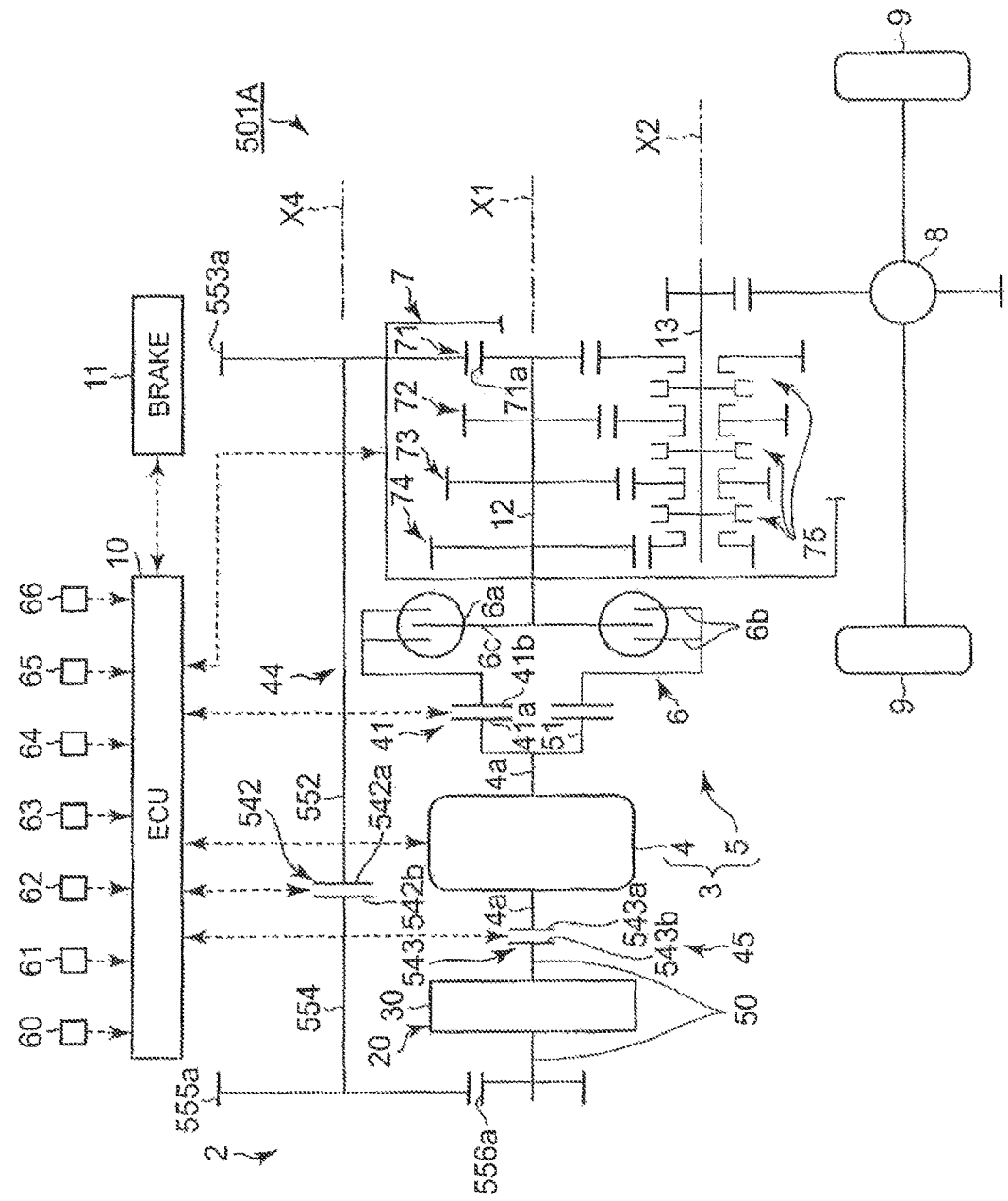
FIG. 19 is a diagram schematically illustrating a configuration of a vehicle vibration reducing apparatus according to a modification example.

FIG. 18 is a diagram schematically illustrating a configuration of a vehicle vibration reducing apparatus according to Embodiment 5 and FIG. 19 is a diagram schematically illustrating a configuration of a vehicle vibration reducing apparatus according to a modification example. The vehicle vibration reducing apparatus according to Embodiment 5 is different from the vehicle vibration reducing apparatuses according to Embodiments 1 and 2 and the like in arrangements of the inertial mass body, the engagement devices, and the like.

As illustrated in FIG. 18, in the vehicle vibration reducing apparatus 501 according to this embodiment, the rotating body 30 is arranged to be coaxial with the rotation axis line X1 and a second clutch 542 as the second engagement device is arranged to be coaxial with the rotation axis line X4 parallel to the rotation axis line X1. The vehicle vibration reducing apparatus 501 is configured so that the rotating body 30 is connectable to the transmission input shaft 12 via gears 556 and 555, an intermediate shaft 554, the second clutch 542, an intermediate shaft 552, a gear 553, a drive gear 74a, and the like. In the vehicle vibration reducing apparatus 501, the third clutch 543 as the third engagement device is arranged to be coaxial with the rotation axis line X1 between the rotating body 30 and the engine 4.

Specifically, the vehicle vibration reducing apparatus 501 includes a vibration reducing apparatus body 20 including the rotating body 30, the rotation shaft 50, and the like, the first clutch (first engagement device) 41, the second clutch (second engagement device) 542, and the third clutch (third engagement device) 543 as the plural engagement devices, and an ECU 10. Here, the rotation shaft 50 is disposed to penetrate the rotating body 30.

The rotating body 30 according to this embodiment is selectively connected to the crank shaft 4a or the transmission input shaft 12 via the first clutch 41, the second clutch 542, the third clutch 543, and the like so as to enable power transmission. The vibration reducing apparatus body 20, the first clutch 41, the ECU 10 and the like have the same configurations as in the vehicle vibration reducing apparatus 1 (see FIG. 1) and thus will be repeatedly described as little as possible.

The second clutch 542 according to this embodiment is a clutch for transmission/flywheel connection and can be switched to a state where the transmission input shaft 12 and the rotating body 30 engage with each other so as to enable power transmission and a state where the engagement is released. The second clutch 542 can be switched to an engaged state where a rotation member 542a on the transmission input shaft 12 side and a rotation member 542b on the rotating body 30 side engage with each other so as to enable power transmission to cause the transmission input shaft 12 and the rotating body 30 to engage with each other so as to enable power transmission and a disengaged state where the engagement is released.

Here, the rotation member 542a is a member that rotates as a unified body along with the intermediate shaft 552. The intermediate shaft 552 is coupled to the gear 553 so as to be rotatable as a unified body therewith. The gear 553 engages with the drive gear 74a of the transmission stage 74, which is coupled to the transmission input shaft 12 so as to be rotatable as a unified body therewith, so as to enable power transmission. On the other hand, the rotation member 542b is a member that rotates as a unified body along with the intermediate shaft 554. The intermediate shaft 554 is coupled to the gear 555 so as to be rotatable as a unified body therewith. The gear 555 engages with the gear 556, which is coupled to an end of the rotation shaft 50 penetrating the rotating body 30 so as to be rotatable as a unified body therewith, so as to enable power transmission. The rotation member 542a, the rotation member 542b, the intermediate shaft 552, the gear 553, the intermediate shaft 554, and the gear 555 are arranged to be coaxial with the rotation axis line X4 and are rotatable about the rotation axis line X4 with transmitted power. The gear 556 is arranged to be coaxial with the rotation axis line X1 and is rotatable about the rotation axis line X1 with transmitted power.

The third clutch 543 according to this embodiment is a clutch for engine/flywheel connection and can be switched to a state where the crank shaft 4a and the rotating body 30 engage with each other so as to enable power transmission and a state where the engagement is released. The third clutch 543 can be switched to an engaged state where a rotation member 543a on the crank shaft 4a side and a rotation member 543b on the rotating body 30 side engage with each other so as to enable power transmission to cause the crank shaft 4a and the rotating body 30 to engage with each other so as to enable power transmission and a disengaged state where the engagement is released.

Here, the rotation member 543a is a member that rotates as a unified body along with the crank shaft 4a. The rotation member 543a in this embodiment is disposed at the opposite end of the end on the side of the crank shaft 4a on which the intermediate shaft 51 is disposed. On the other hand, the rotation member 543b is a member that rotates as a unified body along with the rotation shaft 50. The rotation member 543b in this embodiment is disposed at the opposite end of an end on the side of the rotation shaft 50 penetrating the rotating body 30 on which the gear 556 is disposed. The rotation member 543a and the rotation member 543b are arranged to be coaxial with the rotation axis line X1 and are rotatable about the rotation axis line X1 with transmitted power.

In the vehicle vibration reducing apparatus 501 having the above-mentioned configuration, the first clutch 41 and the second clutch 542 are switched to the engaged state and the third clutch 543 is switched to the disengaged state, whereby a first path 44 is set up. In this case, the rotating body 30 is connected to the transmission input shaft 12. As a result, in the vibration reducing apparatus body 20, the rotating body 30 is connected to the power transmission device 5 and the inertial mass of the rotating body 30 can be added to the inertial mass on the driven side (the driving wheel side) downstream from the damper spring 6a. In this case, the rotational power transmitted from the engine 4 side or the driving wheel 9 side to the transmission input shaft 12 is input (transmitted) to the rotation shaft 50 sequentially via the drive gear 74a, the gear 553, the intermediate shaft 552, the second clutch 542, the intermediate shaft 554, the gear 555, the gear 556, and the like and is then transmitted to the rotating body 30. At this time, the power transmitted from the transmission input shaft 12 to the rotation shaft 50 is shifted depending on the transmission gear ratio (gear ratio) in the drive gear 74a and the gear 553 and the transmission gear ratio in the gear 555 and the gear 556, and is then transmitted to the rotating body 30 side.

In the vehicle vibration reducing apparatus 501, at least the second clutch 542 is switched to the disengaged state and the third clutch 543 is switched to the engaged state, whereby a second path 45 is set up. In this case, the rotating body 30 is directly connected to the crank shaft 4a. As a result, in the vibration reducing apparatus body 20, the rotating body 30 can be connected to the engine 4 and the inertial mass of the rotating body 30 can be added to the inertial mass on the driving side (the power source side) upstream from the damper spring 6a. At this time, the rotational power from the engine 4 side is input (transmitted) to the rotation shaft 50 via the third clutch 543 and is then transmitted to the rotating body 30, and the transmission of the rotational power from the transmission input shaft 12 side to the rotating body 30 side is blocked by the second clutch 542.

Here, the transmission gear ratio in the drive gear 74a and the gear 553 and the transmission gear ratio in the gear 556 and the gear 555 are set to be uniform, but the present invention is not limited to this setting. The transmission gear ratio in the drive gear 74a and the gear 553 and the transmission gear ratio in the gear 556 and the gear 555 can be appropriately set depending on various requirements.

In the above-mentioned vehicle vibration reducing apparatus 501 according to this embodiment, it is possible to achieve both the reduction in vibration and the improvement in fuel efficiency, thereby properly reducing the vibration.

FIG. 19 illustrates a vehicle vibration reducing apparatus 501A according to a modification example. The vehicle vibration reducing apparatus 501A is different from the above-mentioned vehicle vibration reducing apparatus in the engagement position of the gear 553a coupled to the intermediate shaft 552 so as to be rotatable as a unified body therewith. A gear 553a in this modification example engages with a drive gear 71a of the transmission stage 71, which is coupled to the transmission input shaft 12 so as to be rotatable as a unified body therewith, so as to enable power transmission. The vehicle vibration reducing apparatus 501A according to this modification example is provided with a gear 555a instead of the gear 555 and is provided with a gear 556a instead of the gear 556. In the vehicle vibration reducing apparatus 501A according to this modification example, the transmission gear ratio in the drive gear 71a and the gear 553a and the transmission gear ratio in the gear 556a and the gear 555a are set to be uniform.

In this case, the vehicle vibration reducing apparatus 501A can achieve both the reduction in vibration and the improvement in fuel efficiency and can properly reduce vibration.

Embodiment 6

Figure 20:
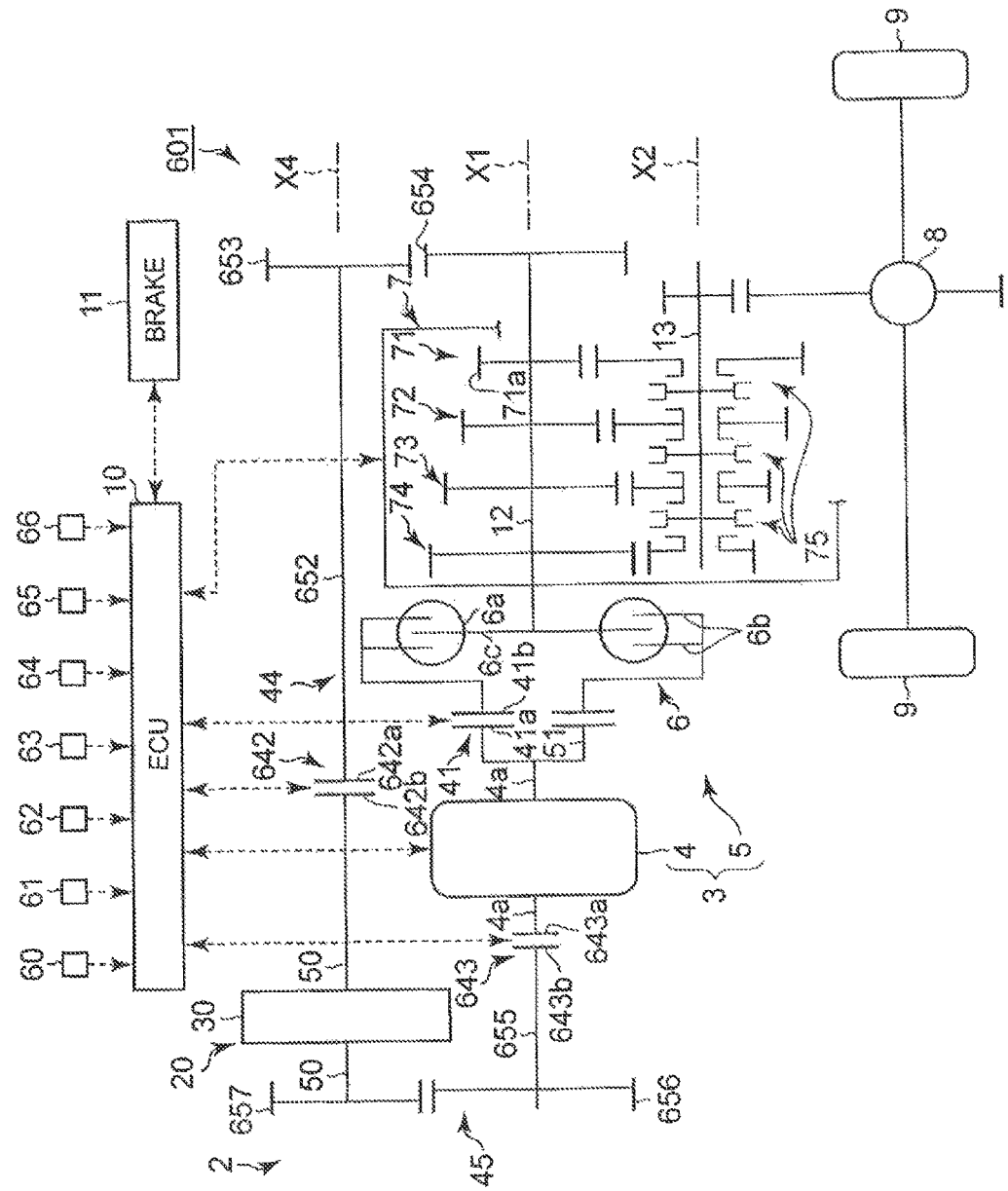
FIG. 20 is a diagram schematically illustrating a configuration of a vehicle vibration reducing apparatus according to Embodiment 6.

FIG. 20 is a diagram schematically illustrating a configuration of a vehicle vibration reducing apparatus according to Embodiment 6. The vehicle vibration reducing apparatus according to Embodiment 6 is different from the vehicle vibration reducing apparatuses according to Embodiments 1, 2, and 5 and the like in arrangements of the inertial mass body, the engagement devices, and the like.

As illustrated in FIG. 20, in the vehicle vibration reducing apparatus 601 according to this embodiment, the rotating body 30 and a second clutch 642 as the second engagement device are arranged to be coaxial with the rotation axis line X4. The vehicle vibration reducing apparatus 601 is configured so that the rotating body 30 is connectable to the transmission input shaft 12 via the second clutch 642, an intermediate shaft 652, a gear 653, a gear 654, and the like. In the vehicle vibration reducing apparatus 601, a third clutch 643 as the third engagement device is arranged to be coaxial with the rotation axis line X1 between a gear 656 and the engine 4.

Specifically, the vehicle vibration reducing apparatus 601 includes a vibration reducing apparatus body 20 including the rotating body 30, the rotation shaft 50, and the like, the first clutch (first engagement device) 41, the second clutch (second engagement device) 642, and the third clutch (third engagement device) 643 as the plural engagement devices, and an ECU 10. Here, the rotation shaft 50 is disposed to penetrate the rotating body 30.

The rotating body 30 according to this embodiment is selectively connected to the crank shaft 4a or the transmission input shaft 12 via the first clutch 41, the second clutch 642, the third clutch 643, and the like so as to enable power transmission. The vibration reducing apparatus body 20, the first clutch 41, the ECU 10 and the like have the same configurations as in the vehicle vibration reducing apparatus 1 (see FIG. 1) and thus will be repeatedly described as little as possible.

The second clutch 642 according to this embodiment is a clutch for transmission/flywheel connection and can be switched to a state where the transmission input shaft 12 and the rotating body 30 engage with each other so as to enable power transmission and a state where the engagement is released. The second clutch 642 can be switched to an engaged state where a rotation member 642a on the transmission input shaft 12 side and a rotation member 642b on the rotating body 30 side engage with each other so as to enable power transmission to cause the transmission input shaft 12 and the rotating body 30 to engage with each other so as to enable power transmission and a disengaged state where the engagement is released.

Here, the rotation member 642a is a member that rotates as a unified body along with the intermediate shaft 652. The intermediate shaft 652 is coupled to the gear 653 so as to be rotatable as a unified body therewith. The gear 653 engages with a gear 654, which is coupled to the transmission input shaft 12 so as to be rotatable as a unified body therewith, so as to enable power transmission. On the other hand, the rotation member 642b is a member that rotates as a unified body along with the rotation shaft 50. The rotation member 642b is coupled to an end of the rotation shaft 50 penetrating the rotating body 30 so as to be rotatable as a unified body therewith. The rotation member 642a, the rotation member 642b, the intermediate shaft 652, and the gear 653 are arranged to be coaxial with the rotation axis line X4 and are rotatable about the rotation axis line X4 with transmitted power. The gear 654 is arranged to be coaxial with the rotation axis line X1 and is rotatable about the rotation axis line X1 with transmitted power.

The third clutch 643 according to this embodiment is a clutch for engine/flywheel connection and can be switched to a state where the crank shaft 4a and the rotating body 30 engage with each other so as to enable power transmission and a state where the engagement is released. The third clutch 643 can be switched to an engaged state where a rotation member 643a on the crank shaft 4a side and a rotation member 643b on the rotating body 30 side engage with each other so as to enable power transmission to cause the crank shaft 4a and the rotating body 30 to engage with each other so as to enable power transmission and a disengaged state where the engagement is released.

Here, the rotation member 643a is a member that rotates as a unified body along with the crank shaft 4a. The rotation member 643a in this embodiment is disposed at the opposite end of the end on the side of the crank shaft 4a on which the intermediate shaft 51 is disposed. On the other hand, the rotation member 643b is a member that rotates as a unified body along with the rotation shaft 50. The rotation member 643b in this embodiment is coupled to an intermediate shaft 655 so as to be rotatable as a unified body therewith. The intermediate shaft 655 is coupled to a gear 656 so as to be rotatable as a unified body therewith. The gear 656 engages with a gear 657, which is coupled to an end of the rotation shaft 50 penetrating the rotating body 30 so as to be rotatable as a unified body therewith, so as to enable power transmission. The gear 657 is disposed at the opposite end of an end on the side of the rotation shaft 50 on which the rotation member 642b is disposed. The rotation member 643a, the rotation member 643b, the intermediate shaft 655, and the gear 656 are arranged to be coaxial with the rotation axis line X1 and are rotatable about the rotation axis line X1 with transmitted power. The gear 657 is arranged to be coaxial with the rotation axis line X4 and is rotatable about the rotation axis line X4 with transmitted power.

In the vehicle vibration reducing apparatus 601 having the above-mentioned configuration, the first clutch 41 and the second clutch 642 are switched to the engaged state and the third clutch 643 is switched to the disengaged state, whereby a first path 44 is set up. In this case, the rotating body 30 is connected to the transmission input shaft 12. As a result, in the vibration reducing apparatus body 20, the rotating body 30 is connected to the power transmission device 5 and the inertial mass of the rotating body 30 can be added to the inertial mass on the driven side (the driving wheel side) downstream from the damper spring 6a. In this case, the rotational power transmitted from the engine 4 side or the driving wheel 9 side to the transmission input shaft 12 is input (transmitted) to the rotation shaft 50 sequentially via the gear 654, the gear 653, the intermediate shaft 652, the second clutch 642, and the like and is then transmitted to the rotating body 30. At this time, the power transmitted from the transmission input shaft 12 to the rotation shaft 50 is shifted depending on the transmission gear ratio (gear ratio) in the gear 654 and the gear 653, and is then transmitted to the rotating body 30 side.

In the vehicle vibration reducing apparatus 601, at least the second clutch 642 is switched to the disengaged state and the third clutch 643 is switched to the engaged state, whereby a second path 45 is set up. In this case, the rotating body 30 is directly connected to the crank shaft 4a. As a result, in the vibration reducing apparatus body 20, the rotating body 30 can be connected to the engine 4 and the inertial mass of the rotating body 30 can be added to the inertial mass on the driving side (the power source side) upstream from the damper spring 6a. At this time, the rotational power from the engine 4 side is input (transmitted) to the rotation shaft 50 sequentially via the third clutch 643, the intermediate shaft 655, the gear 656, the gear 657, and the like and is then transmitted to the rotating body 30, and the transmission of the rotational power from the transmission input shaft 12 side to the rotating body 30 side is blocked by the second clutch 642. At this time, the power transmitted from the engine 4 to the rotation shaft 50 is shifted depending on the transmission gear ratio (gear ratio) in the gear 656 and the gear 657, and is then transmitted to the rotating body 30 side.

Here, the transmission gear ratio in the gear 653 and the gear 654 and the transmission gear ratio in the gear 656 and the gear 657 are preferably set to be uniform after the rotation directions of the rotational power are set to the same direction in a case where the rotational power is transmitted to the rotating body 30 via the first path 44 and a case where the rotational power is transmitted to the rotating body 30 via the second path 45, but the present invention is not limited to this setting. The transmission gear ratio in the gear 653 and the gear 654 and the transmission gear ratio in the gear 656 and the gear 657 can be appropriately set depending on various requirements.

In the above-mentioned vehicle vibration reducing apparatus 601 according to this embodiment, it is possible to achieve both the reduction in vibration and the improvement in fuel efficiency, thereby properly reducing the vibration.

Embodiment 7

Figure 21:
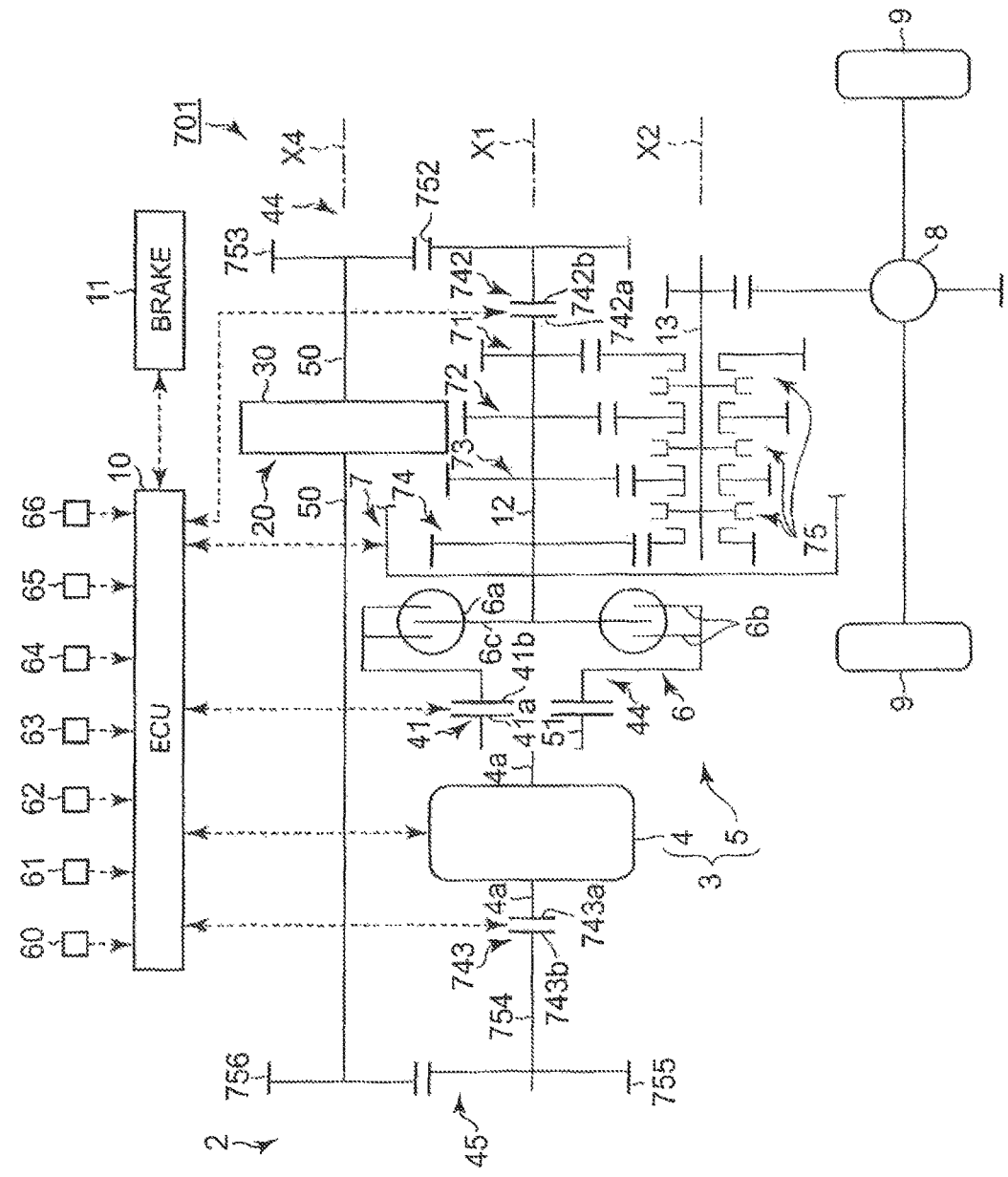
FIG. 21 is a diagram schematically illustrating a configuration of a vehicle vibration reducing apparatus according to Embodiment 7.

FIG. 21 is a diagram schematically illustrating a configuration of a vehicle vibration reducing apparatus according to Embodiment 7. The vehicle vibration reducing apparatus according to Embodiment 7 is different from the vehicle vibration reducing apparatuses according to Embodiments 1, 2, 5, and 6 and the like in arrangements of the inertial mass body, the engagement devices, and the like.

As illustrated in FIG. 21, in the vehicle vibration reducing apparatus 701 according to this embodiment, the rotating body 30 is arranged to be coaxial with the rotation axis line X4, and a second clutch 742 as the second engagement device is arranged to be coaxial with the rotation axis line X1. The vehicle vibration reducing apparatus 701 is configured so that the rotating body 30 is connectable to the transmission input shaft 12 via a gear 753, a gear 752, the second clutch 742, and the like. In the vehicle vibration reducing apparatus 701, a third clutch 743 as the third engagement device is arranged to be coaxial with the rotation axis line X1 between a gear 755 and the engine 4.

Specifically, the vehicle vibration reducing apparatus 701 includes a vibration reducing apparatus body 20 including the rotating body 30, the rotation shaft 50, and the like, the first clutch (first engagement device) 41, the second clutch (second engagement device) 742, and the third clutch (third engagement device) 743 as the plural engagement devices, and an ECU 10. Here, the rotation shaft 50 is disposed to penetrate the rotating body 30.

The rotating body 30 according to this embodiment is selectively connected to the crank shaft 4a or the transmission input shaft 12 via the first clutch 41, the second clutch 742, the third clutch 743, and the like so as to enable power transmission. The vibration reducing apparatus body 20, the first clutch 41, the ECU 10 and the like have the same configurations as in the vehicle vibration reducing apparatus 1 (see FIG. 1) and thus will be repeatedly described as little as possible.

The second clutch 742 according to this embodiment is a clutch for transmission/flywheel connection and can be switched to a state where the transmission input shaft 12 and the rotating body 30 engage with each other so as to enable power transmission and a state where the engagement is released. The second clutch 742 can be switched to an engaged state where a rotation member 742a on the transmission input shaft 12 side and a rotation member 742b on the rotating body 30 side engage with each other so as to enable power transmission to cause the transmission input shaft 12 and the rotating body 30 to engage with each other so as to enable power transmission and a disengaged state where the engagement is released.

Here, the rotation member 742a is a member that rotates as a unified body along with the transmission input shaft 12. The rotation member 742a is coupled to the transmission input shaft 12 so as to be rotatable as a unified body therewith. On the other hand, the rotation member 742b is a member that rotates as a unified body along with the rotation shaft 50. The rotation member 742b is coupled to a gear 752 so as to be rotatable as a unified body therewith. The gear 752 engages with a gear 753, which is coupled to an end of the rotation shaft 50 penetrating the rotating body 30 so as to be rotatable as a unified body therewith, so as to enable power transmission. The rotation member 742a, the rotation member 742b, and the gear 752 are arranged to be coaxial with the rotation axis line X1 and are rotatable about the rotation axis line X1 with transmitted power. The gear 753 is arranged to be coaxial with the rotation axis line X4 and is rotatable about the rotation axis line X4 with transmitted power.

The third clutch 743 according to this embodiment is a clutch for engine/flywheel connection and can be switched to a state where the crank shaft 4a and the rotating body 30 engage with each other so as to enable power transmission and a state where the engagement is released. The third clutch 743 can be switched to an engaged state where a rotation member 743a on the crank shaft 4a side and a rotation member 743b on the rotating body 30 side engage with each other so as to enable power transmission to cause the crank shaft 4a and the rotating body 30 to engage with each other so as to enable power transmission and a disengaged state where the engagement is released.

Here, the rotation member 743a is a member that rotates as a unified body along with the crank shaft 4a. The rotation member 743a in this embodiment is disposed at the opposite end of the end on the side of the crank shaft 4a on which the intermediate shaft 51 is disposed. On the other hand, the rotation member 743b is a member that rotates as a unified body along with the rotation shaft 50. The rotation member 743b in this embodiment is coupled to an intermediate shaft 754 so as to be rotatable as a unified body therewith. The intermediate shaft 754 is coupled to a gear 755 so as to be rotatable as a unified body therewith. The gear 755 engages with a gear 756, which is coupled to an end of the rotation shaft 50 penetrating the rotating body 30 so as to be rotatable as a unified body therewith, so as to enable power transmission. The gear 756 is disposed at the opposite end of an end on the side of the rotation shaft 50 on which the gear 753 is disposed. The rotation member 743a, the rotation member 743b, the intermediate shaft 754, and the gear 755 are arranged to be coaxial with the rotation axis line X1 and are rotatable about the rotation axis line X1 with transmitted power. The gear 756 is arranged to be coaxial with the rotation axis line X4 and is rotatable about the rotation axis line X4 with transmitted power.

In the vehicle vibration reducing apparatus 701 having the above-mentioned configuration, the first clutch 41 and the second clutch 742 are switched to the engaged state and the third clutch 743 is switched to the disengaged state, whereby a first path 44 is set up. In this case, the rotating body 30 is connected to the transmission input shaft 12. As a result, in the vibration reducing apparatus body 20, the rotating body 30 is connected to the power transmission device 5 and the inertial mass of the rotating body 30 can be added to the inertial mass on the driven side (the driving wheel side) downstream from the damper spring 6a. In this case, the rotational power transmitted from the engine 4 side or the driving wheel 9 side to the transmission input shaft 12 is input (transmitted) to the rotation shaft 50 sequentially via the second clutch 742, the gear 752, the gear 753, and the like and is then transmitted to the rotating body 30. At this time, the power transmitted from the transmission input shaft 12 to the rotation shaft 50 is shifted depending on the transmission gear ratio (gear ratio) in the gear 752 and the gear 753, and is then transmitted to the rotating body 30 side.

In the vehicle vibration reducing apparatus 701, at least the second clutch 742 is switched to the disengaged state and the third clutch 743 is switched to the engaged state, whereby a second path 45 is set up. In this case, the rotating body 30 is directly connected to the crank shaft 4a. As a result, in the vibration reducing apparatus body 20, the rotating body 30 can be connected to the engine 4 and the inertial mass of the rotating body 30 can be added to the inertial mass on the driving side (the power source side) upstream from the damper spring 6a. At this time, the rotational power from the engine 4 side is input (transmitted) to the rotation shaft 50 sequentially via the third clutch 743, the intermediate shaft 754, the gear 755, the gear 756, and the like and is then transmitted to the rotating body 30, and the transmission of the rotational power from the transmission input shaft 12 side to the rotating body 30 side is blocked by the second clutch 742. At this time, the power transmitted from the engine 4 to the rotation shaft 50 is shifted depending on the transmission gear ratio (gear ratio) in the gear 755 and the gear 756, and is then transmitted to the rotating body 30 side.

Here, the transmission gear ratio in the gear 752 and the gear 753 and the transmission gear ratio in the gear 755 and the gear 756 are set to be non-uniform after the rotation directions of the rotational power are set to the same direction in a case where the rotational power is transmitted to the rotating body 30 via the first path 44 and a case where the rotational force is transmitted to the rotating body 30 via the second path 45, but the present invention is not limited to this setting. The transmission gear ratio in the gear 752 and the gear 753 and the transmission gear ratio in the gear 755 and the gear 756 can be appropriately set depending on various requirements.

In the above-mentioned vehicle vibration reducing apparatus 701 according to this embodiment, it is possible to achieve both the reduction in vibration and the improvement in fuel efficiency, thereby properly reducing the vibration.

Embodiment 8

Figure 22:
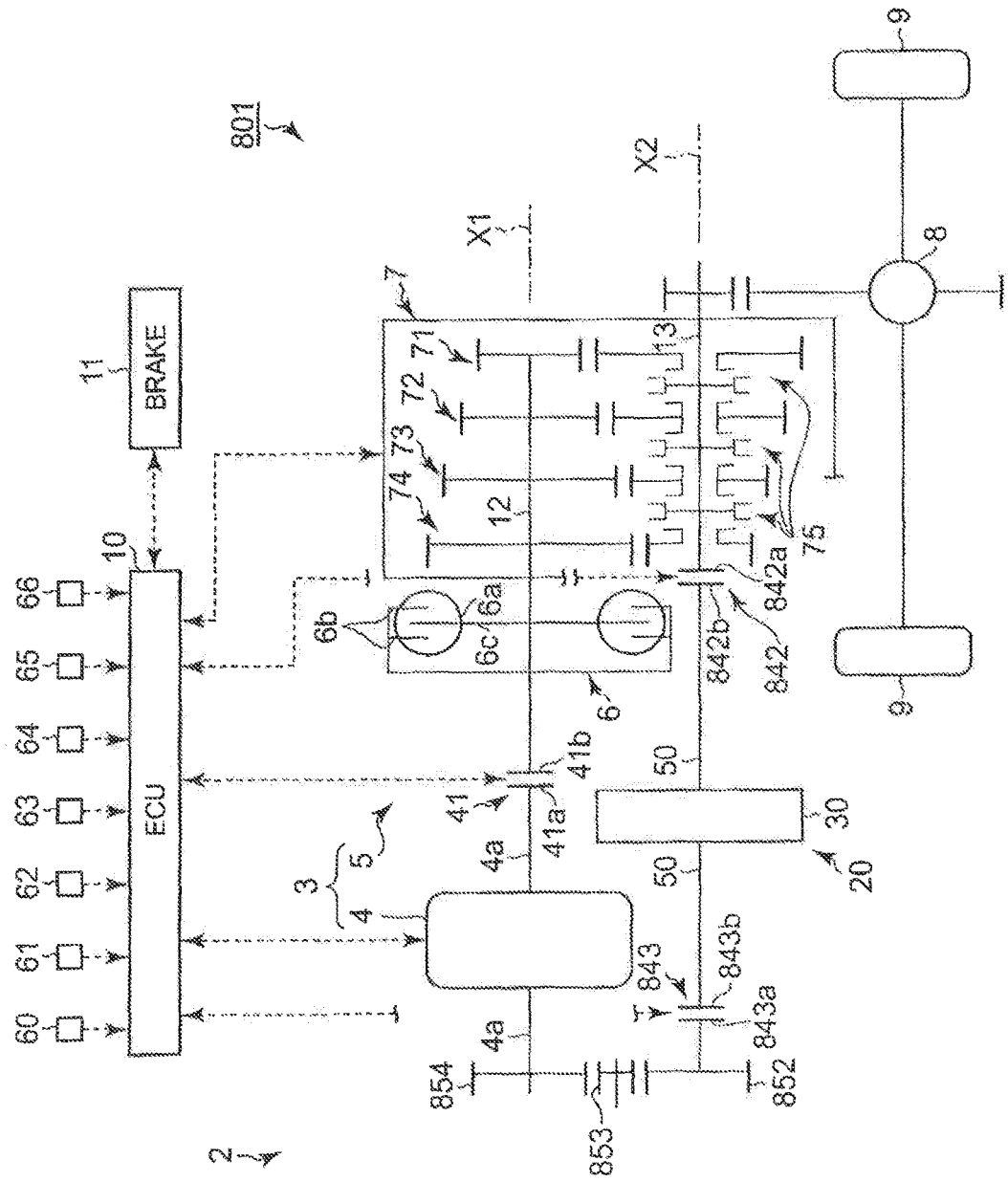
FIG. 22 is a diagram schematically illustrating a configuration of a vehicle vibration reducing apparatus according to Embodiment 8.

FIG. 22 is a diagram schematically illustrating a configuration of a vehicle vibration reducing apparatus according to Embodiment 8. The vehicle vibration reducing apparatus according to Embodiment 8 is different from the vehicle vibration reducing apparatuses according to Embodiments 1, 2, 5, 6, and 7 and the like in arrangements of the inertial mass body, the engagement devices, and the like.

As illustrated in FIG. 22, in the vehicle vibration reducing apparatus 801 according to this embodiment, the rotating body 30 is arranged to be coaxial with the rotation axis line X2, and a second clutch 842 as the second engagement device is arranged to be coaxial with the rotation axis line X2. The vehicle vibration reducing apparatus 801 is configured so that the rotating body 30 is connectable to the transmission output shaft 13 via the second clutch 842. In the vehicle vibration reducing apparatus 801, a third clutch 843 as the third engagement device is arranged to be coaxial with the rotation axis line X2 between a gear 852 and the rotating body 30.

Specifically, the vehicle vibration reducing apparatus 801 includes a vibration reducing apparatus body 20 including the rotating body 30, the rotation shaft 50, and the like, the first clutch (first engagement device) 41, the second clutch (second engagement device) 842, and the third clutch (third engagement device) 843 as the plural engagement devices, and an ECU 10. Here, the rotation shaft 50 is disposed to penetrate the rotating body 30. In the first clutch 41, the rotation member 41a is directly coupled to the crank shaft 4a without passing through the intermediate shaft 51 (see FIG. 1 and the like).

The rotating body 30 according to this embodiment is selectively connected to the crank shaft 4a or the transmission output shaft 13 via the first clutch 41, the second clutch 842, the third clutch 843, and the like so as to enable power transmission. The vibration reducing apparatus body 20, the first clutch 41, the ECU 10 and the like have the same configurations as in the vehicle vibration reducing apparatus 1 (see FIG. 1) and thus will be repeatedly described as little as possible.

The second clutch 842 according to this embodiment is a clutch for transmission/flywheel connection and can be switched to a state where the transmission output shaft 13 and the rotating body 30 engage with each other so as to enable power transmission and a state where the engagement is released. The second clutch 842 can be switched to an engaged state where a rotation member 842a on the transmission output shaft 13 side and a rotation member 842b on the rotating body 30 side engage with each other so as to enable power transmission to cause the transmission output shaft 13 and the rotating body 30 to engage with each other so as to enable power transmission and a disengaged state where the engagement is released.

Here, the rotation member 842a is a member that rotates as a unified body along with the transmission output shaft 13. The rotation member 842a is coupled to the transmission output shaft 13 so as to be rotatable as a unified body therewith. On the other hand, the rotation member 842b is a member that rotates as a unified body along with the rotation shaft 50. The rotation member 842b is coupled to an end of the rotation shaft 50 penetrating the rotating body 30 so as to be rotatable as a unified body therewith. The rotation member 842a and the rotation member 842b are arranged to be coaxial with the rotation axis line X2 and are rotatable about the rotation axis line X2 with transmitted power.

The third clutch 843 according to this embodiment is a clutch for engine/flywheel connection and can be switched to a state where the crank shaft 4a and the rotating body 30 engage with each other so as to enable power transmission and a state where the engagement is released. The third clutch 843 can be switched to an engaged state where a rotation member 843a on the crank shaft 4a side and a rotation member 843b on the rotating body 30 side engage with each other so as to enable power transmission to cause the crank shaft 4a and the rotating body 30 to engage with each other so as to enable power transmission and a disengaged state where the engagement is released.

Here, the rotation member 843a is a member that rotates as a unified body along with the crank shaft 4a. The rotation member 843a in this embodiment is coupled to a counter gear 852 so as to be rotatable as a unified body therewith. The counter gear 852 engages with a counter gear 853. The counter gear 853 engages with the counter gear 852 so as to enable power transmission and engages with a counter gear 854, which is coupled to the crank shaft 4a so as to be rotatable as a unified body therewith, so as to enable power transmission. The counter gear 854 is disposed at the opposite end of the end on the side of the crank shaft 4a on which the rotation member 41a is disposed. On the other hand, the rotation member 843b is a member that rotates as a unified body along with the rotation shaft 50. The rotation member 843b in this embodiment is disposed at the opposite end of an end on the side of the rotation shaft 50 penetrating the rotating body 30 on which the rotation member 842b is disposed. The rotation member 843a, the rotation member 843b, and the counter gear 852 are arranged to be coaxial with the rotation axis line X2 and are rotatable about the rotation axis line X2 with transmitted power. The counter gear 854 is arranged to be coaxial with the rotation axis line X1 and is rotatable about the rotation axis line X1 with transmitted power.

In the vehicle vibration reducing apparatus 801 having the above-mentioned configuration, the first clutch 41 and the second clutch 842 are switched to the engaged state and the third clutch 843 is switched to the disengaged state, whereby a first path 44 is set up. In this case, the rotating body 30 is connected to the transmission output shaft 13. As a result, in the vibration reducing apparatus body 20, the rotating body 30 is connected to the power transmission device 5 and the inertial mass of the rotating body 30 can be added to the inertial mass on the driven side (the driving wheel side) downstream from the damper spring 6a. In this case, the rotational power transmitted from the engine 4 side or the driving wheel 9 side to the transmission output shaft 13 is input (transmitted) to the rotation shaft 50 via the second clutch 842 and the like and is then transmitted to the rotating body 30.

In the vehicle vibration reducing apparatus 801, at least the second clutch 842 is switched to the disengaged state and the third clutch 843 is switched to the engaged state, whereby a second path 45 is set up. In this case, the rotating body 30 is directly connected to the crank shaft 4a. As a result, in the vibration reducing apparatus body 20, the rotating body 30 can be connected to the engine 4 and the inertial mass of the rotating body 30 can be added to the inertial mass on the driving side (the power source side) upstream from the damper spring 6a. At this time, the rotational power from the engine 4 side is input (transmitted) to the rotation shaft 50 sequentially via the counter gear 854, the counter gear 853, the counter gear 852, the third clutch 843, and the like and is then transmitted to the rotating body 30, and the transmission of the rotational power from the transmission output shaft 13 side to the rotating body 30 side is blocked by the second clutch 842. At this time, the power transmitted from the engine 4 to the rotation shaft 50 is shifted depending on the transmission gear ratio (gear ratio) in the counter gear 852, the counter gear 853, and the counter gear 854, and is then transmitted to the rotating body 30 side.

Here, the transmission gear ratios in the counter gear 852, the counter gear 853, and the counter gear 854 are preferably set to be uniform after the rotation directions of the rotational power are set to the same direction in a case where the rotational power is transmitted to the rotating body 30 via the first path 44 and a case where the rotational force is transmitted to the rotating body 30 via the second path 45, but the present invention is, not limited to this setting. The transmission gear ratios in the counter gear 852, the counter gear 853, and the counter gear 854 can be appropriately set depending on various requirements.

In the above-mentioned vehicle vibration reducing apparatus 801 according to this embodiment, it is possible to achieve both the reduction in vibration and the improvement in fuel efficiency, thereby properly reducing the vibration.

The vehicle vibration reducing apparatuses according to the above-mentioned embodiments are not limited to the embodiments and can be modified in various forms without departing from the scope of the appended claims. The vehicle vibration reducing apparatus according to this embodiment may be constructed by appropriately combining the elements of the above-mentioned embodiments.

It has been described above that the carrier of the planetary gear mechanism is the first rotation element and corresponds to the input element, the sun gear thereof is the second rotation element and corresponds to the rotation control element, and the ring gear thereof is the third rotation element and corresponds to the flywheel element, but the present invention is not limited to this configuration. In the planetary gear mechanism, for example, the ring gear may be the first rotation element and correspond to the input element, the carrier may be the second rotation member and correspond to the rotation control element, and the sun gear may be the third rotation element and correspond to the flywheel element, or another combination may be employed.

It has been described that the planetary gear mechanism is a single-pinion planetary gear mechanism, but the present invention is not limited to this configuration. A double-pinion planetary gear mechanism may be employed.

It has been described that the above mentioned vehicle vibration reducing apparatus variably controls the apparent inertial mass by setting the rotation (speed) of the rotational mass body to be variable, but the present invention is not limited to this configuration. An actual inertial mass of the rotational mass body may be controlled to be variable. It has been described that the rotation control device of the rotation adjusting device includes the rotary electrical machine (motor 83), but the present invention is not limited to this configuration. For example, the rotation control device may include an electromagnetic brake as long as it can control the rotation of the rotation element of the planetary gear mechanism constituting the rotational mass body so as to set the apparent inertial mass of the rotational mass body to be variable.

The vehicle mentioned above may be a so-called "hybrid vehicle" including a motor generator as an electric motor capable of generating power in addition to the internal combustion engine as the running power source.

It has been described that the first control device and the second control device are commonly used by the ECU 10, but the present invention is not limited to this configuration. The first control device and the second control device may be provided separately from the ECU 10 and may transmit and receive information such as detection signals, drive signals, and control commands to and from the ECU 10.

REFERENCE SIGNS LIST 1, 201, 201A, 301, 401, 501, 501A, 601, 701, 801: vehicle vibration reducing apparatus
2: vehicle
3: power train
4: engine (running power source)
4a: crank shaft
5: power transmission device 6: damper
6a: damper spring
7: transmission
8: differential gear
9: driving wheel
10: ECU (first control device, second control device)
12: transmission input shaft (input shaft)
13: transmission output shaft
20: vibration reducing apparatus body
30: rotating body (inertial mass body)
41: first clutch (first engagement device)
42, 242, 542, 642, 742, 842: second clutch (second engagement device)
43, 543, 643, 743, 843: third clutch (third engagement device)
44: first path
45: second path
50: rotation shaft
80, 80A, 80B: rotation adjusting device
81: planetary gear mechanism
82: rotation control device
83: motor
84: battery
85: continuously-variable transmission
306: fluid coupling (fluid transmission mechanism)
406: torque converter (fluid transmission mechanism)

The invention claimed is:

1. A vibration reducing apparatus for a vehicle, the vehicle having a running power source generating rotational power for causing the vehicle to run, a driving wheel, and a power transmission device transmitting the rotational power to the driving wheel via a damper from the running power source, the vibration reducing apparatus comprising:
    an inertial mass body that is connected to the running power source or the power transmission device;
    a first engagement device configured to switch between a state where the running power source engages with the damper of the power transmission device so as to enable power transmission between the running power source and the damper and a state where the engagement of the running power source and the damper is released;
    a second engagement device configured to switch between a state where the power transmission device engages with the inertial mass body so as to enable power transmission between the power transmission device and the inertial mass body in a power transmission path different from that of the first engagement device and a state where the engagement of the power transmission device and the inertial mass body is released; and
    a third engagement device configured to switch between a state where the running power source engages with the inertial mass body so as to enable power transmission between the running power source and the inertial mass body in a power transmission path different from those of the first engagement device and the second engagement device and a state where the engagement of the running power source and the inertial mass body is released.

2. The vibration reducing apparatus according to claim 1, wherein
    the power transmission device includes a transmission that changes the rotational power transmitted from the running power source to the driving wheel, the first engagement device, the second engagement device, and the third engagement device are arranged to be coaxial with a rotation axis line of an input shaft of the transmission, and
    the second engagement device is configured to switch between a state where the input shaft of the transmission engages with the inertial mass body so as to enable power transmission between the input shaft of the transmission and the inertial mass body and a state where the engagement of the input shaft of the transmission and the inertial mass body is released.

3. The vibration reducing apparatus according to claim 1, further comprising a first controller configured to control the first engagement device, the second engagement device, and the third engagement device, wherein
    the running power source is an internal combustion engine, and
    when the running power source is in an idling operation state, the first controller is configured to control the first engagement device and the second engagement device so as to be switched to the disengaged state of the first engagement device and the second engagement device, and control the third engagement device so as to be switched to the engaged state of the third engagement device.

4. The vibration reducing apparatus according to claim 3, wherein
    when the vehicle is in a starting condition, the first controller is configured to control the first engagement device and the second engagement device to be in the disengaged state and the third engagement device to be in the engaged state.

5. The vibration reducing apparatus according to claim 3, wherein
    after the first engagement device and the second engagement device are in the disengaged state and the third engagement device is in the engaged state when the vehicle starts moving, the first controller is configured to control the first engagement device so as to be switched to the engaged state, and
    after the engagement of the first engagement device is completed, the first controller is configured to control the third engagement device so as to be switched to the disengaged state of the third engagement device and control the second engagement device so as to be switched to the engaged state of the second engagement device.

6. The vibration reducing apparatus according to claim 3, wherein
    the power transmission device includes a fluid transmission mechanism that transmits the rotational power via a fluid, and
    after the first engagement device and the second engagement device are in the disengaged state and the third engagement device is in the engaged state when the vehicle starts moving, the first controller is configured to control the third engagement device so as to be switched to the disengaged state of the third engagement device and to control the second engagement device so as to be switched to the engaged state of the second engagement device after a rotation speed of an inertial mass body side of the second engagement device is synchronized with a rotation speed of a power transmission device side of the second engagement device, and
    after the disengagement of the third engagement device and the engagement of the second engagement device are completed, the first controller is configured to control the first engagement device so as to be switched to the engaged state of the first engagement device.

7. The vibration reducing apparatus according to claim 1, wherein
the inertial mass body is able to accumulate the transmitted rotational power as inertial energy.

8. The vibration reducing apparatus according to claim 1, further comprising:
a rotation adjusting device that adjusts rotation of the inertial mass body; and
a second controller configured to control the rotation adjusting device so as to adjust the rotation of the inertial mass body on the basis of an output of the running power source.

9. The vibration reducing apparatus according to claim 8, wherein
the second controller is configured to control the rotation adjusting device so as to accumulate surplus rotational power, generated by the running power source, in the inertial mass body.

10. The vibration reducing apparatus according to claim 8, wherein
the second controller is configured to control the rotation adjusting device so as to supplement deficient power, generated by the running power source, with surplus rotational power from the inertial mass body for causing the vehicle to run.

11. The vibration reducing apparatus according to claim 1, wherein
the first engagement device is a lockup clutch of a fluid transmission mechanism that transmits the rotational power via a fluid.

* * * * *